US012194963B2

(12) United States Patent
Adachi et al.

(10) Patent No.: US 12,194,963 B2
(45) Date of Patent: Jan. 14, 2025

(54) VEHICULAR CLEANING SYSTEM, AND CLEANING METHOD FOR SAME

(71) Applicant: DENSO CORPORATION, Kariya (JP)

(72) Inventors: Shota Adachi, Kariya (JP); Yuusuke Yamauchi, Kariya (JP); Takahiro Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 533 days.

(21) Appl. No.: 17/428,868

(22) PCT Filed: Feb. 28, 2020

(86) PCT No.: PCT/JP2020/008219
§ 371 (c)(1),
(2) Date: Aug. 5, 2021

(87) PCT Pub. No.: WO2020/179649
PCT Pub. Date: Sep. 10, 2020

(65) Prior Publication Data
US 2022/0105902 A1    Apr. 7, 2022

(30) Foreign Application Priority Data

Mar. 7, 2019 (JP) ................................ 2019-041652
Aug. 27, 2019 (JP) ................................ 2019-154690
Feb. 12, 2020 (JP) ................................ 2020-021788

(51) Int. Cl.
*B60S 1/52* (2006.01)
*B01F 23/213* (2022.01)
(Continued)

(52) U.S. Cl.
CPC .......... *B60S 1/52* (2013.01); *B01F 23/21321* (2022.01); *B01F 35/22162* (2022.01);
(Continued)

(58) Field of Classification Search
CPC ....................................................... B60S 1/52
See application file for complete search history.

(56) References Cited

U.S. PATENT DOCUMENTS 4,026,468 A    5/1977 Tinder et al.
5,657,929 A    8/1997 DeWitt et al.
(Continued)

FOREIGN PATENT DOCUMENTS

JP    2016-000599 A    1/2016
JP    2018-037100 A    3/2018
WO    2019/243153 A1   12/2019

OTHER PUBLICATIONS

May 26, 2020 Search Report issued in International Patent Application No. PCT/JP2020/008219.

*Primary Examiner* — Jason Y Ko
(74) *Attorney, Agent, or Firm* — Oliff PLC

(57) ABSTRACT

A vehicular cleaning system performs cleaning to remove foreign matter attached to a cleaning target in a vehicle. The vehicular cleaning system includes: an air pump driven to generate an air spray; a washer pump driven to supply a washing solution; a spray nozzle which blows an air-liquid mixed fluid, obtained by mixing the air spray and the washing solution, onto the cleaning target; a washing solution storage unit configured to store the washing solution supplied from the washer pump, and to be capable of discharging the stored washing solution when the washing solution is to be mixed with the air spray; and a mixing and outputting unit configured to blow the air-liquid mixed fluid, obtained by mixing the air spray and the washing solution introduced from the washing solution storage unit, from the spray nozzle toward the cleaning target.

16 Claims, 30 Drawing Sheets

(51) Int. Cl.
*B01F 35/221* (2022.01)
*B05B 7/24* (2006.01)
*B60S 1/48* (2006.01)
*B60S 1/50* (2006.01)
*B60S 1/54* (2006.01)
*B60S 1/60* (2006.01)
*B01F 101/00* (2022.01)

(52) U.S. Cl.
CPC ............ *B05B 7/2491* (2013.01); *B60S 1/481* (2013.01); *B60S 1/50* (2013.01); *B60S 1/54* (2013.01); *B60S 1/60* (2013.01); *B01F 2101/4505* (2022.01)

(56) References Cited

U.S. PATENT DOCUMENTS

| | | |
|---|---|---|
| 2015/0078940 A1 | 3/2015 | Kikuta et al. |
| 2015/0296108 A1 | 10/2015 | Hayakawa et al. |
| 2016/0339875 A1 | 11/2016 | Ina et al. |

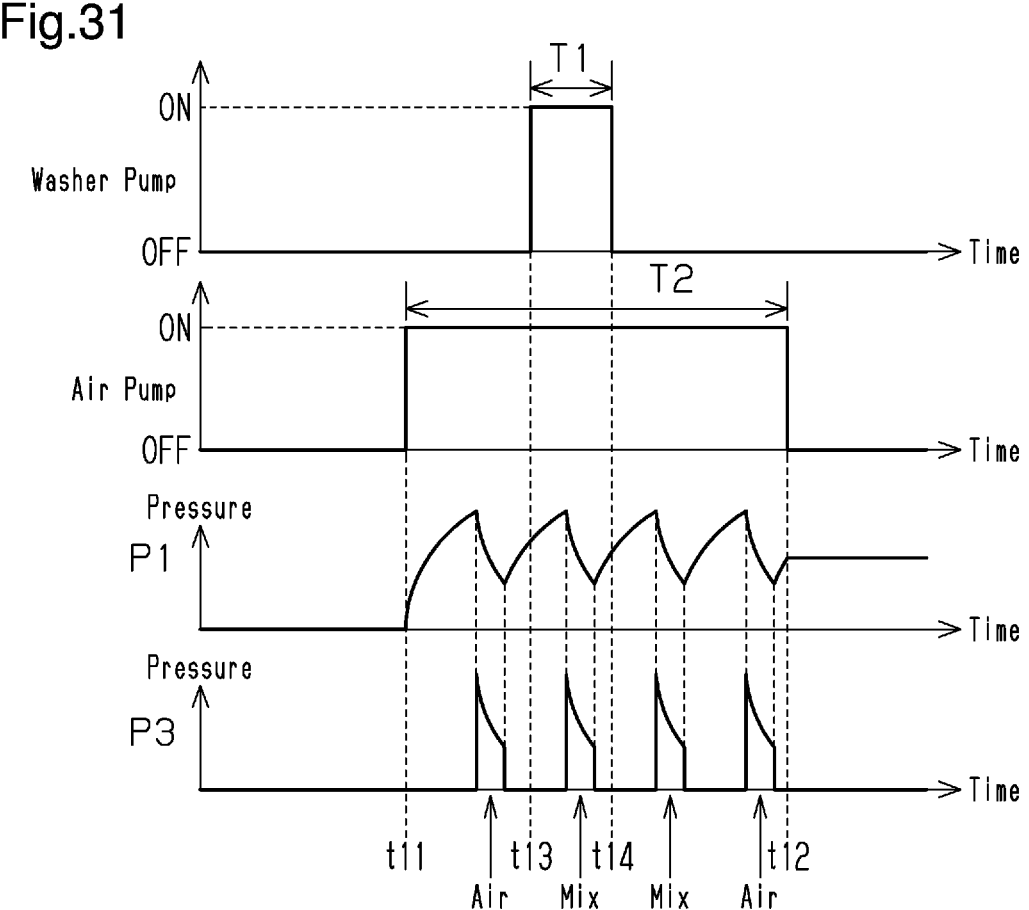

VEHICULAR CLEANING SYSTEM, AND CLEANING METHOD FOR SAME

CROSS-REFERENCE TO RELATED APPLICATIONS

This application is based upon and claims the benefit of priority from prior Japanese Patent Application No. 2019-41652, filed on Mar. 7, 2019, Japanese Patent Application No. 2019-154690, filed on Aug. 27, 2019, and Japanese Patent Application No. 2020-021788, filed on Feb. 12, 2020, the entire contents of which are incorporated herein by reference.

TECHNICAL FIELD

The present disclosure relates to a vehicle cleaning system and a cleaning method for the same that sprays a cleaning subject of a vehicle with fluid to remove foreign matter.

BACKGROUND ART

The progress in highly sophisticated vehicle driving assistance and autonomous driving technology has resulted in an increase in the number of sensors used to check vehicle surroundings (refer to, for example, patent document 1). A known example of such a sensor is Light Detection and Ranging or Laser Imaging Detection and Ranging (LIDAR) that is a distance measurement system using an optical sensor to measure distance with light transmitted and received between a vehicle and an object.

The sensor that checks the surroundings of the vehicle includes a sensing surface (e.g., outer surface of lens, cover glass, or the like) exposed to the outside from the vehicle. Thus, when foreign matter such as raindrops collect on the sensing surface of the sensor, the foreign matter may be lying in the optical path of the optical sensor. This will adversely affect distance measurement accuracy.

Studies have been conducted to clean off foreign matter from a sensing surface of a senor by spraying the sensing surface with a gas-liquid fluid mixture that is a mixture of air and a cleaning liquid (refer to, for example, patent document 2).

PRIOR ART DOCUMENT

Patent Document

Patent Document 1: Japanese Laid-Open Patent Publication No. 2018-37100
Patent Document 2: Japanese Laid-Open Patent Publication No. 2016-222074

SUMMARY OF THE INVENTION

To further ensure that foreign matter is cleaned off from the sensing surface of a sensor, the use of a large pump will increase the force of the air or cleaning liquid sprayed against the sensing surface. However, the use of such a pump in a vehicle will increase the space occupied by the pump and the power used to drive the pump. Thus, there is a need to study how to improve the cleaning capability for removing foreign matter and how to increase the cleaning force stability when removing foreign matter.

It is an objective of the present disclosure to provide a system and method for cleaning a vehicle that improves the cleaning capability for removing foreign matter from a cleaning subject of the vehicle and ensures the cleaning force stability when removing foreign matter.

A first aspect of the present disclosure is a vehicle cleaning system that removes foreign matter from a cleaning subject of a vehicle. The vehicle cleaning system includes an air pump driven to generate an air jet; a washer pump driven to supply cleaning liquid; an ejection nozzle that sprays the cleaning subject with a gas-liquid fluid mixture, which includes the air jet and the cleaning liquid; a cleaning liquid reservoir configured to store the cleaning liquid supplied from the washer pump and allow the stored cleaning liquid to be discharged for mixing with the air jet; and a mixture outlet configured to spray the cleaning subject with the gas-liquid fluid mixture, which includes the air jet and the cleaning liquid received from the cleaning liquid reservoir, from the ejection nozzle.

The vehicle cleaning system includes the cleaning liquid reservoir and the mixture outlet to mix the cleaning liquid with air jet and spray a cleaning subject with a gas-liquid fluid mixture, which is a mixture of the air jet and the cleaning liquid. This allows foreign matter to be removed from a cleaning subject with a small amount of the cleaning liquid. Further, the cleaning liquid, which is mixed with the air jet, is temporarily stored in the cleaning liquid reservoir before being supplied. This stabilizes the supply of the small amount of the cleaning liquid required for cleaning.

A second aspect of the present disclosure is a vehicle cleaning system that removes foreign matter from a cleaning subject of a vehicle. The vehicle cleaning system includes an air pump driven to generate an air jet, a washer pump driven to supply cleaning liquid; an ejection nozzle that sprays the cleaning subject with a gas-liquid fluid mixture, which includes the air jet and the cleaning liquid; an air jet generator including the air pump and a valve device, wherein the air jet generator is configured to generate the air jet that has a high pressure and is pulsed based on an action of the valve device that accumulates pressure until compressed air supplied from the air pump reaches a pressure that is higher than a discharge pressure of the air pump and, subsequent to the pressure accumulation, discharges the compressed air toward a downstream side; a cleaning liquid reservoir including a chamber, which stores the cleaning liquid supplied from the washer pump, and is configured to allow the cleaning liquid stored in the chamber to be discharged for mixing with the air jet; and a mixture outlet configured to spray the cleaning subject with the gas-liquid fluid mixture, which includes the high-pressure pulsed air jet generated by the air jet generator and the cleaning liquid received from the cleaning liquid reservoir, from the ejection nozzle.

The vehicle cleaning system generates the high-pressure pulsed air jet in the air jet generator with the valve device by accumulating the pressure of the compressed air supplied from the air pump to a pressure higher than the discharge pressure of the air pump and discharging the compressed air subsequent to the pressure accumulation toward the downstream side. Thus, an air jet that improves the foreign matter removal capability can be generated without increasing the size of the pump. The cleaning liquid reservoir and the mixture outlet are included so that the high-pressure pulsed air jet, which is generated by the air jet generator, is mixed with the cleaning liquid, to spray the cleaning subject with the gas-liquid fluid mixture, which is a mixture of the high-pressure pulsed air jet and the atomized cleaning liquid. This allows foreign matter to be removed from a cleaning subject with a small amount of the cleaning liquid. Further, the cleaning liquid, which is mixed with the air jet, is temporarily stored in the cleaning liquid reservoir before being supplied. This stabilizes the supply of the small amount of the cleaning liquid required for cleaning. In the above description, "the discharge pressure of the air pump" refers to the pressure of a passage directly connecting the air pump and the ejection nozzle with a connection hose and driving the air pump.

A third aspect of the present disclosure is a cleaning method for a vehicle cleaning system that removes foreign matter from a cleaning subject of a vehicle. The method includes driving an air pump to generate air jet; driving a washer pump to supply cleaning liquid; spraying the cleaning subject with a gas-liquid fluid mixture, which is a mixture of the air jet and the cleaning liquid, from an ejection nozzle; generating the air jet that has a high pressure and is pulsed based on an action of the valve device that accumulates pressure in an air jet generator, which includes the air pump and a valve device, until compressed air supplied from the air pump reaches a pressure that is higher than a discharge pressure of the air pump and, subsequent to the pressure accumulation, discharges the compressed air toward a downstream side; in a cleaning liquid reservoir including a chamber that stores the cleaning liquid supplied from the washer pump, discharging the cleaning liquid, which is stored in the chamber, for mixing with the air jet; and spraying the cleaning subject with the gas-liquid fluid mixture, which is obtained by mixing the high-pressure pulsed air jet generated by the air jet generator and the cleaning liquid received from the cleaning liquid reservoir in a mixture outlet, from the ejection nozzle.

In the same manner as the above-described cleaning system, the cleaning method generates a high-pressure pulsed air jet that increases the foreign matter removing capability without increasing the size of the pump. Further, the method sprays the cleaning subject with the gas-liquid fluid mixture, which is a mixture of the high-pressure pulsed air jet and the atomized cleaning liquid. Thus, foreign matter can be removed from a cleaning subject with a small amount of cleaning liquid. Further, the cleaning liquid, which is mixed with the air jet, is temporarily stored in the cleaning liquid reservoir before being supplied. This stabilizes the supply of the small amount of the cleaning liquid required for cleaning.

A fourth aspect of the present disclosure is a vehicle cleaning system that removes foreign matter from a cleaning subject of a vehicle. The vehicle cleaning system includes an air pump driven to generate air jet; a washer pump driven to supply cleaning liquid; an ejection nozzle that sprays the cleaning subject with a gas-liquid fluid mixture, which is a mixture of the air jet and the cleaning liquid; an air jet generator including the air pump and a valve device, wherein the air jet generator is configured to generate the air jet that has a high pressure and is pulsed based on an action of the valve device that accumulates pressure until compressed air supplied from the air pump reaches a pressure that is higher than a discharge pressure of the air pump and, subsequent to the pressure accumulation, discharges the compressed air toward a downstream side; a cleaning liquid inlet configured to draw in the cleaning liquid that is supplied from the washer pump; and a mixture outlet configured to spray the cleaning subject with the gas-liquid fluid mixture, which is a mixture of the high-pressure pulsed air jet generated by the air jet generator and the cleaning liquid received from the cleaning liquid inlet, from the ejection nozzle.

The vehicle cleaning system generates the high-pressure pulsed air jet in the air jet generator with the valve device by accumulating the pressure of the compressed air supplied from the air pump to a pressure higher than the discharge pressure of the air pump and discharging the compressed air subsequent to the pressure accumulation toward the downstream side. Thus, an air jet that improves the foreign matter removal capability can be generated without increasing the size of the pump. The cleaning liquid inlet and the mixture outlet are included so that the high-pressure pulsed air jet, which is generated by the air jet generator, is mixed with the cleaning liquid, to spray the cleaning subject with the gas-liquid fluid mixture, which is a mixture of the high-pressure pulsed air jet and the atomized cleaning liquid. This allows foreign matter to be removed from a cleaning subject with a small amount of the cleaning liquid. In the above description, "the discharge pressure of the air pump" refers to the pressure of a passage directly connecting the air pump and the ejection nozzle with a connection hose.

A fifth aspect of the present disclosure is a cleaning method for a vehicle cleaning system that removes foreign matter from a cleaning subject of a vehicle. The method includes driving an air pump to generate air jet; driving a washer pump to supply cleaning liquid; spraying the cleaning subject with a gas-liquid fluid mixture, which is a mixture of the air jet and the cleaning liquid, from an ejection nozzle; generating the air jet that has a high pressure and is pulsed based on an action of the valve device that accumulates pressure in an air jet generator, which includes the air pump and a valve device, until compressed air supplied from the air pump reaches a pressure that is higher than a discharge pressure of the air pump and, subsequent to the pressure accumulation, discharges the compressed air toward a downstream side; receiving the cleaning liquid that is supplied from the washer pump at a cleaning liquid inlet; and spraying the cleaning subject with the gas-liquid fluid mixture, which is obtained by mixing the high-pressure pulsed air jet generated by the air jet generator and the cleaning liquid received from the cleaning liquid reservoir in a mixture outlet, from the ejection nozzle.

In the same manner as the above-described cleaning method, this cleaning method sprays the cleaning subject with the gas-liquid fluid mixture, which is a mixture of the high-pressure pulsed air jet and the atomized cleaning liquid. Thus, foreign matter can be removed from a cleaning subject with a small amount of cleaning liquid without increasing the size of the pump.

BRIEF DESCRIPTION OF THE DRAWINGS

The present disclosure, together with objects and advantages thereof, may best be understood by reference to the following description of the presently preferred embodiments together with the accompanying drawings, in which:

FIG. 31 is a waveform diagram illustrating the action of the cleaning device in a modified example of the seventh embodiment;

MODES FOR CARRYING OUT THE INVENTION

First Embodiment

A system and method for cleaning a vehicle in accordance with a first embodiment will now be described.

Figure 1:
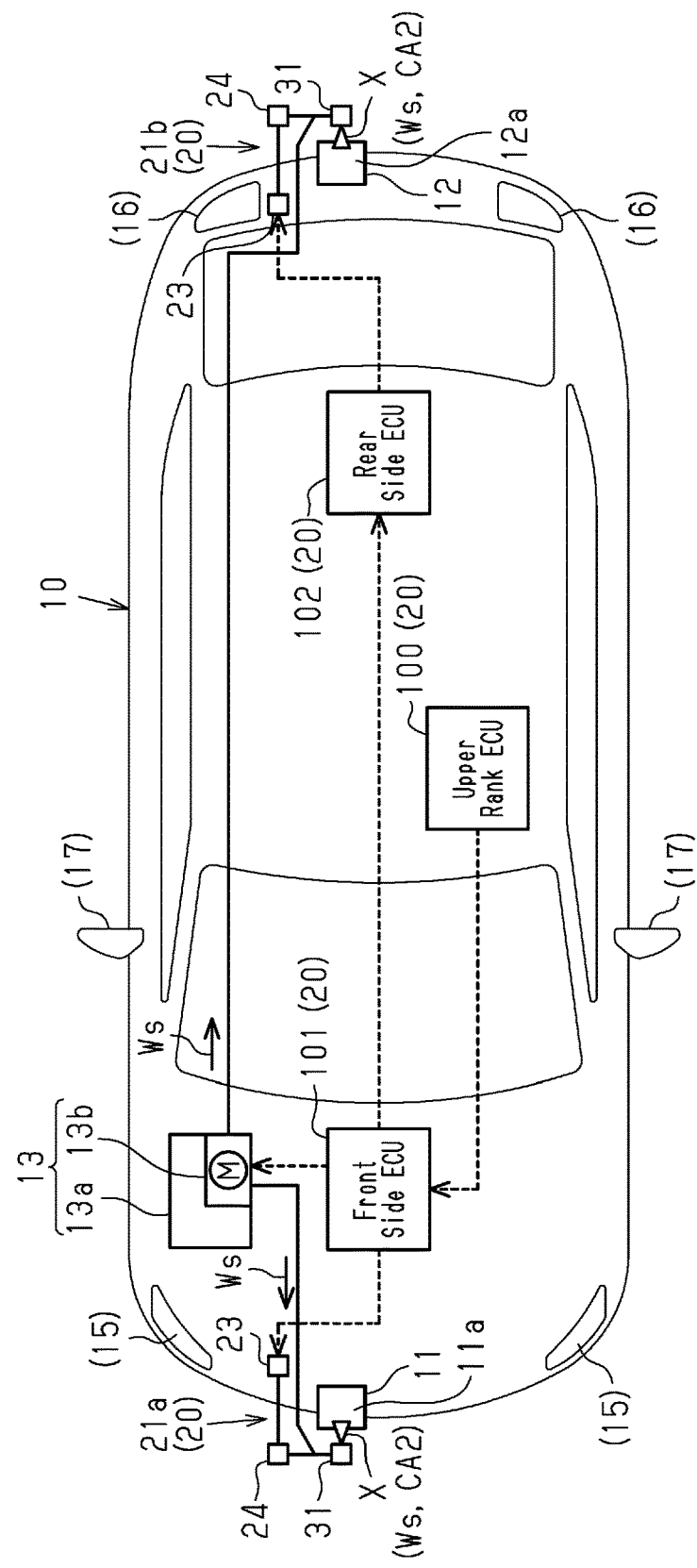
FIG. 1 is a schematic diagram of a vehicle cleaning system in accordance with a first embodiment and a second embodiment.

As shown in FIG. 1, a vehicle 10 includes a first distance measurement sensor 11 that is set at a middle portion of the front end and a second distance measurement sensor 12 that is set at a middle portion of the rear end. The first and second distance measurement sensors 11 and 12 each include an optical sensor that transmits and receives light of a predetermined wavelength to and from the front and rear of the vehicle 10. The first and second distance measurement sensors 11 and 12 are each used in a distance measurement system (LIDAR or the like) that measures the distance from the vehicle to a front object or rear object or a system that provides the vehicle 10 with highly sophisticated driving assistance or allows for autonomous driving or the like.

The first and second distance measurement sensors 11 and 12 respectively include sensing surfaces 11a and 12a (e.g., outer surfaces of lenses, cover glasses, or the like) that are exposed to the outside of the vehicle 10. Foreign matter, such as raindrops, may collect on the sensing surfaces 11a and 12a and adversely affect the distance measurement accuracy. Thus, the vehicle 10 includes a vehicle cleaning system 20 to clean off foreign matter from each of the sensing surfaces 11a and 12a.

The vehicle cleaning system 20 includes first and second cleaning devices 21a and 21b. The cleaning subject of the first cleaning device 21a is the first distance measurement sensor 11 set at the middle portion of the front end of the vehicle 10. The cleaning subject of the second cleaning device 21b is the second distance measurement sensor 12 set at the middle portion of the rear end of the vehicle 10.

The first and second cleaning devices 21a and 21b of the present embodiment are configured to cooperate with a washer device 13 that is typically installed in the vehicle 10. The washer device 13 drives a washer pump 13b to supply cleaning liquid Ws, which is stored in a tank 13a, to a windshield or the like. Further, the washer device 13 is also configured to allow the cleaning liquid Ws to be supplied to the first and second cleaning devices 21a and 21b of the present embodiment.

Figure 2:
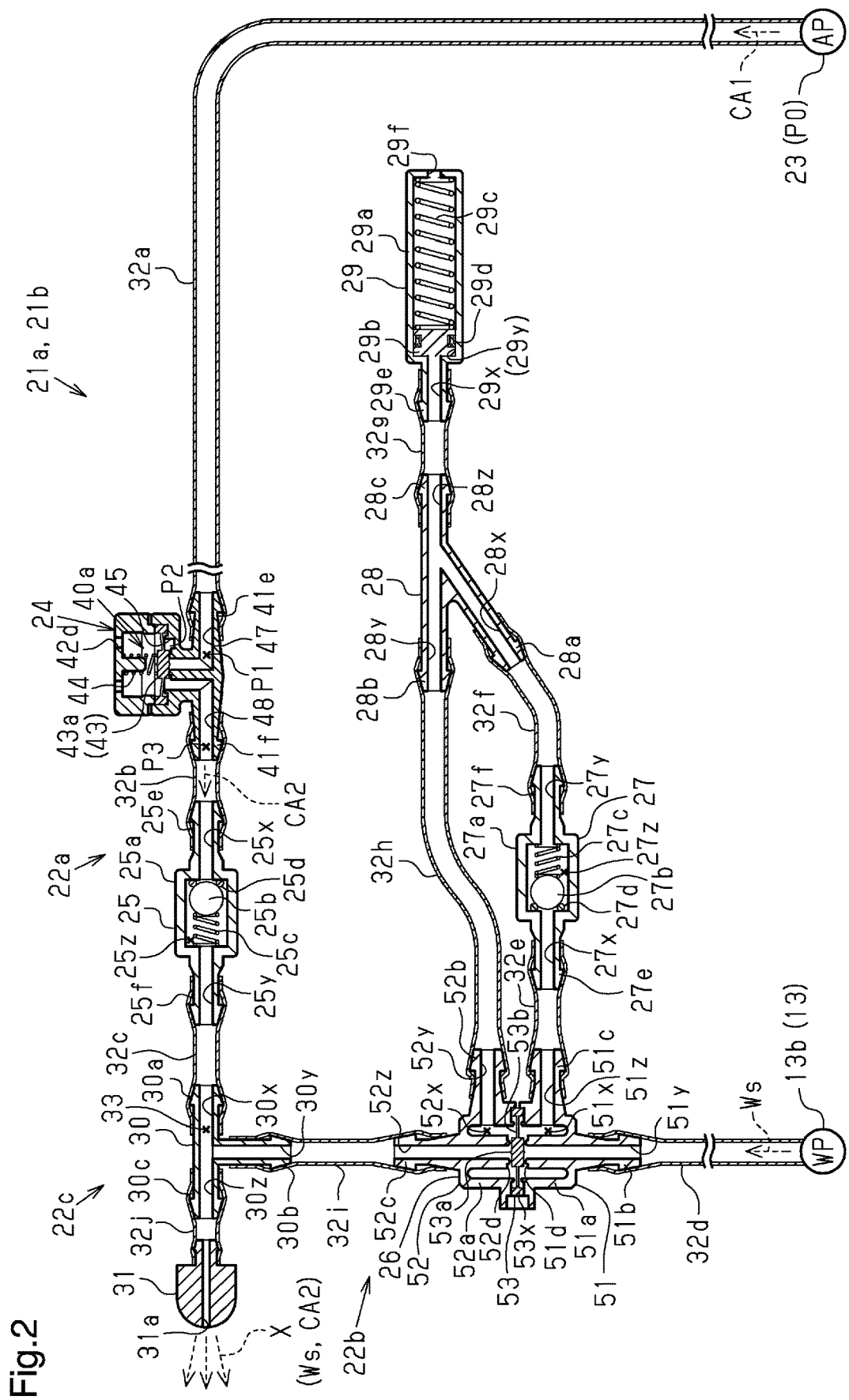
FIG. 2 is a schematic diagram of a cleaning device used in the vehicle cleaning system in accordance with the first embodiment.

As shown in FIG. 2, the first and second cleaning devices 21a and 21b each include an air jet generator 22a, a cleaning liquid reservoir 22b, and a mixture outlet 22c. The air jet generator 22a includes an air pump 23, a valve device 24, and a check valve 25. The air jet generator 22a generates air jet CA2, which has a high pressure and is pulsed, from compressed air (air jet) CA1 supplied from the air pump 23, through the actions of the valve device 24, the check valve 25, and the like, which will be described later. The cleaning liquid reservoir 22b is arranged next to the air jet generator 22a and includes a passage switching valve (passage switching unit) 26, a check valve (passage switching unit) 27, a reservoir joint 28, and a chamber 29. The cleaning liquid reservoir 22b stores a predetermined amount of the cleaning liquid Ws, which is supplied under pressure from the washer pump 13b via the passage switching valve 26 and the check valve 27, in the chamber 29. The mixture outlet 22c includes a mixture joint 30 and an ejection nozzle 31. The mixture outlet 22c mixes the air jet CA2, which is generated by the air jet generator 22a, and the cleaning liquid Ws, which is received from the cleaning liquid reservoir 22b, at the mixture joint 30 and sprays the cleaning subject of the sensing surfaces 11a and 12a with the mixture from the ejection nozzle 31. The first and second cleaning devices 21a and 21b have the same structure. Thus, the first and second cleaning devices 21a and 21b will be described hereafter as having the same structure.

In the air jet generator 22a, the air pump 23 and the valve device 24 are connected to each other by a connection hose 32a, and the valve device 24 and the check valve 25 are connected to each other by a connection hose 32b. The connection hoses 32a and 32b are rubber hoses or the like and formed from a flexible material. Connection hoses 32c to 32j, which will be described later, are also formed from the same material. The air pump 23 is formed by an electric air pump that is configured to generate compressed air CA1. The valve device 24 increases the pressure of the compressed air CA1 and produces pulses (in an intermittent manner) with the compressed air CA1 continuously supplied from the air pump 23 to output the high-pressure pulsed air jet CA2 toward the check valve 25, more specifically, via the check valve 25 toward the mixture outlet 22c.

Figure 3:
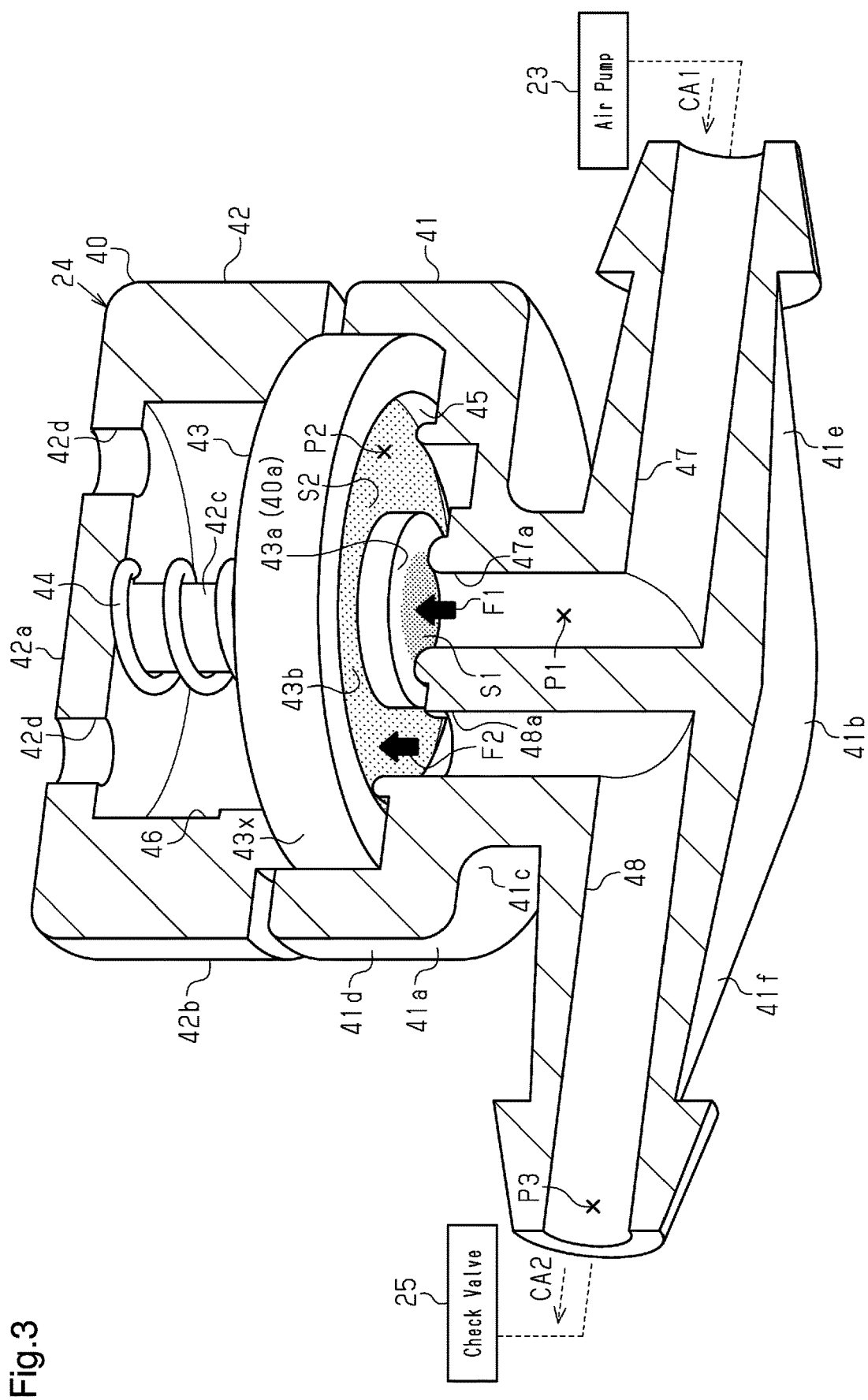
FIG. 3 is a schematic diagram of a valve device used in the cleaning device of the first and second embodiments.
Figure 4:
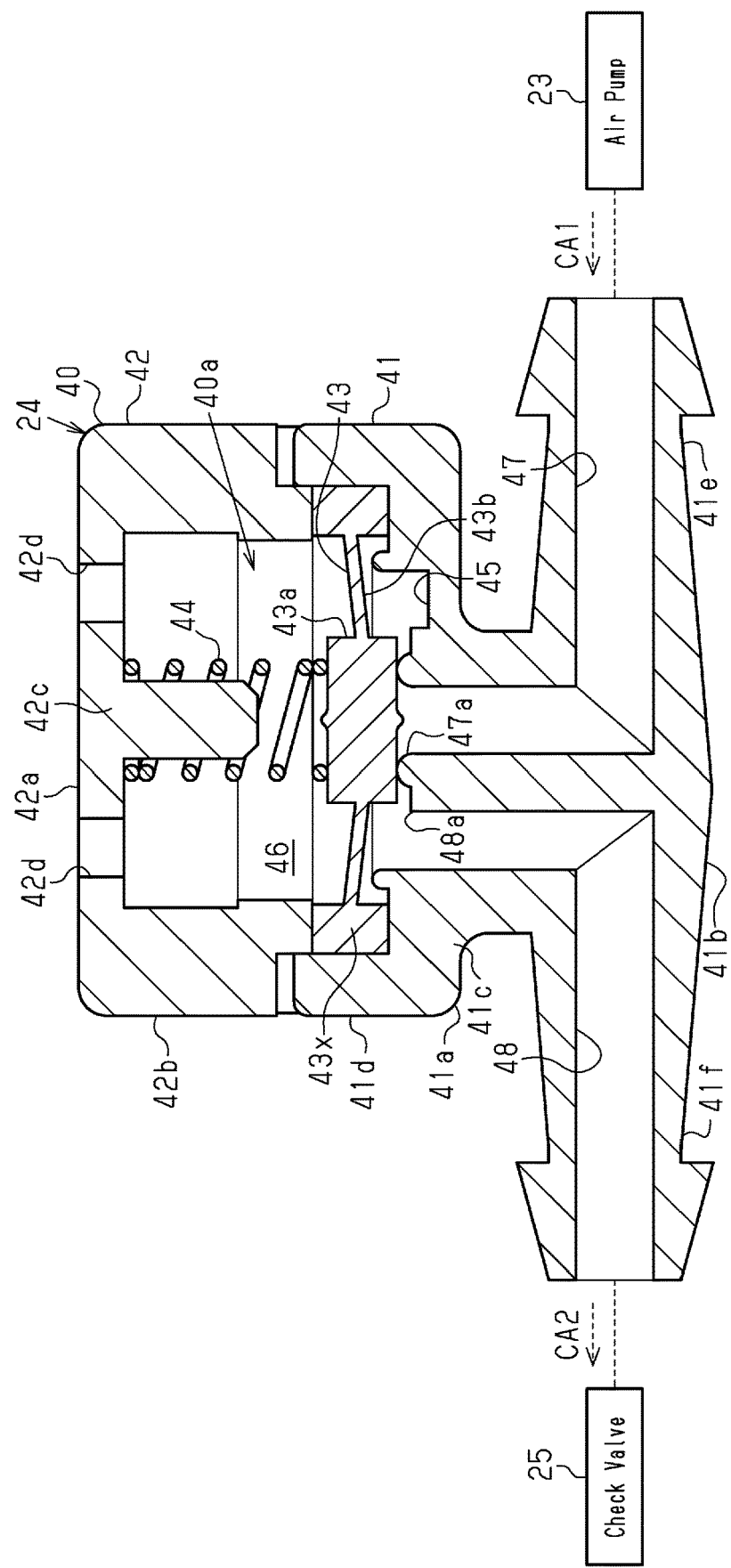
FIG. 4 is a schematic diagram of the valve device in the first and second embodiments.

As shown in FIGS. 3 and 4, the valve device 24 includes a base member 41, a cover member 42, a diaphragm 43, and an urging spring 44. Among these components, the cover member 42, the diaphragm 43, the urging spring 44, and part of the base member 41 form a valve body 40. Hereafter, the base member 41 will be described as being located at the lower side, and the cover member 42 will be described as being located at the upper side. However, there are no limitations to the directions during usage of the valve device 24.

The base member 41 is formed from plastic and incudes an upper portion defining a base 41a and a lower portion defining a connector 41b. The base 41a forms the lower part of a housing of the main valve body 40 and includes a circular bottom wall 41c and an annular side wall 41d that projects upward from the circumferential edge of the bottom wall 41c. The cover member 42 forms the upper part of the housing of the main valve body 40 and includes a circular top wall 42a and an annular side wall 42b that projects downward from the circumferential edge of the top wall 42a. The base member 41 and the cover member 42 are coupled so that the upper end surface of the side wall 41d and the lower end surface of the side wall 42b are opposed to each other. This holds a circumferential portion 43x of the diaphragm 43 between the members 41 and 42. The held diaphragm 43 provides a seal between the members 41 and 42. The diaphragm 43 partitions a valve chamber 45, defined by an open space formed by the diaphragm 43 and the bottom wall 41c and the side wall 41d of the base 41a, and a back pressure chamber 46, defined by an open space formed by the top wall 42a and the side wall 42b of the cover member 42.

The connector 41b is arranged on the lower side of the base 41a first extending downward from the bottom wall 31c of the base 41a and then branched into two so as to have the form of the letter T arranged upside-down. In the connector 41b, one of the two branches which is located closer to the air pump 23 defines an intake connector 41e and the other one of the two branches which is located closer to the check valve 25 defines a discharge connector 41f. The intake connector 41e is connected by the connection hose 32a to the air pump 23. An intake passage 47 formed inside the intake connector 41e is independent from a discharge passage 48 formed inside the discharge connector 41f. The intake passage 47 and the discharge passage 48, respectively, include open portions 47a and 48a, formed in the bottom wall 41c of the base 41a. The open portion 47a of the intake passage 47 is located in the central portion of the bottom wall 41c in the base 41a of the base member 41 and projected in a cylindrical form. The open portion 48a of the discharge passage 48 is located in the circumferential portion of the bottom wall 41c at a lower position than the open portion 47a. The opening area of the open portion 48a is greater than the opening area of the open portion 47a.

The diaphragm 43, which is disc-shaped and formed from a flexible material, has a central portion including a cylindrical valve body 43a located at a position opposed toward the open portion 47a of the intake passage 47. The valve body 43a has a slightly larger diameter than the open portion 47a of the intake passage 47. The diaphragm 43 has a predetermined thickness at the valve body 43a and a predetermined thickness at the circumferential portion 43x. A thin portion 43b that is thinner than the valve body 43a and the circumferential portion 43x extends between the valve body 43a and the circumferential portion 43x. The diaphragm 43 is configured so that the valve body 43a, which is connected by the thin portion 43b to the fixed circumferential portion 43x, is movable. Movement of the valve body 43a allows the valve body 43a to move into contact with or move away from the open portion 47a of the intake passage 47 to open or close the passage between the air pump 23 and the valve chamber 45.

The cover member 42, which is formed from plastic, includes a protrusion 42c, which is located in the central portion of the top wall 42a at a position opposed to the valve body 43a. The protrusion 42c serves as a position restriction protrusion for the urging spring 44, which is formed by a compression coil spring. The upper side of the urging spring 44 is fitted to the protrusion 42c. The upper end of the urging spring 44 contacts the top wall 42a. The lower end of the urging spring 44 contacts the valve body 43a. Thus, the urging spring 44, which is guided by the protrusion 42c, urges the valve body 43a downward from the top wall 42a. That is, the urging spring 44 urges the valve body 43a toward the open portion 47a of the intake passage 47. The top wall 42a includes, for example, two connection holes 42d at positions located outward from the protrusion 42c to connect the back pressure chamber 46 to the outside of the cover member 42, or expose the back pressure chamber 46 to the atmosphere, so that the pressure of the back pressure chamber 46 does not affect the movement of the valve body 43a. In this manner, the valve device 24 includes a valve 40a that opens and closes the open portion 47a of the intake passage 47 with the valve body 43a.

As shown in FIG. 2, the check valve 25 includes a valve case 25a, a valve body 25b, an urging spring 25c, and a seal ring 25d. The valve case 25a includes an intake connector 25e and a discharge connector 25f. An intake passage 25x inside the intake connector 25e and a discharge passage 25y inside the discharge connector 25f are connected to a valve chamber 25z in the valve case 25a. The intake connector 25e is connected to the discharge connector 41f of the valve device 24 by the connection hose 32b. The discharge connector 25f is connected to a first intake connector 30a of the mixture joint 30 by the connection hose 32c.

In the valve chamber 25z of the valve case 25a, the seal ring 25d is fixed around the open portion of the intake passage 25x, and the valve body 25b, which is spherical, is urged by the urging spring 25c to contact the seal ring 25d. When the fluid pressure of the fluid from the intake passage 25x becomes greater than or equal to a predetermined pressure, the valve body 25b is moved against the urging force of the urging spring 25c and switched from a valve closing state to a valve opening state so that the check valve 25 outputs the air jet CA2 of the valve device 24 toward the mixture joint 30 of the mixture outlet 22c.

The passage switching valve 26 used in the cleaning liquid reservoir 22b includes a first case member 51, a second case member 52, and a diaphragm 53. The first case member 51, which is formed from plastic, includes a first tubular body 51a, which is cylindrical and has a closed bottom, a first intake connector 51b, which extends from the bottom of the first tubular body 51a, and a first discharge connector 51c, which extends from the circumferential wall of the first tubular body 51a. The first intake connector 51b is connected to the connection hose 32d extending from the washer pump 13b. The inside of the first tubular body 51a defines a first valve chamber 51x. The first valve chamber 51x allows for connection of a first intake passage 51y inside the first intake connector 51b and a first discharge passage 51z inside the first discharge connector 51c. A cylindrical open portion 51d of the first intake passage 51y in the first valve chamber 51x extends from the bottom of the first tubular body 51a. The second case member 52, which is formed from plastic, includes a second tubular body 52a, which is cylindrical and has a closed bottom, a second intake connector 52b, which extends from the circumferential wall of the second tubular body 52a, and a second discharge connector 52c, which extends from the bottom of the second tubular body 52a. The inside of the second tubular body 52a defines a second valve chamber 52x. The second valve chamber 52x allows for connection of a second intake passage 52y inside the second intake connector 52b and a second discharge passage 52z inside the second discharge connector 52c. A cylindrical open portion 52d of the second discharge passage 52z in the second valve chamber 52x extends from the bottom of the second tubular body 52a. The first and second case members 51 and 52 differ in that fluid flows into one and out of the other one but are identical to each other in structure.

The first and second case members 51 and 52 are coupled so that the open end surfaces of the tubular bodies 51a and 52a are opposed toward each other. In this case, the first intake connector 51b and the second discharge connector 52c arranged at the bottom portions of the tubular bodies 51a and 52a are arranged along a straight line and directed away from each other. The first discharge connector 51c and the second intake connector 52b arranged on the circumferential walls of the tubular bodies 51a and 52a extend parallel to each other in the same direction. When coupling the first and second case members 51 and 52, a circumferential portion 53x of the diaphragm 53 is held between the open end surfaces of the tubular bodies 51a and 52a. The held diaphragm 53 provides a seal between the members 51 and 52 and also defines the first and second valve chambers 51x and 52x.

The diaphragm 53, which is disc-shaped and formed from a flexible material, has a central portion including a cylindrical valve body 53a located at a position opposed to the open portions 51d and 52d of the first intake passage 51y and the second discharge passage 52z. the valve body 53a has a slightly larger diameter than the open portions 51d and 52d.

The diaphragm 53 has a predetermined thickness at the valve body 53a and a predetermined thickness at the circumferential portion 53x. A thin portion 53b that is thinner than the valve body 53a and the circumferential portion 53x extends between the valve body 53a and the circumferential portion 53x. The diaphragm 53 is configured so that the valve body 53a, which is connected by the thin portion 53b to the fixed circumferential portion 53x, is movable. The valve body 53a is moved from a neutral position where the valve body 53a is separated from both of the open portions 51d and 52d of the first intake passage 51y and the second discharge passage 52z to a position where the valve body 53a comes into contact with the open portion 52d of the second discharge passage 52z and is separated from the open portion 51d of the first intake passage 51y or a position where the valve body 53a comes into contact with the open portion 51d of the first intake passage 51y and is separated from the open portion 52d of the second discharge passage 52z.

More specifically, in a primary side valve open state (secondary side valve closed state) in which the valve body 53a closes the open portion 52d of the second discharge passage 52z and opens the open portion 51d of the first intake passage 51y, the first intake passage 51y and the first discharge passage 51z are connected to each other through the first valve chamber 51x. In a secondary side valve open state (primary side valve closed state) in which the valve body 53a closes the open portion 51d of the first intake passage 51y and opens the open portion 52d of the second discharge passage 52z, the second intake passage 52y and the second discharge passage 52z are connected to each other through the second valve chamber 52x. The diaphragm 53 acts to open and close, in a complementary manner, a primary side passage and a secondary side passage.

The check valve 27 is similar to the check valve 25 of the air jet generator 22a. The check valve 27 includes a valve case 27a, a valve body 27b, an urging spring 27c, and a seal ring 27d. An intake passage 27x inside an intake connector 27e and a discharge passage 27y inside a discharge connector 27f are connected to a valve chamber 27z in the valve case 27a. The intake connector 27e is connected to the first discharge connector 51c of the passage switching valve 26 by the connection hose 32e. The discharge connector 27f is connected to an intake connector 28a of the reservoir joint 28 by the connection hose 32f. When the fluid pressure of the fluid from the intake passage 27x becomes greater than or equal to a predetermined pressure, the valve body 27b is moved against the urging force of the urging spring 27c and switched from a valve closing state to a valve opening state so that the check valve 27 outputs the cleaning liquid Ws, which is supplied under pressure via the passage switching valve 26 from the washer pump 13b, toward the reservoir joint 28.

The reservoir joint 28 is, for example, a Y-shaped joint and includes the intake connector 28a, a discharge connector 28b, and a relay connector 28c. In the reservoir joint 28, the discharge connector 28b and the relay connector 28c are arranged along a straight line, and the intake connector 28a extends diagonally near the discharge connector 28b. An intake passage 28x, a discharge passage 28y, and a relay passage 28z inside the intake connector 28a, the discharge connector 28b, and the relay connector 28c are connected to one another. The relay connector 28c is connected to an input/output connector 29e of the chamber 29 by the connection hose 32g, and the discharge connector 28b is connected to the second intake connector 52b of the passage switching valve 26 by the connection hose 32h.

The chamber 29 includes a reservoir case (case member) 29a, a piston 29b, and an urging spring (urging member) 29c. A ring-shaped packing 29d is arranged in the circumferential portion of the piston 29b. The reservoir case 29a, which is cylindrical and has a closed bottom, includes the input/output connector 29e at one of the end surfaces. The piston 29b is accommodated in the reservoir case 29a and movable in the axial direction of the reservoir case 29a. The packing 29d allows the piston 29b to be movable while in contact with the inner wall surface of the reservoir case 29a in a liquid-tight manner. In this manner, the piston 29b inside the reservoir case 29a defines a storage compartment 29y that is connected to an input/output passage 29x inside the input/output connector 29e and is configured to vary the volume of the storage compartment 29y. The other end surface of the reservoir case 29a includes a communication hole 29f that releases the back pressure of the piston 29b to the atmosphere.

In the chamber 29, the piston 29b is moved back against the urging force of the urging spring 29c by the cleaning liquid Ws from the washer pump 13b, which is supplied under pressure by the first discharge connector 51c of the passage switching valve 26. This increases the volume of the storage compartment 29y. Thus, the chamber 29 stores a predetermined amount of the cleaning liquid Ws in the storage compartment 29y. Then, when the pressurized supply of the cleaning liquid Ws is stopped, the urging force of the urging spring 29c pushes the piston 29b and decreases the volume of the storage compartment 29y in the chamber 29. Consequently, the cleaning liquid Ws stored in the storage compartment 29y is discharged toward the second intake connector 52b of the passage switching valve 26 and then ejected from the ejection nozzle 31. The action of the chamber 29 will be described later in further detail together with the action of the passage switching valve 26.

The mixture joint 30 of the mixture outlet 22c, which is, for example, a T-shaped joint, includes the first intake connector 30a and a second intake connector 30b at an intake side and a discharge connector 30c at a discharge side. In the mixture joint 30, the first intake connector 30a and the discharge connector 30c are arranged along a straight line, and the second intake connector 30b is orthogonal to the connectors 30a and 30c. First and second intake passages 30x and 30y inside the first and second intake connectors 30a and 30b and a discharge passage 30z inside the discharge connector 30c are connected to one another. The first intake connector 30a is connected to the air jet generator 22a as described above. The second intake connector 30b is connected by the connection hose 32i to the second discharge connector 52c of the passage switching valve 26 of the cleaning liquid reservoir 22b. The discharge connector 30c is connected to the ejection nozzle 31 by the connection hose 32j.

The ejection nozzles 31 of the first and second cleaning devices 21a and 21b respectively include ejection ports 31a directed toward the sensing surfaces 11a and 12a of the first and second distance measurement sensors 11 and 12 shown in FIG. 1. The predetermined amount of the cleaning liquid Ws, which is supplied to the mixture outlet 22c from the cleaning liquid reservoir 22b, is ejected from the ejection nozzle 31 together with the high-pressure pulsed air jet CA2, which is generated by the valve device 24 and the air pump 23, to spray a suitable range in each of the sensing surfaces 11a and 12a with a gas-liquid fluid mixture X.

As shown in FIG. 1, the air pump 23 of each of the first and second cleaning devices 21a and 21b and the washer pump 13b of the washer device 13 are controlled by various types of electronic control units (ECUs) installed in the vehicle 10, specifically, an upper rank ECU 100, a front side ECU 101, and a rear side ECU 102. The upper rank ECU 100, the front side ECU 101, and the rear side ECU 102 are included in the vehicle cleaning system 20 as controllers of the cleaning system 20. The front side ECU 101 has a functionality of controlling the air pump 23 and the washer pump 13b of the first cleaning device 21a, and the rear side ECU 102 has a functionality of controlling the air pump 23 of the second cleaning device 21b. The upper rank ECU 100 cohesively controls the front side ECU 101 and the rear side ECU 102. In the vehicle cleaning system 20, the first and second cleaning devices 21a and 21b and the washer device 13 are controlled in a cooperative manner.

The operation of the present embodiment will now be described.

Operation of Valve Device 24 as a Single Unit

As shown in FIG. 4, when the valve device 24a is inactive, the valve 40a is completely closed, that is, the valve body 43a of the diaphragm 43 seals the open portion 47a of the intake passage 47.

When the air pump 23 is driven to continuously supply the compressed air CA1, the urging force of the urging spring 44 keeps the valve body 43a closed and thereby increases the pressure P1 (refer to FIG. 11) at the intake side that includes the intake passage 47 of the valve device 24 and the connection hose 32a. As shown in FIG. 3, the intake pressure P1 acts on the valve body 43a at a part having area S1, which is a relatively small part of the open portion 47a in terms of area. The lifting force F1 acting on the valve body 43a is the product of the intake pressure P1 and the area S1, which is $F1=P1 \times S1$. The pressure P1 in the state in which the intake side is closed is increased to be significantly higher than the discharge pressure P0 of the air pump 23. The discharge pressure P0 of the air pump 23 described above is not the discharge pressure when the discharge port of the air pump 23 is fully closed (flow rate of discharge from air pump 23 is null). The discharge pressure P0 of the air pump 23 is the pressure of the connection hose 32a when the air pump 23 is driven with the connection hose 32a directly connecting the air pump 23 and the ejection nozzle 31 (hereafter, simply referred to as "the discharge pressure P0 of the air pump 23").

Figure 5:
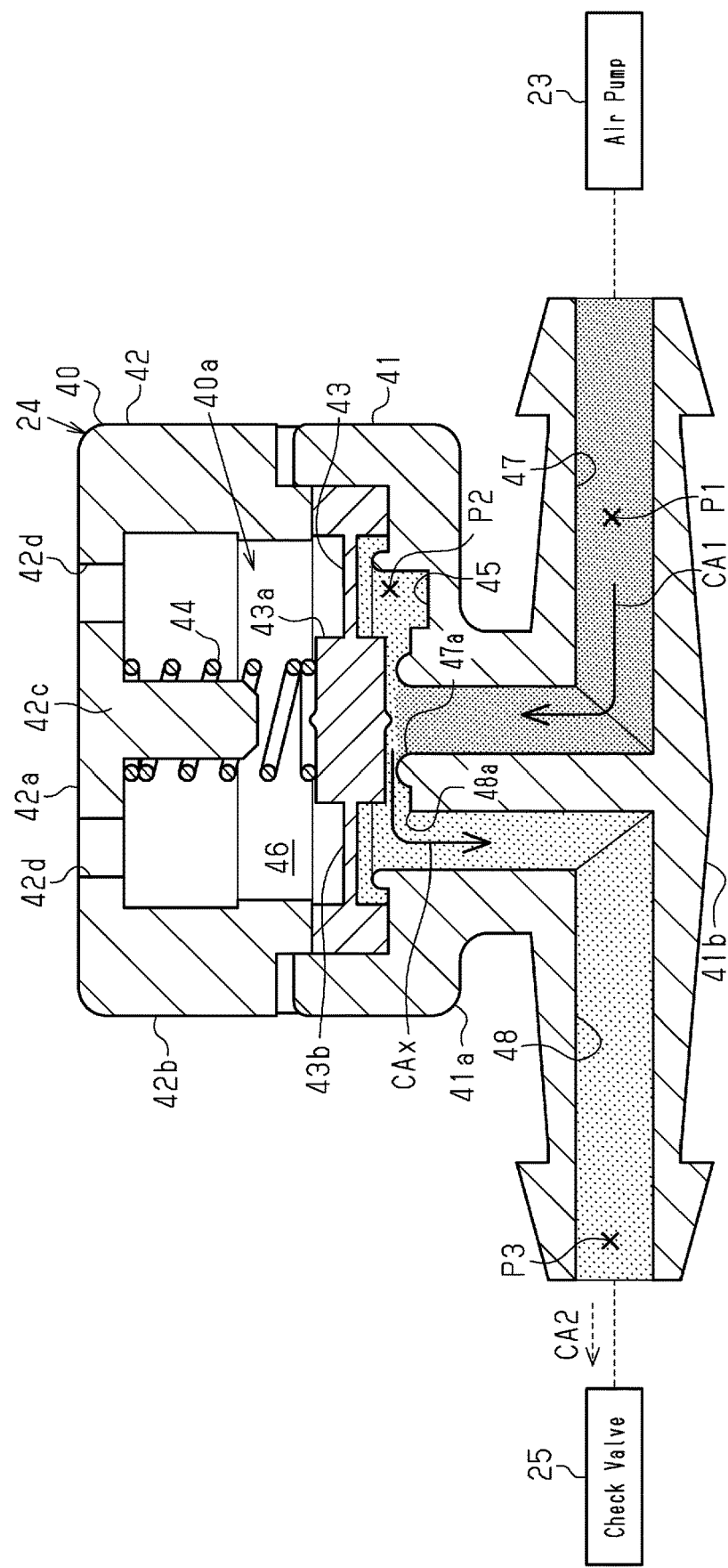
FIG. 5 is a schematic diagram illustrating the action of the valve device in the first and second embodiments.

As the intake pressure P1 increases, a slight gap forms in the valve 40a between the valve body 43a and the open portion 47a as shown in FIG. 5, and some of the compressed air CA1 slightly leaks into the valve chamber 45 as leakage CAx. The valve chamber 45 includes the check valve 25, which is located between the downstream discharge passage 48 and the connection hose 32b. Thus, the pressure P2 of the valve chamber 45 gradually increases. As shown in FIG. 3, the pressure P2 of the valve chamber 45 acts on the thin portion 43b of the diaphragm 43 at a part having area S2, which is a relatively large part corresponding to the area of the entire thin portion 43b (more specifically, including the circumferential portion of the valve bodies 43a) excluding the area of the open portion 47a. The lifting force F2 acting on the thin portion 43b is the product of the pressure P2 of the valve chamber 45 and area S2, which is $F2=P2 \times S2$. The area S2 of the thin portion 43b on which the pressure P2 acts is larger than the area S1 of the valve body 43a on which the pressure P1 acts. Thus, the pressure P2 has a larger effect as the lifting force F2 even though it is lower than the pressure P1.

Figure 6:
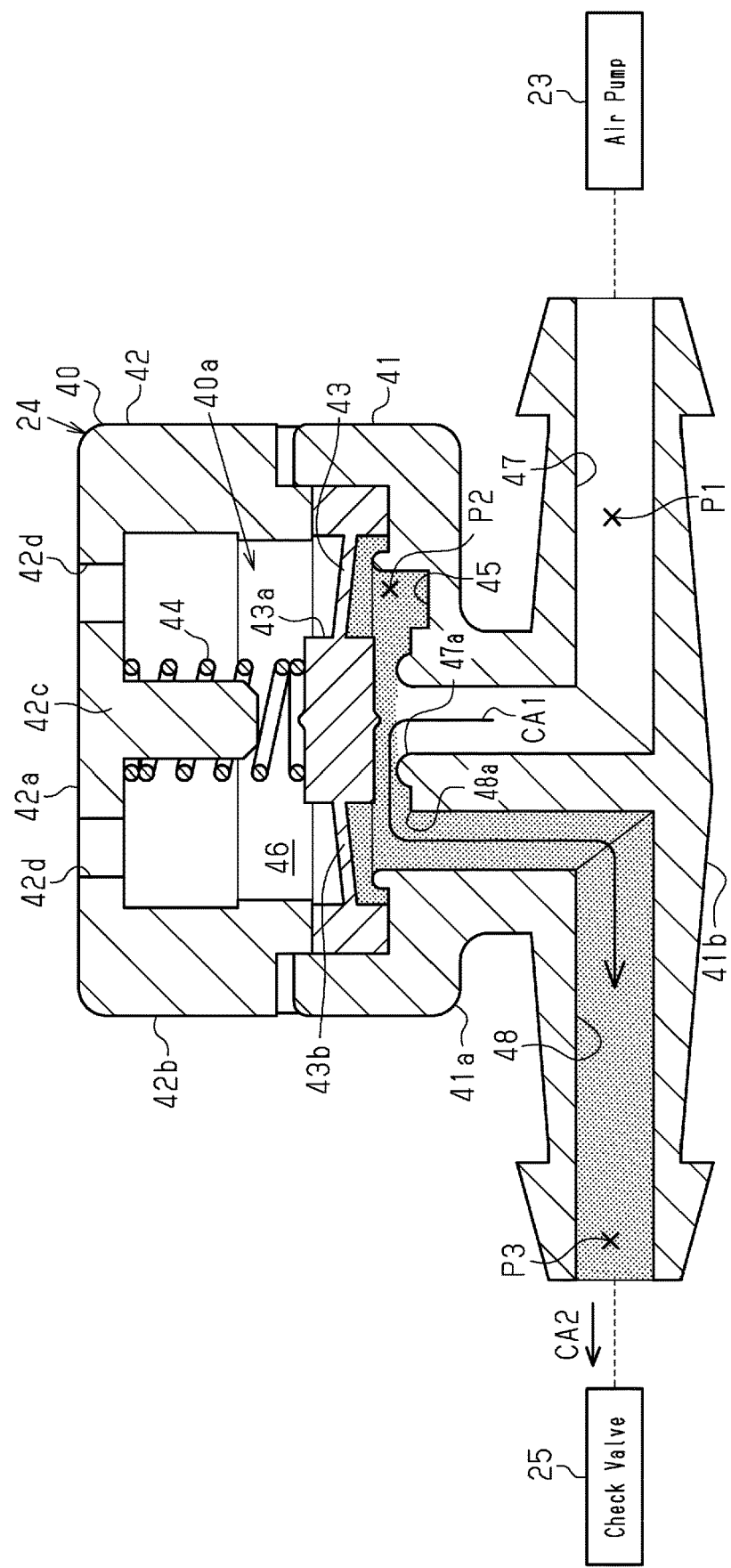
FIG. 6 is a schematic diagram illustrating the action of the valve device in the first and second embodiments.

When the intake pressure P1 and the pressure P2 of the valve chamber 45 both increase to a pressure that is significantly higher than the discharge pressure P0 of the air pump 23, the lifting force "F1+F2" of the diaphragm 43, which is the total of the lifting force F1 acting on the valve body 43a and the lifting force F2 acting on the thin portion 43b become greater than a predetermined lifting force (urging force of urging spring 44). As shown in FIG. 6, this moves the entire diaphragm 43 greatly and opens the valve 40a. That is, the valve body 43a is separated from the open portion 47a. This connects the intake passage 47, the valve chamber 45, and the discharge passage 48. The intake pressure P1 immediately before the valve opens is significantly higher than the discharge pressure P0 of the air pump 23. Thus, when the valve opens, the high-pressure compressed air CA1 in the intake passage 47 suddenly flows through the valve chamber 45 into the discharge passage 48. Consequently, the discharge pressure P3 suddenly increases (refer to FIG. 11), and high-pressure air jet CA2 is output from the discharge passage 48 toward the check valve 25 and further toward the downstream ejection nozzle 31 of the mixture outlet 22c.

In this state, the intake pressure P1 suddenly decreases (refer to FIG. 11) and switches the diaphragm 43 from a state opening the valve to a state closing the valve. In this manner, the pressure P2 of the valve chamber 45 decreases and the predetermined urging force of the urging spring 44 becomes greater than the lifting force "F1+F2" of the diaphragm 43, which is based on the two pressures P1 and P2, and the valve body 43a of the valve 40a closes the open portion 47a of the intake passage 47. As the discharge pressure P3 becomes significantly low, the intake pressure P1 starts to increase again. The intake pressure P1 is increased again until the leakage CAx opens the valve with the diaphragm 43. The actions described above are repeated to generate the high-pressure pulsed air jet CA2 in the air jet generator 22a including the valve device 24 (refer to FIG. 11).

Operation of Vehicle Cleaning System 20

Referring to FIG. 2, when the first and second cleaning devices 21a and 21b of the vehicle cleaning system 20 are inactive, in the valve device 24 of the air jet generator 22a, the valve 40a is closed, with the valve body 43a closing the intake passage 47 (refer to FIG. 4). Further, the check valve 25 of the air jet generator 22a and the check valve 27 of the cleaning liquid reservoir 22b are also closed. In the passage switching valve 26 of the cleaning liquid reservoir 22b, the valve body 53a is located at the neutral position. The chamber 29 is in a state in which the piston 29b is pushed the most, and the cleaning liquid Ws is not stored in the storage compartment 29y.

When foreign matter such as raindrops collect on the sensing surfaces 11a and 12a of the first and second distance measurement sensors 11 and 12 or whenever a predetermined time elapses regardless of whether there is foreign matter, the upper rank ECU 100 issues a cleaning instruction via the front and rear side ECUs 101 and 102 to the corresponding first and second cleaning devices 21a and 21b and drives the air pump 23 of each of the devices 21a and 21b and the washer pump 13b of the washer device 13.

Figure 11:
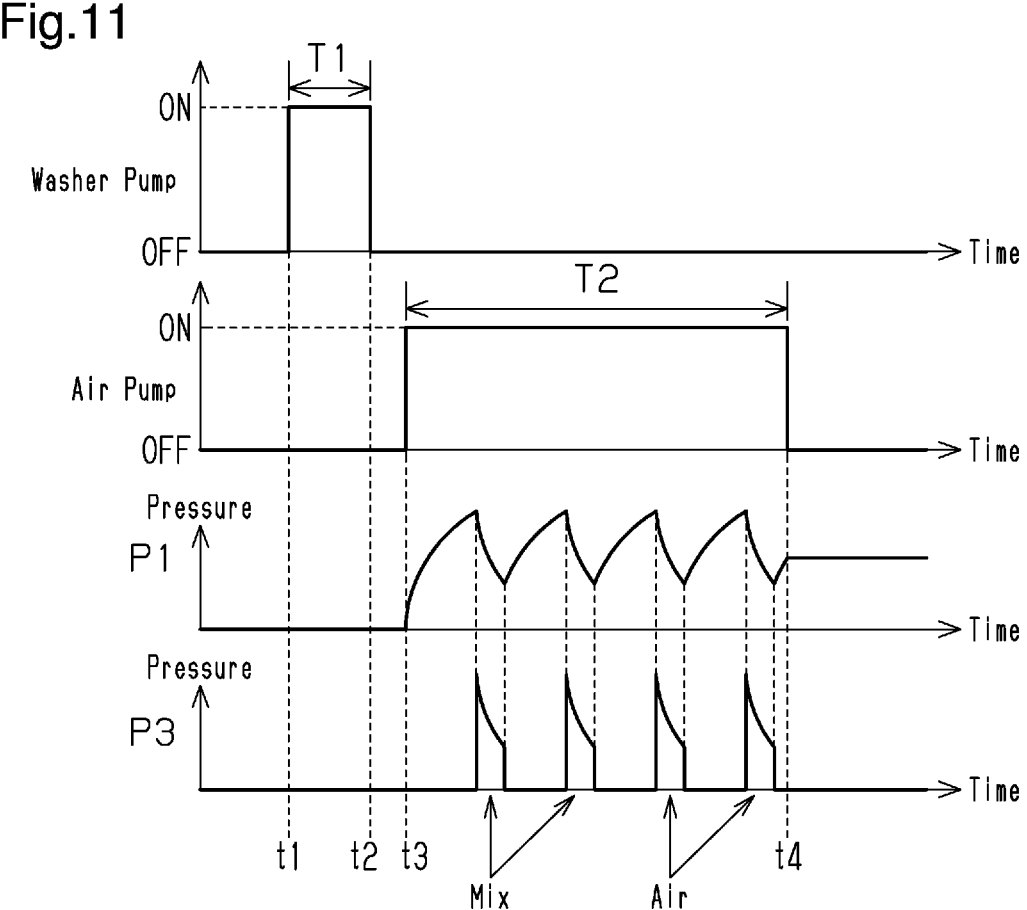
FIG. 11 is a waveform diagram illustrating the action of the cleaning device in accordance with the first and second embodiments.

As shown in FIG. 11, in the present embodiment, for example, the washer pump 13b is first driven for a predetermined period T1. Then, after the washer pump 13b is stopped, the air pump 23 is driven for a predetermined period T2.

Figure 7:
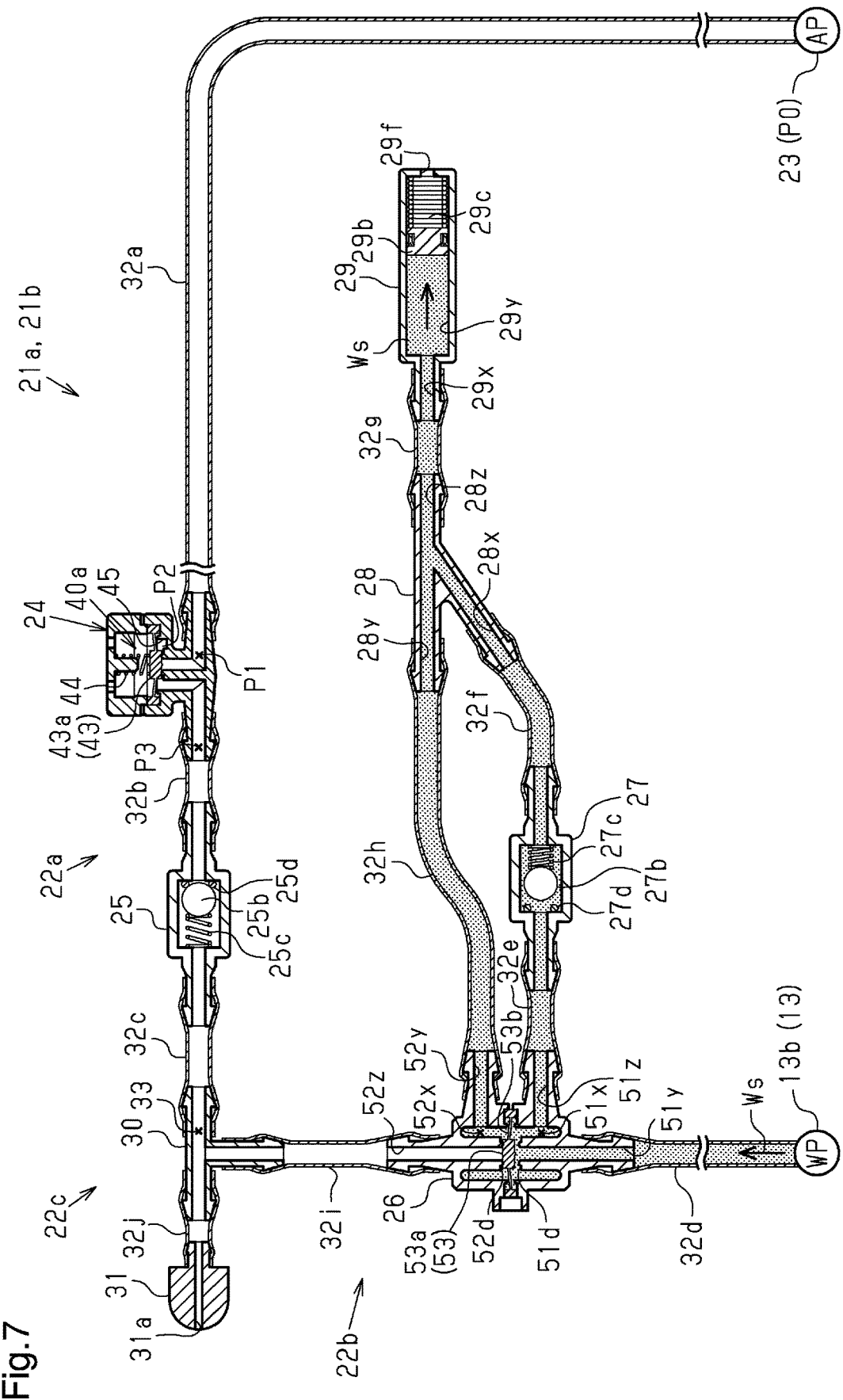
FIG. 7 is a schematic diagram illustrating the action of the cleaning device in accordance with the first embodiment.

More specifically, when a cleaning instruction is issued, the washer pump 13b is driven in the predetermined period T1 from time t1 to time t2. When the washer pump 13b is driven and the cleaning liquid Ws is supplied under pressure from the washer pump 13b as shown in FIG. 7, the diaphragm 53 flexes toward the secondary side in the passage switching valve 26 of the cleaning liquid reservoir 22b. This moves the valve body 53a thereby opening the open portion 51d of the first intake passage 51y and closing the open portion 52d of the second discharge passage 52z. This shifts the passage switching valve 26 to a primary side valve open state. The cleaning liquid Ws that passes through the passage switching valve 26 then opens the check valve 27 and flows via the intake passage 28x and the relay passage 28z of the reservoir joint 28 into the chamber 29. The cleaning liquid Ws that passes through the check valve 27 also flows from the discharge passage 28y of the reservoir joint 28 and enters the second intake passage 52y of the passage switching valve 26.

In the passage switching valve 26, the cleaning liquid Ws flows into the primary side and the secondary side. However, the primary side valve open state is maintained by the balance of the pressure applied at the primary side by the cleaning liquid Ws to the valve body 53a and the thin portion 53b of the diaphragm 53 and the pressure applied at the secondary side by the cleaning liquid Ws to only the thin portion 53b. That is, the secondary side valve closed state is maintained. Thus, in the chamber 29, the cleaning liquid Ws pushes the piston 29b backward against the urging force of the urging spring 29c, and a sufficient amount of the cleaning liquid Ws is stored in the storage compartment 29y and the nearby connection hoses 32h, 32g, and 32f, the second valve chamber 52x of the passage switching valve 26, and the like. Further, since the secondary side valve closed state is maintained, even if the washer pump 13b is continuously driven in a state in which a sufficient amount of the cleaning liquid Ws is stored in the chamber 29, the storage of further cleaning liquid Ws will be restricted. In other words, the washer pump 13b is driven for a period longer than the minimal period required to store the amount of cleaning liquid Ws that can cope with changes in the ambient temperature, the drive voltage, the viscosity of the cleaning liquid Ws, and the like resulting from the present circumstance.

Figure 8:
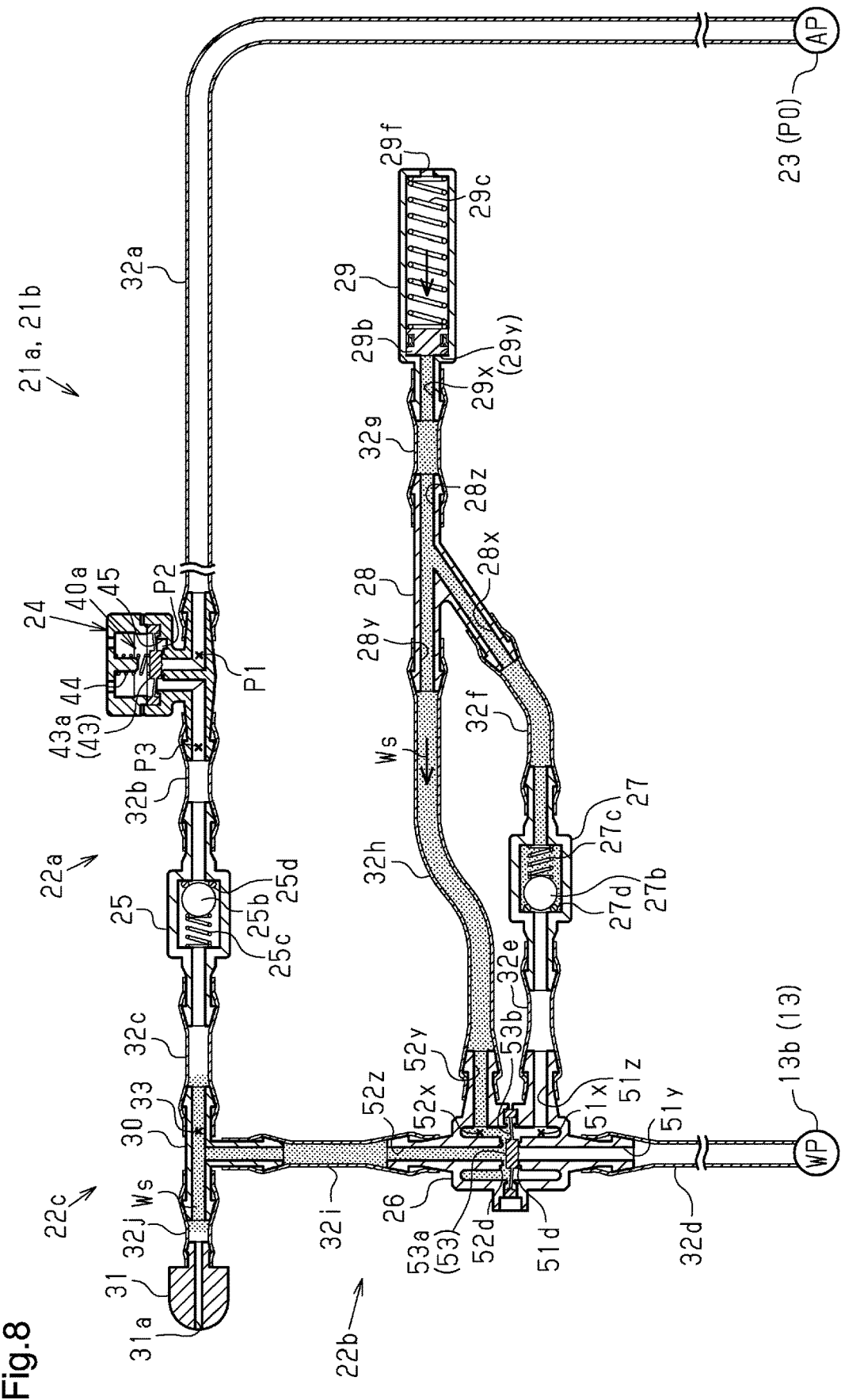
FIG. 8 is a schematic diagram illustrating the action of the cleaning device in accordance with the first embodiment.

Then, referring to FIG. 8, when the washer pump 13b stops, the pressurized supply of the cleaning liquid Ws is stopped with the check valve 27 in a closed state. More specifically, as viewed from the chamber 29, the passage switching valve 26 switches from a state in which the primary side passage and secondary side passage are both open to a state in which the primary side passage of the passage switching valve 26 is closed and the secondary side passage is open. In the chamber 29, the piston 29b, which receives the urging force of the urging spring 29c, starts a pushing action. In the passage switching valve 26, the supplying pressure of the cleaning liquid Ws becomes null at the primary side, while the pushing action of the piston 29b in the chamber 29 produces supplying pressure of the cleaning liquid Ws at the secondary side. This switches the passage switching valve 26 to a secondary side valve open state. More specifically, in the passage switching valve 26, the diaphragm 53 flexes toward the primary side. Thus, the valve body 53a moves and closes the open portion 51d of the first intake passage 51y and opens the open portion 52d of the second discharge passage 52z. This shifts the passage switching valve to a secondary side valve open state and a primary side valve closed state.

As a result of these actions, the cleaning liquid Ws pushed out of the chamber 29 does not return to the primary side of the passage switching valve 26 because of the check valve 27 and is sent from the secondary side of the passage switching valve 26 to the mixture outlet 22c. In this case, a mixture passage 33 including an intake passage 30x and the discharge passage 30z of the mixture joint 30 is filled with a predetermined amount of the cleaning liquid Ws and stands by for the supply of the air jet CA2 from the air jet generator 22a. In this manner, the washer pump 13b of the present embodiment is driven to start filling the mixture passage 33 with the cleaning liquid Ws and is not used for the purpose of directly ejecting the cleaning liquid Ws from the ejection nozzle 31 to clean off foreign matter. This allows the drive period, the drive power, and the like to be reduced and minimizes the amount of the cleaning liquid Ws that is used. The amount of the cleaning liquid Ws that the mixture passage 33 is filled with can easily be set by, for example, changing the size of the storage compartment 29y in the chamber 29.

Figure 9:
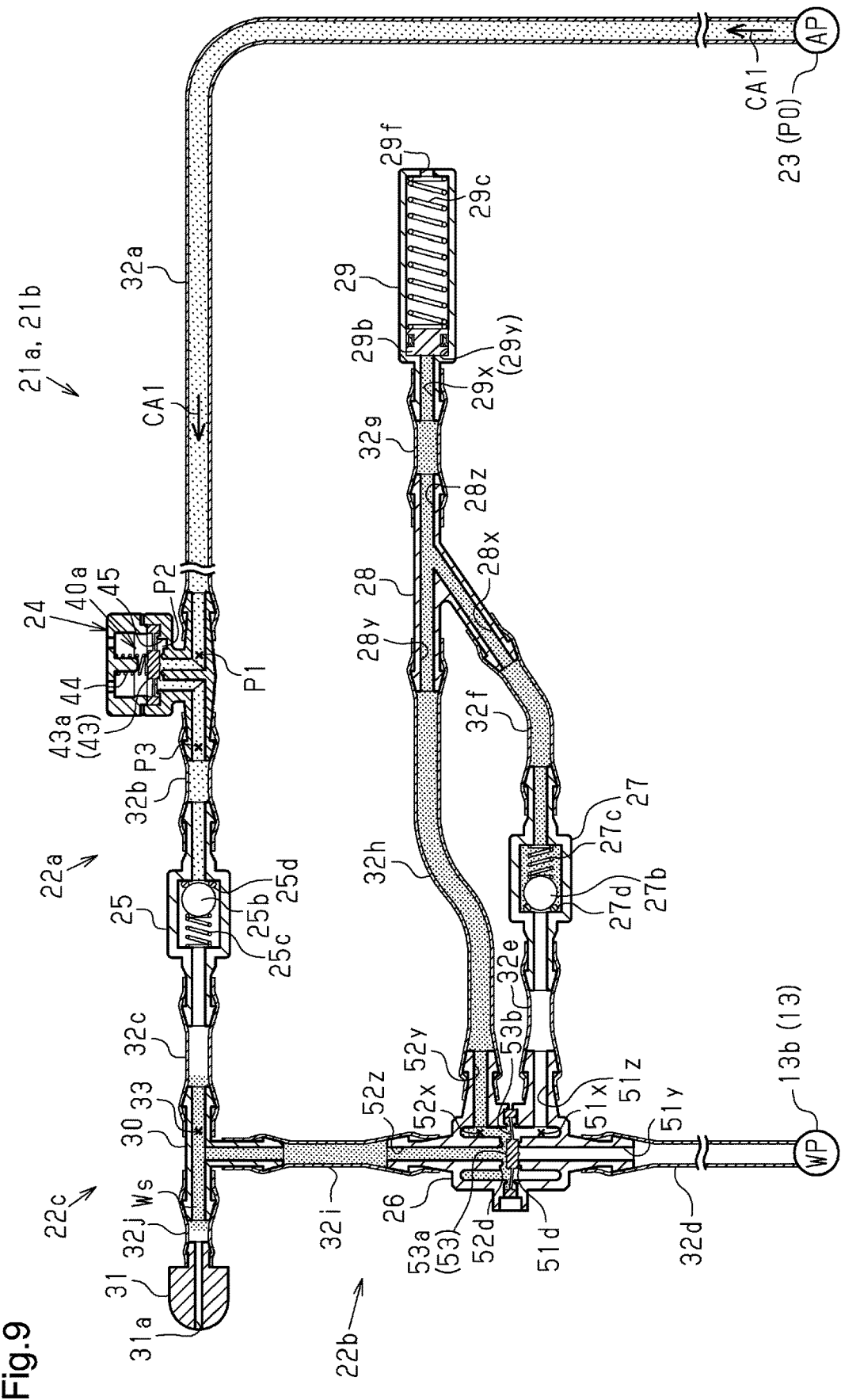
FIG. 9 is a schematic diagram illustrating the action of the cleaning device in accordance with the first embodiment.
Figure 10:
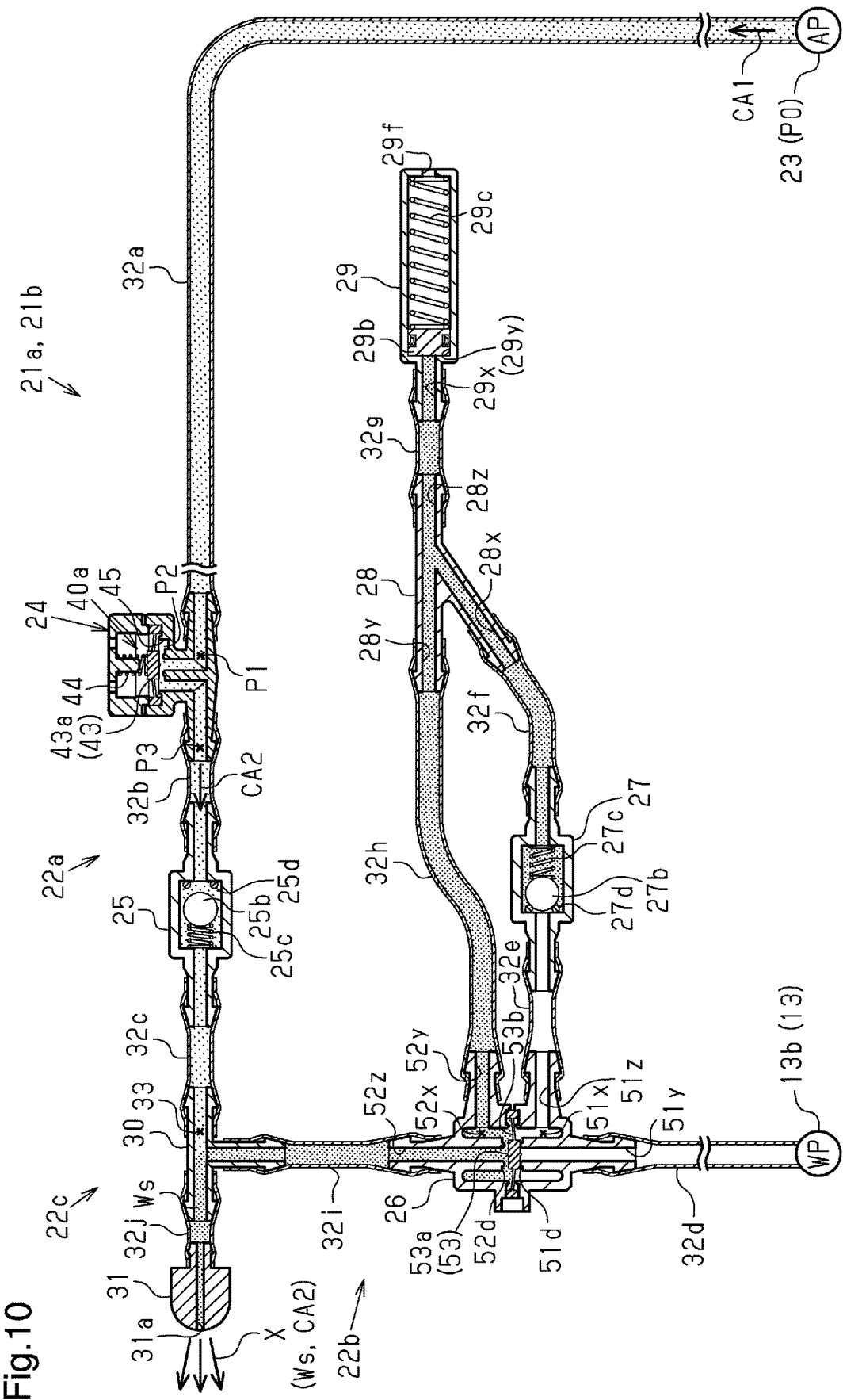
FIG. 10 is a schematic diagram illustrating the action of the cleaning device in accordance with the first embodiment.

Then, as shown in FIG. 11, the air pump 23 is driven after the washer pump 13b is stopped for the predetermined period T2 from time t3 to time t4. When the air pump 23 is driven and the compressed air CA1 is supplied from the air pump 23, the valve device 24 performs the actions shown in FIGS. 4 to 6 and generates the pulsed air jet CA2 at a higher pressure than the discharge pressure P0 of the air pump 23. FIG. 9 shows a state prior to a full valve open state shown in FIG. 5 in which the air pump 23 is driven and the valve device 24 is increasing the compressed air CA1 to a pressure that is significantly higher than the discharge pressure P0 of the air pump 23. FIG. 10 shows a state in which the valve device 24 is in a full valve open state shown in FIG. 6 and air of a pressure that is significantly higher than the discharge pressure P0 of the air pump 23 is output as the air jet CA2. The high-pressure pulsed air jet CA2, which is generated by repeating the above actions with the valve device 24, flows via the check valve 25 into the mixture outlet 22c.

In this state, the mixture passage 33 of the mixture outlet 22c shown in FIG. 10 is filled with the cleaning liquid Ws. Thus, when the high-pressure pulsed air jet CA2 flows into the mixture passage 33, the air jet CA2 is mixed with the cleaning liquid Ws, which is atomized by the air jet CA2, into the gas-liquid fluid mixture X that is ejected from the ejection port 31a of the ejection nozzle 31. The sensing surfaces 11a and 12a of the first and second distance measurement sensors 11 and 12 shown in FIG. 1 are sprayed with the gas-liquid fluid mixture X, which is a mixture of the cleaning liquid Ws and the air jet CA2.

In the present embodiment, the sensing surfaces 11a and 12a are sprayed with the high-pressure air jet CA2 and the cleaning liquid Ws, which is atomized by the air jet CA2, at a higher speed than when spraying only the cleaning liquid Ws or only the air jet CA2. This effectively cleans off foreign matter such as raindrops from the sensing surfaces 11a and 12a and allows the distance measurement accuracy to be maintained at a satisfactory level. Moreover, the air jet CA2 is generated at a pressure that is significantly higher than the discharge pressure P0 of the air pump 23. This allows for the use of a compact air pump 23.

The advantages of the present embodiment will now be described.

(1) The cleaning devices 21a and 21b of the vehicle cleaning system 20 in accordance with the present embodiment generates the high-pressure pulsed air jet CA2 in the air jet generator 22a with the valve device 24 by accumulating the pressure of the compressed air CA1 supplied from the air pump 23 to a pressure higher than the discharge pressure P0 of the air pump 23 and discharging the compressed air CA1 subsequent to the pressure accumulation toward the downstream side. Thus, the air jet CA2 that improves the foreign matter removal capability can be generated without increasing the size of the air pump 23. The cleaning liquid reservoir 22b and the mixture outlet 22c mixes the high-pressure pulsed air jet CA2, which is generated by the air jet generator 22a, with the cleaning liquid Ws to spray the sensing surfaces 11a and 12a of the distance measurement sensors 11 and 12 with the gas-liquid fluid mixture X, which is a mixture of the high-pressure pulsed air jet CA2 and the atomized cleaning liquid Ws. This allows foreign matter to be removed from the sensing surfaces 11a and 12a with a small amount of the cleaning liquid Ws. Further, the cleaning liquid Ws, which is mixed with the air jet CA2, is temporarily stored in the cleaning liquid reservoir 22b before being supplied for cleaning. Thus, in comparison with when the cleaning liquid Ws is directly supplied from the washer pump 13b, a small amount of the cleaning liquid Ws is stably supplied in an amount that is small but sufficient for cleaning. In the present embodiment, since only a small amount of the cleaning liquid Ws is used, the washer pump 13b is driven for only a short period. This may hinder stable supply of the cleaning liquid Ws whenever the ambient temperature, the drive voltage, the viscosity of the cleaning liquid Ws, and the like change. In this respect, the cleaning liquid Ws is first stored in the chamber 29 thereby absorbing the effect of such changes. Thus, the same amount of the cleaning liquid Ws is always supplied. This improves the stability of the cleaning force.

(2) In the air jet generator 22a, the valve 40a of the valve device 24 closes the intake passage 47 of the compressed air CA1 with the valve body 43a and accumulates the compressed air CA1 supplied from the air pump 23 until the pressure becomes higher than the discharge pressure P0 of the air pump 23. Further, the valve 40a and the check valve 25 function as an auxiliary mechanism that generates leakage CAx of the compressed air CA1 from the intake passage 47 during pressure accumulation at a leaked side (valve chamber 45 etc.) during pressure accumulation. Then, when the two pressures P1 and P2 accumulated in the intake passage 47 and the leaked side (valve chamber 45 etc.) open the valve body 43a, the pressure-accumulated compressed air CA1 is output from the intake passage 47 to the discharge passage 48. Subsequently, the valve body 43a is closed to accumulate pressure again in the intake passage 47. In this manner, the air pump 23, the valve device 24, and the check valve 25 generate the high-pressure pulsed air jet CA2.

(3) The chamber 29 of the cleaning liquid reservoir 22b has a simple structure of the reservoir case 29a, the piston 29b, and the urging spring 29c. Further, the urging force of the urging spring 29c in the chamber 29 is used to discharge the cleaning liquid Ws. As long as the chamber 29 is used as a passage for the cleaning liquid Ws, the chamber 29 otherwise has a high level of independence allowing for a high degree of arrangement freedom.

(4) The passage switching valve 26 including the cleaning liquid reservoir 22b is a single valve configured to open and close, in a complementary manner, a primary passage between the washer pump 13b and the chamber 29, and a secondary passage between the chamber 29 and the mixture outlet 22c, with the same diaphragm 53. Further, the cleaning liquid reservoir 22b switches passages, when the cleaning liquid Ws is supplied from the washer pump 13b and when the supply is stopped and the cleaning liquid Ws is discharged from the chamber 29, with a simple structure including the two valves of the passage switching valve 26 and the check valve 27.

(5) The check valve 25 is located at the downstream side of the valve device 24 of the air jet generator 22a. This ensures pressure accumulation (increase of pressure P2) at the downstream side of the valve 40a.

(6) Control is executed so that the period T2, during which the air pump 23 is driven, ends later than the period T1, during which the washer pump 13b is driven. If the cleaning liquid Ws were to remain on the sensing surfaces 11a and 12a, by ending the driving of the air pump 23 after ending the driving of the washer pump 13b, the sensing surfaces 11a and 12a can be sprayed later with only the air jet CA2. This reduces the cleaning liquid Ws that is left on the sensing surfaces 11a and 12a.

Second Embodiment

A system and method for cleaning a vehicle in accordance with a second embodiment will now be described. The present embodiment differs slightly from the first embodiment in the structure of the chamber 29 in the first and second cleaning devices 21a and 21b. The description hereafter will focus on the differences.

Figure 12:
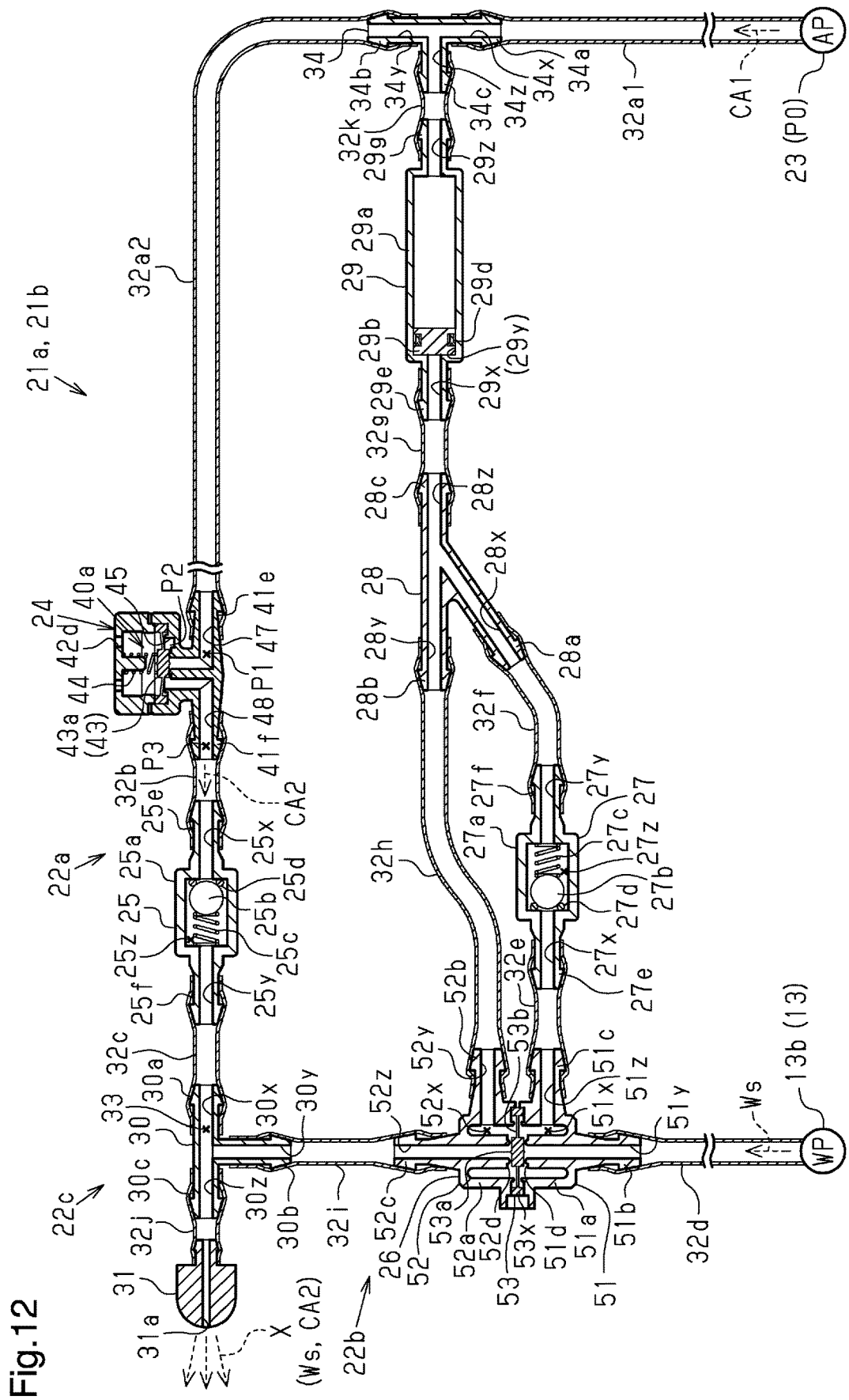
FIG. 12 is a schematic diagram of a cleaning device used in the vehicle cleaning system in accordance with the second embodiment.

As shown in FIG. 12, the chamber 29 does not include the urging spring 29c and includes an air intake connector 29g at the other end surface of the reservoir case 29a, and the action resulting from the urging force of the urging spring 29c is replaced by the action resulting from the pressure of the compressed air CA1 sent from the air pump 23. An intake passage 29z inside the air intake connector 29g is connected to an open space at a back side of the piston 29b, which is located at a side of the piston 29b opposite to where the storage compartment 29y stores the cleaning liquid Ws.

Further, an air branch joint 34, which is formed by a T-shaped joint, connects the chamber 29 to a flow passage of the compressed air CA1 between the air pump 23 and the valve device 24. The air branch joint 34 includes an intake connector 34a and first and second discharge connectors 34b and 34c. The intake connector 34a and the first discharge connector 34b lie along a straight line, and the second discharge connector 34c is orthogonal to the straight line. An intake passage 34x inside the intake connector 34a is connected to first and second discharge passages 34y and 34z inside the first and second discharge connectors 34b and 34c. The connection hose 32a used in the first embodiment to connect the air pump 23 and the valve device 24 is divided into two, connection hoses 32a1 and 32a2. The intake connector 34a is connected by the connection hose 32a1 to the air pump 23, and the first discharge connector 34b is connected by the connection hose 32a2 to the valve device 24. The second discharge connector 34c is connected by a connection hose 32k to the air intake connector 29g of the chamber 29. The connection hoses 32a1, 32a2, and 32k are also rubber hoses or the like and formed from a flexible material.

The operation of the present embodiment will now be described.

Operation of Vehicle Cleaning System 20

As shown in FIG. 11, in the present embodiment, for example, the washer pump 13b is first driven for a predetermined period T1. Then, after the washer pump 13b is stopped, the air pump 23 is driven for a predetermined period T2.

Figure 13:
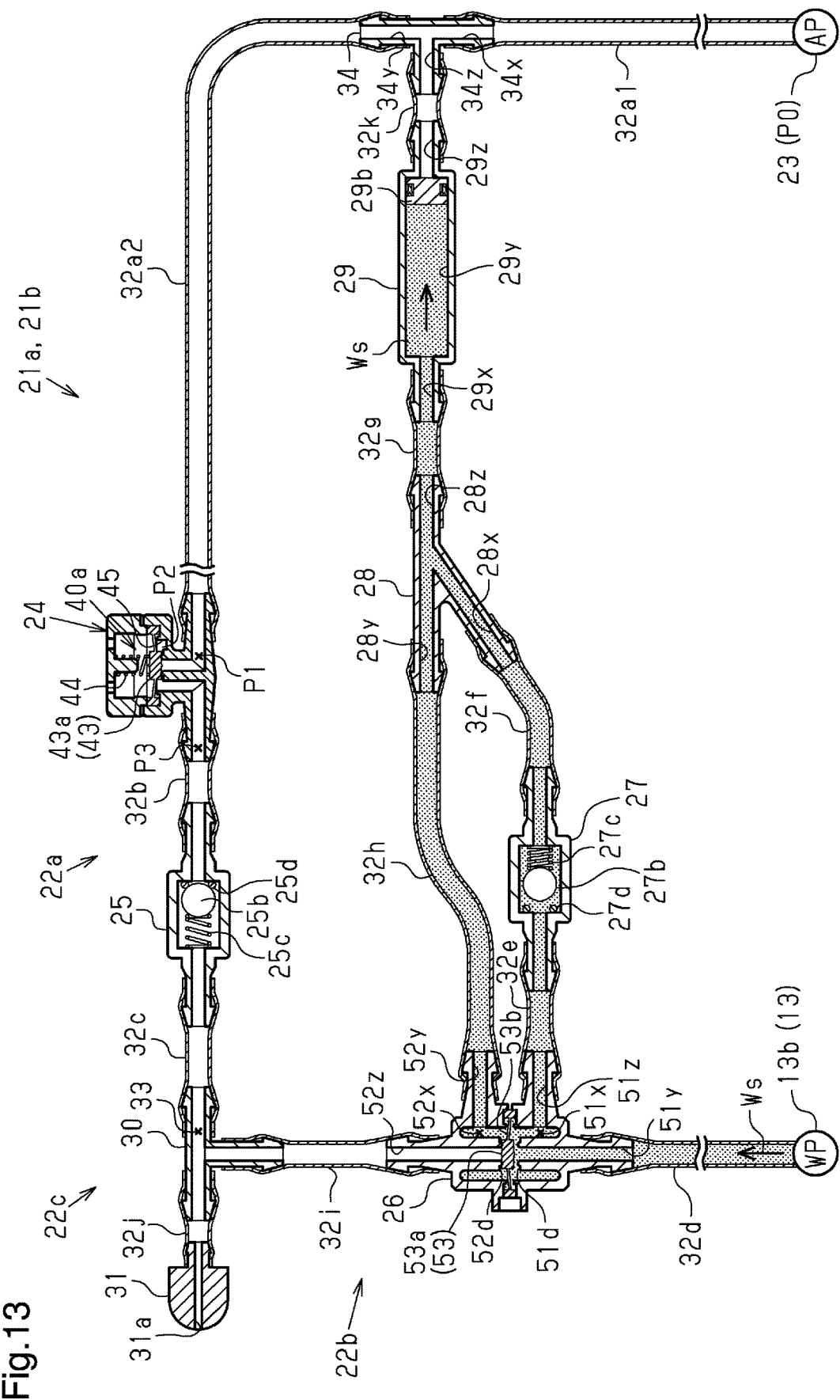
FIG. 13 is a schematic diagram illustrating the action of the cleaning device in accordance with the second embodiment.

When the washer pump 13b is driven and the cleaning liquid Ws is supplied under pressure from the washer pump 13b as shown in FIG. 13, the diaphragm 53 flexes toward the secondary side in the passage switching valve 26 of the cleaning liquid reservoir 22b. This shifts the passage switching valve 26 to a primary side valve open state and maintains the secondary side valve closed state in the same manner as the first embodiment. The cleaning liquid Ws that passes through the passage switching valve 26 flows via the check valve 27 and the reservoir joint 28 into the chamber 29. In the chamber 29, the cleaning liquid Ws pushes the piston 29b backward, and a sufficient amount of the cleaning liquid Ws is stored in the storage compartment 29y and the nearby connection hoses 32h, 32g, and 32f, the second valve chamber 52x of the passage switching valve 26, and the like. The storage compartment 29y of the chamber 29 can be enlarged by an amount corresponding to the omitted urging spring 29c. Thus, the chamber 29 can be reduced in size even if the stored amount of the cleaning liquid Ws is increased or is the same as the first embodiment. There is no urging spring 29c that applies an urging force when the piston 29b is moved backward. Thus, the pressure required for the backward movement is small.

Figure 14:
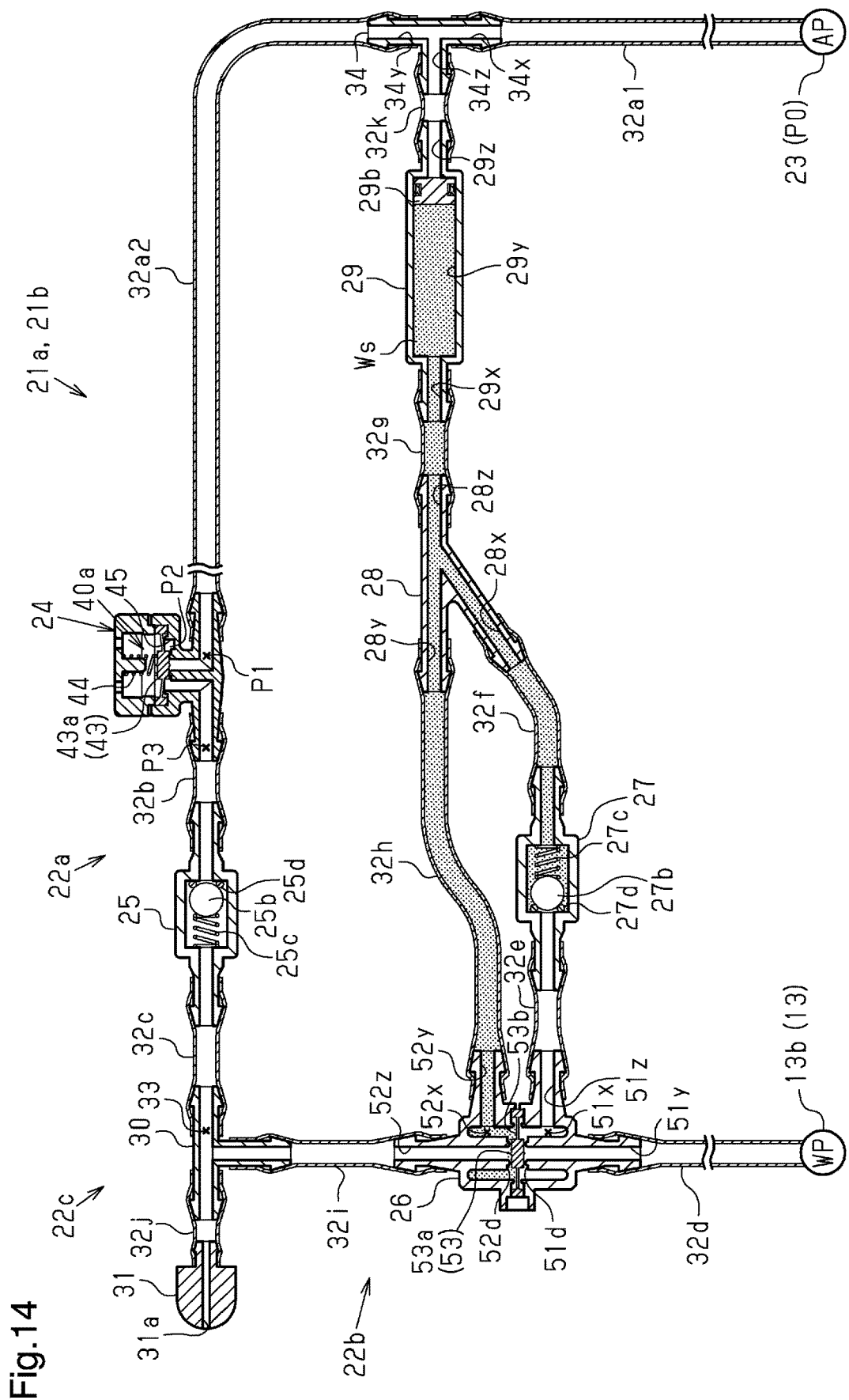
FIG. 14 is a schematic diagram illustrating the action of the cleaning device in accordance with the second embodiment.

Then, referring to FIG. 14, when the washer pump 13b stops, the pressurized supply of the cleaning liquid Ws is stopped with the check valve 27 in a closed state in the same manner as the first embodiment. Since the urging spring 29c is omitted from the chamber 29 of the present embodiment and the piston 29b is later moved by the pressure of the compressed air CA1 from the air pump 23, a pushing action of the piston 29b does not occur at the present point. This differs from the above embodiment. Further, in the passage switching valve 26, the supplying pressure of the cleaning liquid Ws becomes null at the primary side and the supplying pressure of the cleaning liquid Ws from the chamber 29 does not act at the secondary side. Thus, for example, the diaphragm 53 returns to its original form. This moves the valve body 53a to a neutral position. In this case, a slight gap forms between the valve body 53a and the open portion 52d of the second discharge passage 52z. However, the cleaning liquid Ws does not greatly leak from the second valve chamber 52x into the second discharge passage 52z.

Figure 15:
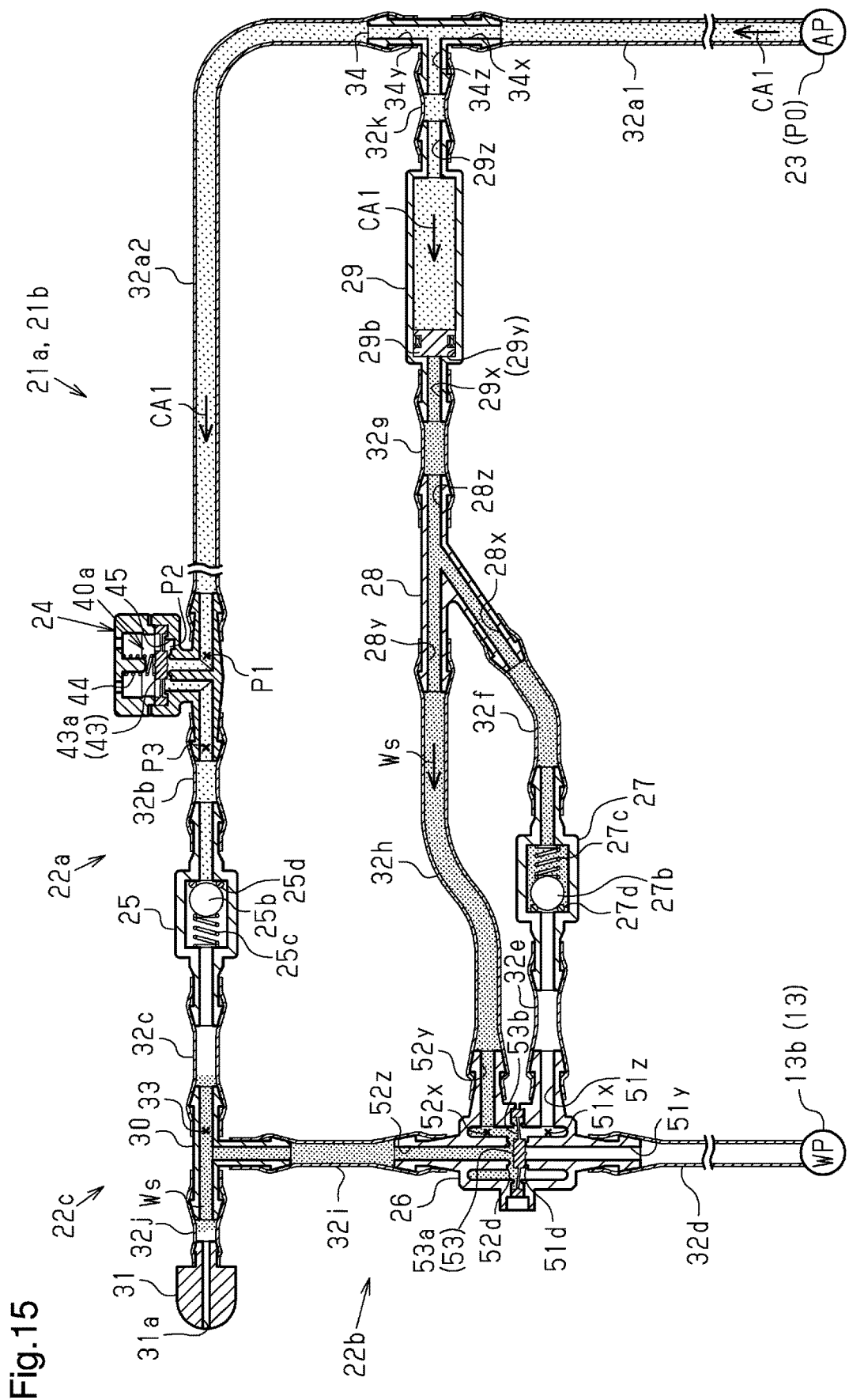
FIG. 15 is a schematic diagram illustrating the action of the cleaning device in accordance with the second embodiment.
Figure 16:
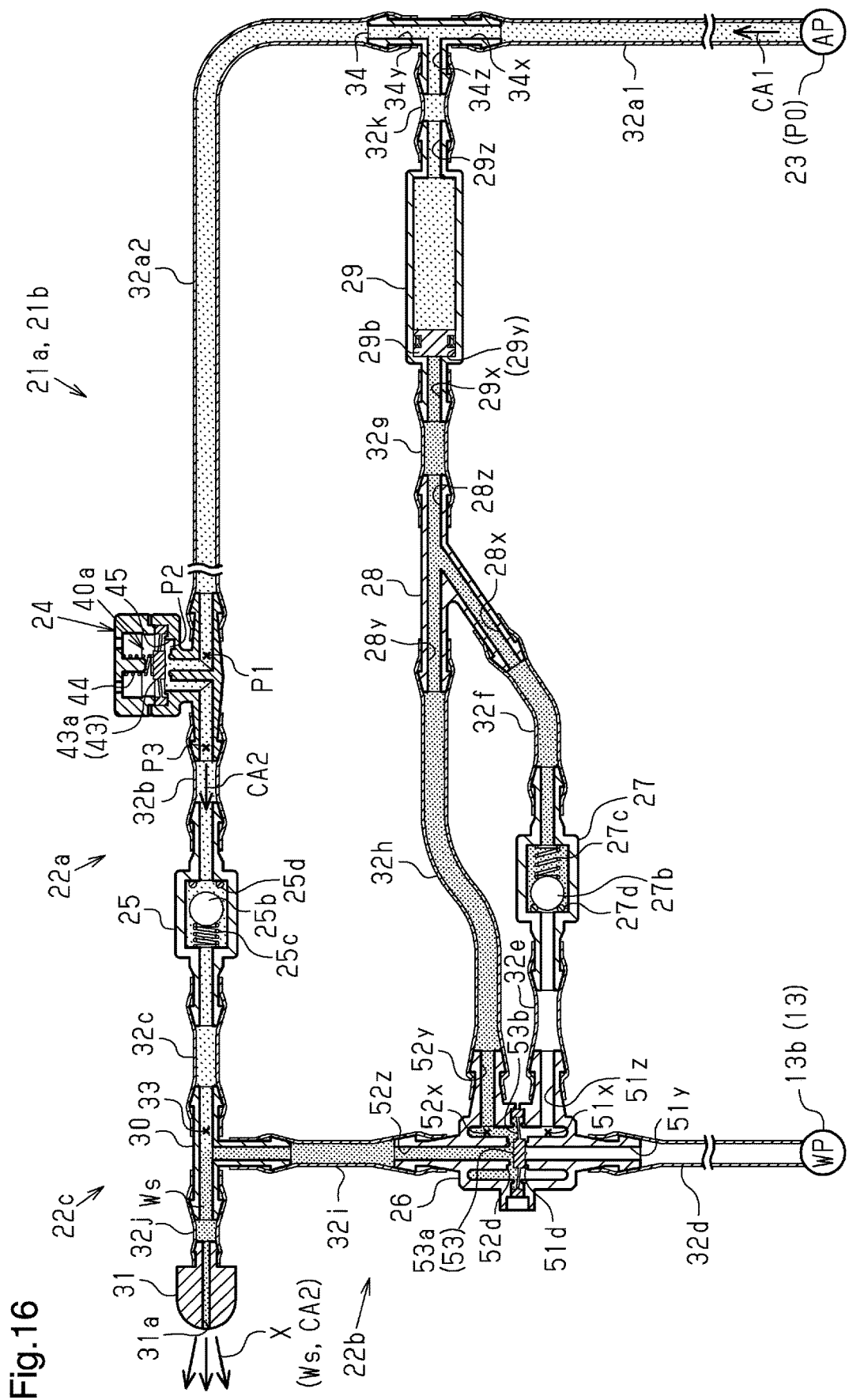
FIG. 16 is a schematic diagram illustrating the action of the cleaning device in accordance with the second embodiment.

Then, when the air pump 23 is driven and the compressed air CA1 is supplied from the air pump 23, the valve device 24 performs the actions shown in FIGS. 4 to 6 and generates the pulsed air jet CA2 at a higher pressure than the discharge pressure P0 of the air pump 23 in the same manner as the first embodiment. FIG. 15 shows a state prior to a full valve open state shown in FIG. 5 in which the air pump 23 is driven and the valve device 24 is increasing the compressed air CA1 to a pressure that is significantly higher than the discharge pressure P0 of the air pump 23. FIG. 16 shows a state in which the valve device 24 is in a full valve open state shown in FIG. 6 and air of a pressure that is significantly higher than the discharge pressure P0 of the air pump 23 is output as the air jet CA2. The high-pressure pulsed air jet CA2, which is generated by repeating the above actions with the valve device 24, flows via the check valve 25 into the mixture outlet 22c.

Further, as shown in FIG. 15, some of the compressed air CA1 from the air pump 23 is supplied to the chamber 29 to push the piston 29b. When the pushing action of the piston 29b starts, the supplying pressure of the cleaning liquid Ws produced by the pushing action switches the passage switching valve 26 to a secondary side valve open state. As a result, a predetermined amount of the cleaning liquid Ws flows from the secondary side of the passage switching valve 26 into the mixture passage 33 of the mixture outlet 22c.

As shown in FIG. 16, when the high-pressure pulsed air jet CA2 flows into the mixture passage 33, the air jet CA2 is mixed with the cleaning liquid Ws, which is atomized by the air jet CA2, into the gas-liquid fluid mixture X that is ejected from the ejection nozzle 31 in the same manner as the first embodiment. Thus, foreign matter is also effectively cleaned off from the sensing surfaces 11a and 12a of the distance measurement sensors 11 and 12 shown in FIG. 1 in the present embodiment.

The advantages of the present embodiment will now be described.

(1) The present embodiment has advantages (1), (2), and (4) to (6) of the first embodiment.

(2) The chamber 29 of the cleaning liquid reservoir 22b in the present embodiment uses the reservoir case 29a and the piston 29b to discharge the stored cleaning liquid Ws with some of the compressed air CA1 from the air pump 23. This allows the urging spring 29c to be omitted and simplifies the structure.

Third Embodiment

A vehicle cleaning system in accordance with a third embodiment will now be described. The present embodiment differs from the first embodiment in the structure and operation of the cleaning liquid reservoir 22b in the first and second cleaning devices 21a and 21b. The description hereafter will focus on the differences.

Figure 17:
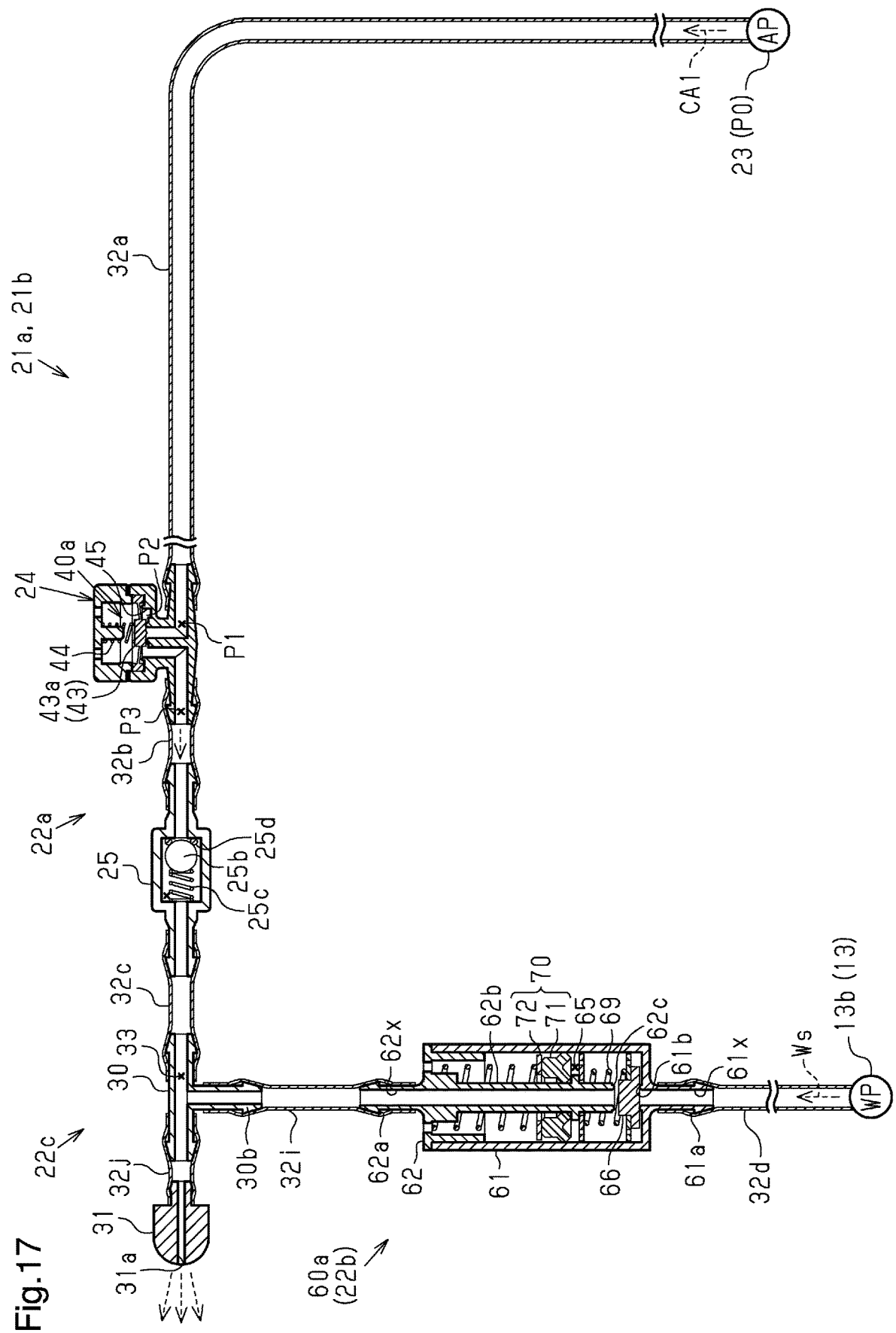
FIG. 17 is a schematic diagram of a cleaning device used in a vehicle cleaning system in accordance with a third embodiment.

The cleaning liquid reservoir 22b of the first embodiment shown in FIG. 2 is formed by connecting the components of the passage switching valve 26, the check valve 27, the reservoir joint 28, and the chamber 29 with the connection hoses 32e, 32f, 32g, and 32h. In contrast, in the cleaning liquid reservoir 22b of the present embodiment shown in FIGS. 17 and 18, a single unit having the same functions as the cleaning liquid reservoir 22b of the first embodiment forms a cleaning liquid reservoir device (cleaning liquid reservoir) 60a.

Figure 18:
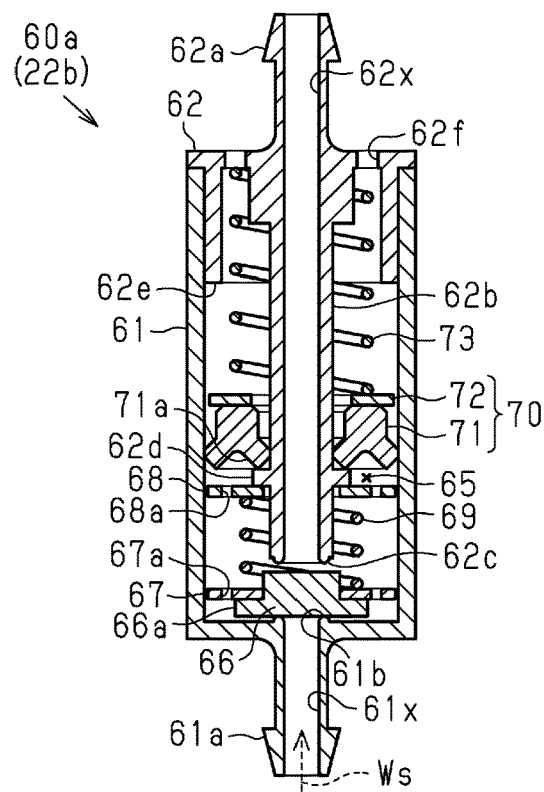
FIG. 18 is a schematic diagram of a cleaning liquid reservoir device used in the third embodiment.

More specifically, as shown in FIG. 18, the cleaning liquid reservoir device 60a of the present embodiment includes a case body 61, which is cylindrical and has a closed bottom, and a lid member 62, which closes the open portion of the case body 61. The case body 61 includes an intake connector 61a at a bottom central part, and the lid member 62 includes a discharge connector 62a at a central part. The intake connector 61a and the discharge connector 62a extend away from each other in the axial direction of the case body 61. The intake connector 61a is connected to the connection hose 32d extending from the washer pump 13b, and the discharge connector 62a is connected to the second intake connector 30b of the mixture joint 30.

An intake passage 61x inside the intake connector 61a is connected to a storage compartment 65 defined in the case body 61 by a piston 70, which will be described later. The discharge passage 62x inside the discharge connector 62a is connected through an inner tube 62b, which extends from the inner central part of the lid member 62 to near the bottom of the case body 61, to the storage compartment 65. The inner tube 62b (discharge passage 62x) has an open portion 62c, and the intake passage 61x has an open portion 61b. A valve body 66, which is formed by a substantially disc-shaped rubber sheet, is arranged in a movable manner between the open portions 62c and 61b.

The valve body 66 includes a flange 66a. A washer 67 is attached to the valve body 66 in contact with the surface of the flange 66a that is faced toward the discharge connector 62a. Further, a washer 68 is attached to the distal end of the inner tube 62b. The washers 67 and 68, which have the same structure, are ring-shaped and respectively include through holes 67a and 68a. The washer 68 contacts the surface of an engagement portion 62d, which is arranged on the outer circumferential surface of the distal portion of the inner tube 62b, that is faced toward the intake connector 61a. An urging spring 69 is disposed between the washers 67 and 68. The urging spring 69 urges the valve body 66 from the washer 68, which is engaged with the engagement portion 62d of the inner tube 62b, and through the washer 67.

The piston 70 is ring-shaped and fitted around the inner tube 62b in an open space located toward the discharge connector 62a from the washer 68. The piston 70 includes a ring-shaped rubber seal 71 and a washer 72 arranged on a portion of the rubber seal 71 that is faced toward the discharge connector 62a. An urging spring 73 is arranged around the inner tube 62b and disposed between the washer 72 of the piston 70 and the lid member 62. The urging spring 73 urges the piston 70 toward the washer 68. That is, the urging spring 73 urges the piston 70 toward the cleaning liquid Ws that flows through the through hole 68a of the washer 68 (refer to FIG. 19A). In the vertical cross section (axial cross section) of the rubber seal 71 that forms the piston 70, a pressure receiving portion 71a, which receives the pressure of the cleaning liquid Ws, is bifurcated toward the washer 68 and has the shape of the letter Y arranged upside-down. The pressure receiving portion 71a contacts the inner circumferential surface of the case body 61 and the outer circumferential surface of the inner tube 62b to restrict leakage of the cleaning liquid Ws while receiving the pressure of the cleaning liquid Ws.

Under a situation in which the washer pump 13b is not acting to send the cleaning liquid Ws into the open portion 61b of the intake passage 61x, the valve body 66 receives the urging force of the urging spring 69 and closes the open portion 61b of the intake passage 61x. This is an open state in which the open portion 62c of the inner tube 62b is not closed by the valve body 66. Further, the piston 70 receives the urging force of the urging spring 73 and is arranged at a position where the pressure receiving portion 71a contacts the engagement portion 62d of the inner tube 62b. In this case, the volume of the storage compartment 65 defined by the piston 70 is the minimum.

Figure 19A:
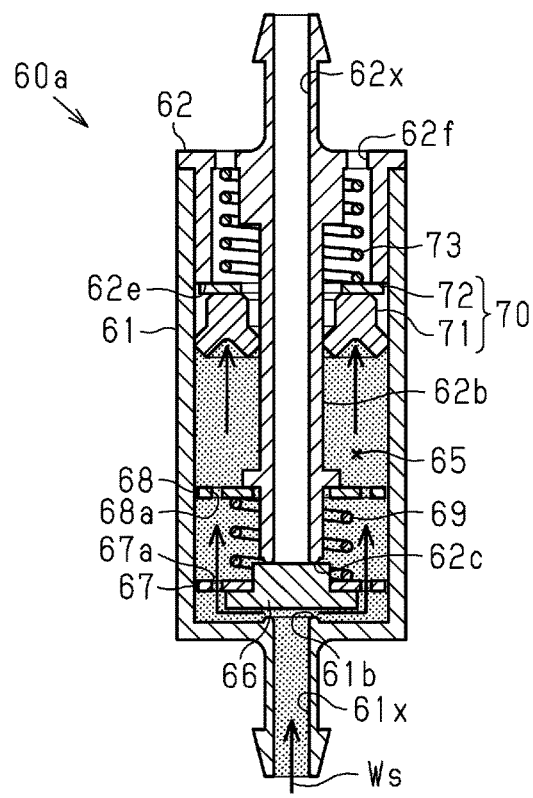
FIGS. 19A and 19B are schematic diagrams of the cleaning liquid reservoir device used in the third embodiment.

As shown in FIG. 19A, when the washer pump 13b is driven and the cleaning liquid Ws is supplied under pressure, the valve body 66, which was closing the open portion 61b of the intake passage 61x, is lifted against the urging force of the urging spring 69. This sufficiently opens the open portion 61b and closes the open portion 62c of the inner tube 62b. The cleaning liquid Ws entering the open portion 61b of the intake passage 61x flows through the through hole 67a of the washer 67 and then through the through hole 68a of the washer 68 toward the other side where the piston 70 is located without leaking into the open portion 62c of the inner tube 62b. The piston 70 receives the pressure of the cleaning liquid Ws and moves backward against the urging force of the urging spring 73. The backward movement of the piston 70 increases the volume of the storage compartment 65. The piston 70 (washer 72) is moved backward until it reaches a position where it contacts a restriction wall 62e of the lid member 62 and the volume of the storage compartment 65 becomes the maximum. This stores a fixed amount of the cleaning liquid Ws in the cleaning liquid reservoir device 60a.

Figure 19B:
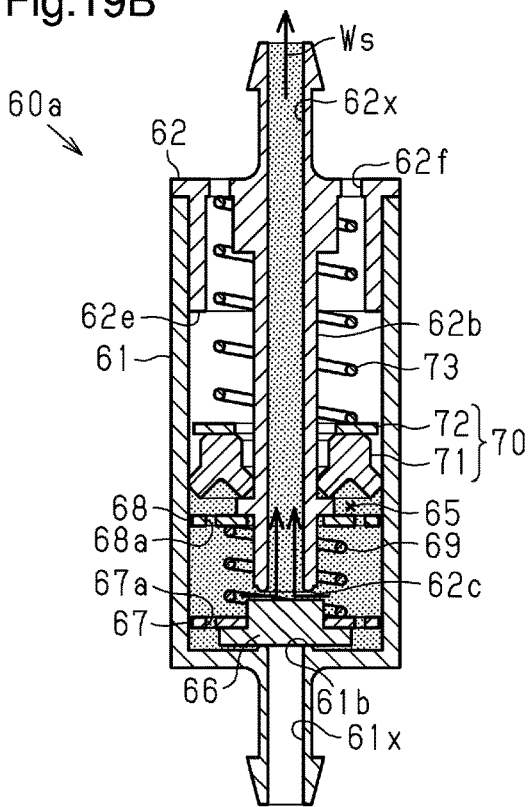

Further, when the washer pump 13b is stopped in a state in which the piston 70 is moved backward and the fixed amount of the cleaning liquid Ws is stored, the pressure of the cleaning liquid Ws from the open portion 61b of the intake passage 61x becomes null. Thus, as shown in FIG. 19B, the valve body 66 returns to a state closing the open portion 61b of the intake passage 61x and checks reverse flow of the cleaning liquid Ws from the open portion 61b to the intake passage 61x. As the valve body 66 returns to its original position, the open portion 62c of the inner tube 62b opens. Thus, the piston 70, which receives the urging force of the urging spring 73, pushes the stored cleaning liquid Ws out of the storage compartment 65. The open portion 61b near the intake passage 61x is closed in this state. Thus, the pushing action of the piston 70 discharges the cleaning liquid Ws and from the open portion 62c of the inner tube 62b through the discharge passage 62x. The open space at the back side of the piston 70 is exposed to the atmosphere through a communication hole 62f extending through the lid member 62 so that the pushing action and backward moving action of the piston 70 occur smoothly.

In this manner, the cleaning liquid reservoir device 60a of the present embodiment stores the fixed amount of the cleaning liquid Ws when the washer pump 13b is driven and discharges the cleaning liquid Ws to the mixture outlet 22c when the washer pump 13b is stopped. More specifically, while performing the same operation as the cleaning liquid reservoir 22b of the first embodiment, the cleaning liquid reservoir device 60a of the present embodiment is formed by a single unit having the function of a passage switch valve that switches open and closed states of the passages 61x and 62x by moving the valve body 66, the function of a check valve that checks reverse flow of the cleaning liquid Ws to the intake passage 61x, and the function of a chamber that stores and pushes out the cleaning liquid Ws in accordance with the action of the piston 70.

The advantages of the present embodiment will now be described.

(1) The present embodiment has the same advantages as the first embodiment. Additionally, the cleaning liquid reservoir device 60a forms a single unit serving as the cleaning liquid reservoir 22b. This provides a simple system.

(2) In the cleaning liquid reservoir device 60a of the present embodiment, the valve body 66, which is a disc-shaped sheet, can be prepared easily.

Fourth Embodiment

A vehicle cleaning system in accordance with a fourth embodiment will now be described. The present embodiment slightly differs from the cleaning liquid reservoir device 60a of the third embodiment in the structure of a cleaning liquid reservoir device (cleaning liquid reservoir) 60b. The description hereafter will focus on the differences.

Figure 20:
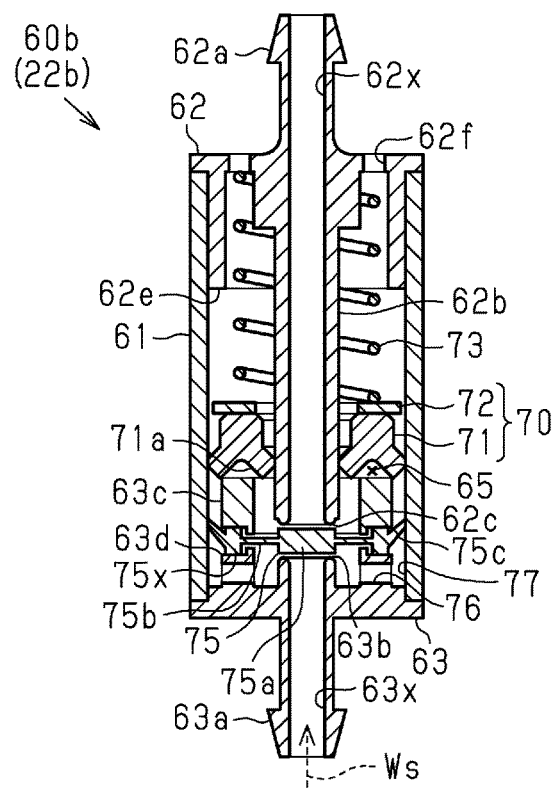
FIG. 20 is a schematic diagram of a cleaning liquid reservoir device used in a fourth embodiment.

The valve body 66, which is a substantially disc-shaped sheet, and the urging spring 69 of the third embodiment shown in FIG. 18 are used to provide the functions of a passage switch valve and a check valve. As shown in FIG. 20, a cleaning liquid reservoir device 60b in accordance with the present embodiment replaces the valve body 66 and the urging spring 69 with a diaphragm 75. The structure around the piston 70 is the same as the third embodiment.

More specifically, as shown in FIG. 20, in the cleaning liquid reservoir device 60b of the present embodiment, the case body 61 is cylindrical, the lid member 62 used in the third embodiment is arranged at the discharge side, and a lid member 63 is arranged at an intake side. The lid members 62 and 63 close the open portions of the case body 61. In the same manner as the third embodiment, the lid member 62 includes the discharge connector 62a, the discharge passage 62x, the inner tube 62b, and the like. The lid member 63 includes an intake connector 63a at a central portion and an intake passage 63x extending therethrough. A tubular open portion 63b of the intake passage 63x projects from the inner surface of the lid member 63 toward the inner tube 62b of the lid member 62. Further, a tubular holding wall 63c is arranged at the inner side of the lid member 63 at an intermediate position between the open portion 63b and the case body 61. The holding wall 63c holds a circumferential portion 75x of the diaphragm 75. The circumferential portion 75X is fitted in a holding groove 63d provided near an axially intermediate portion of the holding wall 63c. The diaphragm 75 includes a valve body 75a, at the central portion, and a thin portion 75b, located between the valve body 75a and the circumferential portion 75x. The valve body 75a of the diaphragm 75 in arranged in a movable manner between the open portion 62c of the inner tube 62b (discharge passage 62x) and the open portion 63b of the intake passage 63x.

The portion of the holding wall 63c located toward the basal side from the holding groove 63d (portion holding circumferential portion 75x of diaphragm 75) includes a through passage 76 extending in the radial direction. A circumferential passage 77 connected to the through passage 76 extends between the outer circumferential surface of the holding wall 63c and the inner circumferential surface of the case body 61. The circumferential passage 77 includes a movable piece 75c projecting from the outer circumferential surface of the circumferential portion 75x of the diaphragm 75. The movable piece 75c is inclined so that its distal portion (radially outer portion) is directed further toward the downstream side than its basal portion (radially inner portion). The distal portion is in contact with the case body 61. The storage compartment 65 of the cleaning liquid Ws in the present embodiment is an open space defined by the piston 70 and the diaphragm 75 at the downstream side of the movable piece 75c, which projects into the circumferential passage 77. In the present embodiment, the engagement portion 62d of the inner tube 62b (refer to FIG. 18) is omitted, and the pressure receiving portion 71a of the rubber seal 71, which forms the piston 70, contacts the distal end of the holding wall 63c to act as a pushing side position restriction for the piston 70.

Under a situation in which the washer pump 13b is not acting to send the cleaning liquid Ws into the open portion 63b of the intake passage 63x, the valve body 75a of the diaphragm 75 is located at an intermediate position between the open portion 62c of the inner tube 62b and the open portion 63b of the intake passage 63x and thereby not actively closing the two open portions 62c and 63b. Further, the piston 70 receives the urging force of the urging spring 73 and is arranged at a position where the pressure receiving portion 71a contacts the distal end of the holding wall 63c. In this case, the volume of the storage compartment 65 defined by the piston 70 is at the minimum.

Figure 21A:
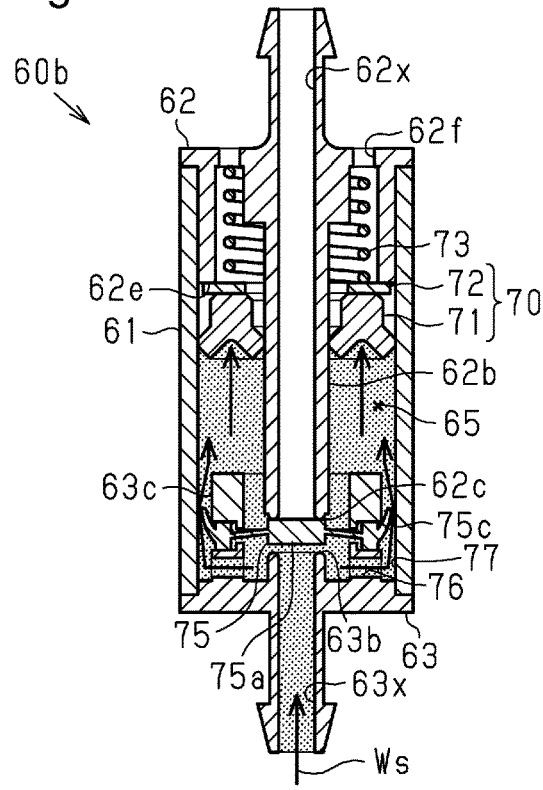
FIGS. 21A and 21B are schematic diagrams illustrating the action of the cleaning liquid reservoir device in the fourth embodiment.

As shown in FIG. 21A, when the washer pump 13b is driven and the cleaning liquid Ws is supplied under pressure, the valve body 75a of the diaphragm 75 is lifted. This sufficiently opens the open portion 63b of the intake passage 63x and closes the open portion 62c of the inner tube 62b. The cleaning liquid Ws entering the open portion 63b of the intake passage 63x first flows toward the radially outer side of the diaphragm 75 and then flows via the through passage 76 and the circumferential passage 77 toward the other side where the piston 70 is located without leaking into the open portion 62c of the inner tube 62b. When the cleaning liquid Ws flows from the intake passage 63x toward the piston 70, the distal end of the movable piece 75c, which projects into the circumferential passage 77, is moved away from the inner circumferential surface of the case body 61 thereby opening the passage. The piston 70 receives the pressure of the cleaning liquid Ws and moves backward. The backward movement of the piston 70 increases the volume of the storage compartment 65. The piston 70 (washer 72) is moved backward until reaching a position where it contacts the restriction wall 62e of the lid member 62 and the volume of the storage compartment 65 becomes the maximum. This stores a fixed amount of the cleaning liquid Ws in the cleaning liquid reservoir device 60b.

Figure 21B:
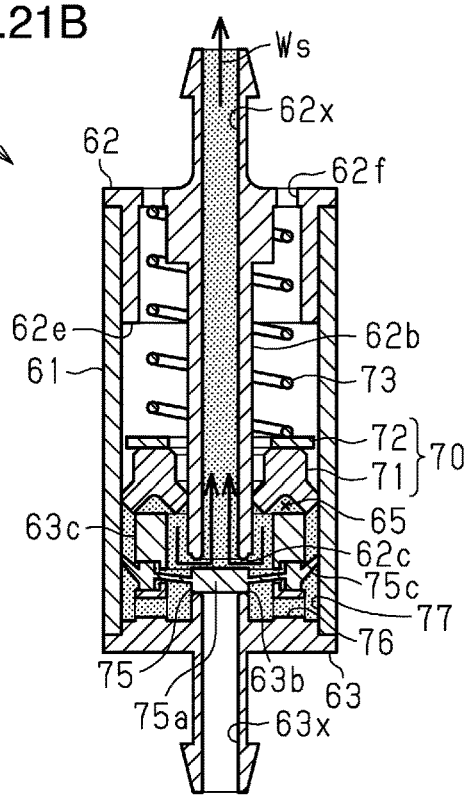

Further, when the washer pump 13b is stopped in a state in which the piston 70 is moved backward and the fixed amount of the cleaning liquid Ws is stored, the pressure of the cleaning liquid Ws from the open portion 63b of the intake passage 63x becomes null. In addition, the piston 70, which receives the urging force of the urging spring 73, acts to push the stored cleaning liquid Ws out of the storage compartment 65 and moves the valve body 75a of the diaphragm 75 toward the opposite side. As shown in FIG. 21B, the valve body 75a closes the open portion 63b of the intake passage 63x. Further, the distal end of the movable piece 75c, which projects into the circumferential passage 77, contacts the inner circumferential surface of the case body 61 and opens the passage. This restricts reverse flow of the cleaning liquid Ws from the open portion 63b toward the intake passage 63x. The movement of the valve body 75a of the diaphragm 75 opens the open portion 62c of the inner tube 62b, and the pushing action of the piston 70 discharges the cleaning liquid Ws from the open portion 62c of the inner tube 62b through the discharge passage 62x.

In this manner, the cleaning liquid reservoir device 60b of the present embodiment is a single unit having the function for storing a fixed amount of the cleaning liquid Ws when the washer pump 13b is driven and discharging the fixed amount of the cleaning liquid Ws toward the mixture outlet 22c when the washer pump 13b is stopped in addition to the function of a passage switch valve, the function of a check valve, and the function of a chamber.

The advantages of the present embodiment will now be described.

(1) The present embodiment has the same advantages as the first embodiment. Additionally, the cleaning liquid reservoir 22b forms a single unit serving as the cleaning liquid reservoir device 60b. This provides a simple system.

(2) In the cleaning liquid reservoir device 60b of the present embodiment, the use of the diaphragm 75 allows for the omission of an urging spring that urges a valve body.

Fifth Embodiment

A vehicle cleaning system in accordance with a fifth embodiment will now be described. The present embodiment slightly differs from the cleaning liquid reservoir device 60b of the fourth embodiment in the structure of a cleaning liquid reservoir device (cleaning liquid reservoir) 60c. The description hereafter will focus on the differences.

Figure 22:
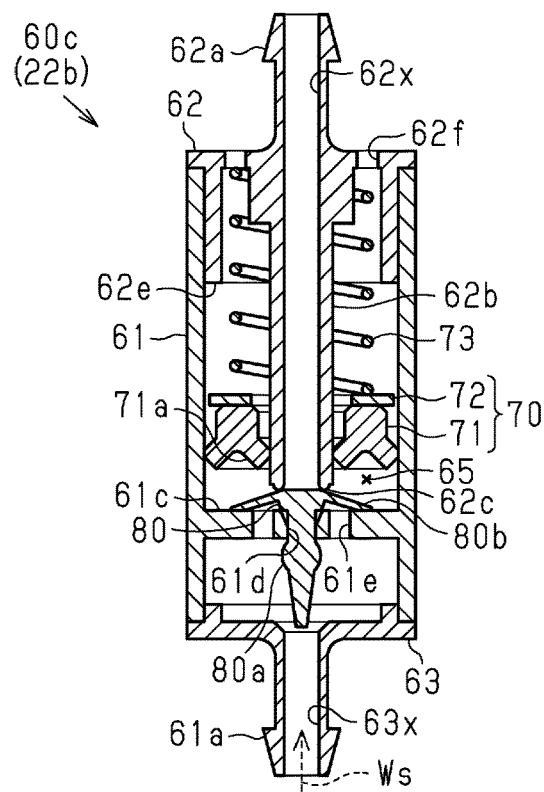
FIG. 22 is a schematic diagram of a cleaning liquid reservoir device used in a fifth embodiment.

The diaphragm 75 of the fourth embodiment shown in FIG. 20 is used to provide the functions of a passage switch valve and a check valve. As shown in FIG. 22, the cleaning liquid reservoir device 60c in accordance with the present embodiment replaces the diaphragm 75 with an umbrella valve 80. The structure around the piston 70 is the same as the fourth embodiment.

More specifically, as shown in FIG. 22, the cleaning liquid reservoir device 60c of the present embodiment includes the case body 61, which is cylindrical, and the lid members 62 and 63, which close the open portions of the case body 61. A flat holding wall 61c extends from the inner circumferential surface of the case body 61 in a direction perpendicular to the axial direction (i.e., radial direction) to hold the umbrella valve 80. The umbrella valve 80 includes a rod 80a and a movable disc 80b arranged on one end of the rod 80a. The rod 80a of the umbrella valve 80 is fitted to and held in a holding hole 61d arranged in a central portion of the holding wall 61c. The holding wall 61c includes an open portion 61e near the holding hole 61d (portion holding rod 80a of umbrella valve 80). The open portion 61e is connected to the intake passage 63x and substantially functions as the open portion of the intake passage 63x. The movable disc 80b of the umbrella valve 80 is arranged to be movable between the open portion 62c of the inner tube 62b (discharge passage 62x) and the open portion 61e connected to the intake passage 63x. When the movable disc 80b moves, the central portion of the movable disc 80b, which is coupled to the rod 80a, serves as a fulcrum, and the outer circumferential portion comes into contact with or separates from the holding wall 61c. The storage compartment 65 of the cleaning liquid Ws in the present embodiment is an open space defined by the holding wall 61c, the movable disc 80b of the umbrella valve 80, and the piston 70.

Under a situation in which the washer pump 13b is not acting to send the cleaning liquid Ws into the open portion 61e connected to the intake passage 63x, the movable disc 80b of the umbrella valve 80 closes, although not actively, the open portion 62c of the inner tube 62b and the open portion 61e connected to the intake passage 63x. Further, the piston 70 receives the urging force of the urging spring 73 and is arranged at the most pushed position. In this case, the volume of the storage compartment 65 defined by the piston 70 is the minimum.

Figure 23A:
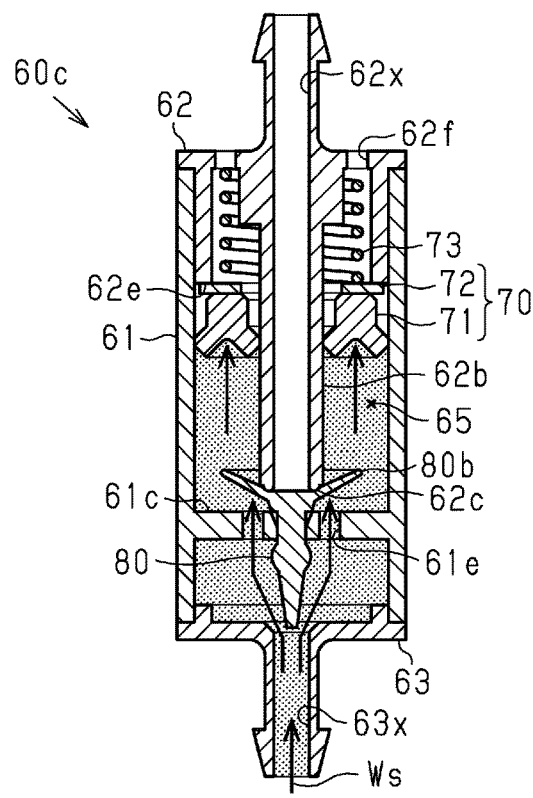
FIGS. 23A and 23B are schematic diagrams illustrating the action of the cleaning liquid reservoir device in the fifth embodiment.

As shown in FIG. 23A, when the washer pump 13b is driven and the cleaning liquid Ws is supplied under pressure, the outer circumferential portion of the movable disc 80b of the umbrella valve 80 is lifted. This opens the open portion 61e connected to the intake passage 63x and closes the open portion 62c of the inner tube 62b. The cleaning liquid Ws entering the open portion 61e connected to the intake passage 63x further flows toward the other side where the piston 70 is located without leaking into the open portion 62c of the inner tube 62b. The piston 70 receives the pressure of the cleaning liquid Ws and moves backward. The backward movement of the piston 70 increases the volume of the storage compartment 65. The piston 70 (washer 72) is moved backward until reaching a position where it contacts the restriction wall 62e of the lid member 62 and the volume of the storage compartment 65 becomes the maximum. This stores a fixed amount of the cleaning liquid Ws in the cleaning liquid reservoir device 60c.

Figure 23B:
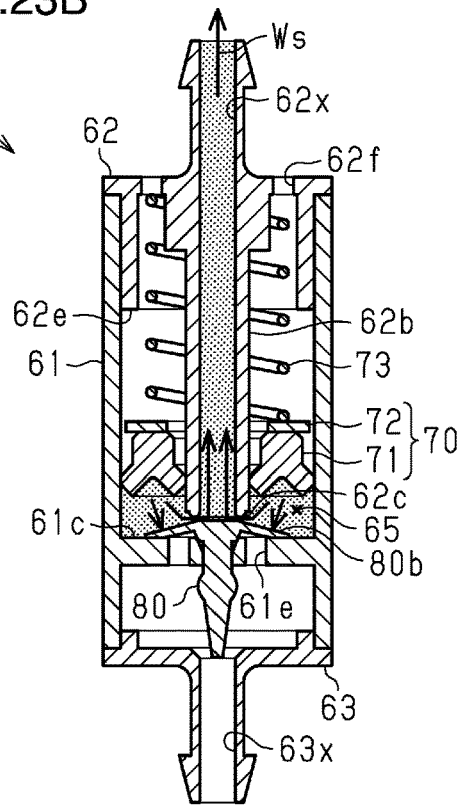

Further, when the washer pump 13b is stopped in a state in which the piston 70 is moved backward and the fixed amount of the cleaning liquid Ws is stored, the pressure of the cleaning liquid Ws from the open portion 61e connected to the intake passage 63x becomes null. In addition, the piston 70, which receives the urging force of the urging spring 73, acts to push the stored cleaning liquid Ws out of the storage compartment 65 and moves the movable disc 80b of the umbrella valve 80 toward the opposite side. As shown in FIG. 23B, the movable disc 80b closes the open portion 61e connected to the intake passage 63x and restricts reverse flow of the cleaning liquid Ws from the open portion 61e toward the intake passage 63x. Further, the movable disc 80b receives the pressure of the cleaning liquid Ws. This pushes the umbrella valve 80 in the axial direction and opens the open portion 62c of the inner tube 62b. The pushing action of the piston 70 discharges the cleaning liquid Ws from the open portion 62c of the inner tube 62b through the discharge passage 62x.

In this manner, the cleaning liquid reservoir device 60c of the present embodiment is a single unit having the function for storing a fixed amount of the cleaning liquid Ws, when the washer pump 13b is driven, and discharging the fixed amount of the cleaning liquid Ws toward the mixture outlet 22c, when the washer pump 13b is stopped, in addition to the function of a passage switch valve, the function of a check valve, and the function of a chamber in the same manner as the fourth embodiment.

The advantages of the present embodiment will now be described.

(1) The present embodiment has the same advantages as the first embodiment. Additionally, the cleaning liquid reservoir 22b forms a single unit serving as the cleaning liquid reservoir device 60c. This provides a simple system.

(2) In the cleaning liquid reservoir device 60c of the present embodiment, the use of the umbrella valve 80 allows for the omission of an urging spring that urges a valve body.

Sixth Embodiment

A vehicle cleaning system in accordance with a sixth embodiment will now be described. The present embodiment has a structure simplified from that of the first and second embodiments by changing connections and components in the first and second cleaning devices 21a and 21b. The description hereafter will focus on the differences.

Figure 24:
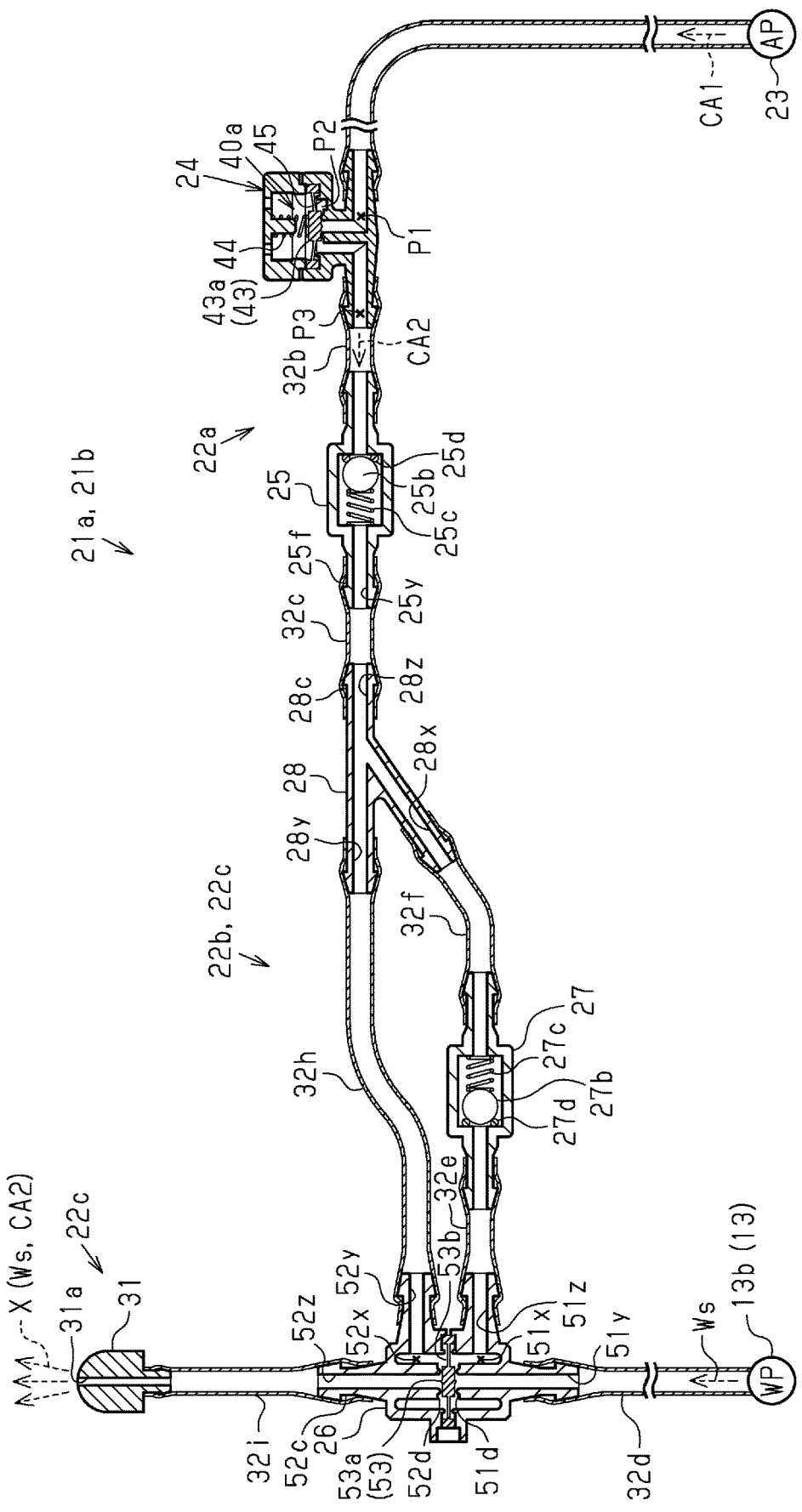
FIG. 24 is a schematic diagram of a cleaning device used in a vehicle cleaning system in accordance with a sixth embodiment.

In the present embodiment, as shown in FIG. 24, the connection hose 32c connects the discharge connector 25f of the check valve 25 and the relay connector 28c of the reservoir joint 28. Further, the connection hose 32i connects the second discharge connector 52c of the passage switching valve 26 and the ejection nozzle 31. This allows the chamber 29, the mixture joint 30, and the connection hoses 32g and 32j to be omitted from the first embodiment and the air branch joint 34 and the connection hose 32k to be emitted from the second embodiment.

Such a structure results in the entire passage connecting the passage switching valve 26, the connection hose 32h, the reservoir joint 28, the connection hose 32c, the check valve 25, and the like functioning as a chamber (storage compartment) used to store a fixed amount of the cleaning liquid Ws when the washer pump 13b is driven. The air jet CA2 from the valve device 24 also flows into the passage storing the cleaning liquid Ws. Thus, the reservoir joint 28 also functions as a mixture joint and enables ejection of the gas-liquid fluid mixture X, which is a mixture of the cleaning liquid Ws and the air jet CA2, from the ejection nozzle 31. In the present embodiment, the portions connecting the passage switching valve 26, the connection hose 32h, the reservoir joint 28, the connection hose 32c, the check valve 25, and the like also serve as the cleaning liquid reservoir 22b and the mixture outlet 22c of the first and second embodiments thereby simplifying the structure.

Figure 25:
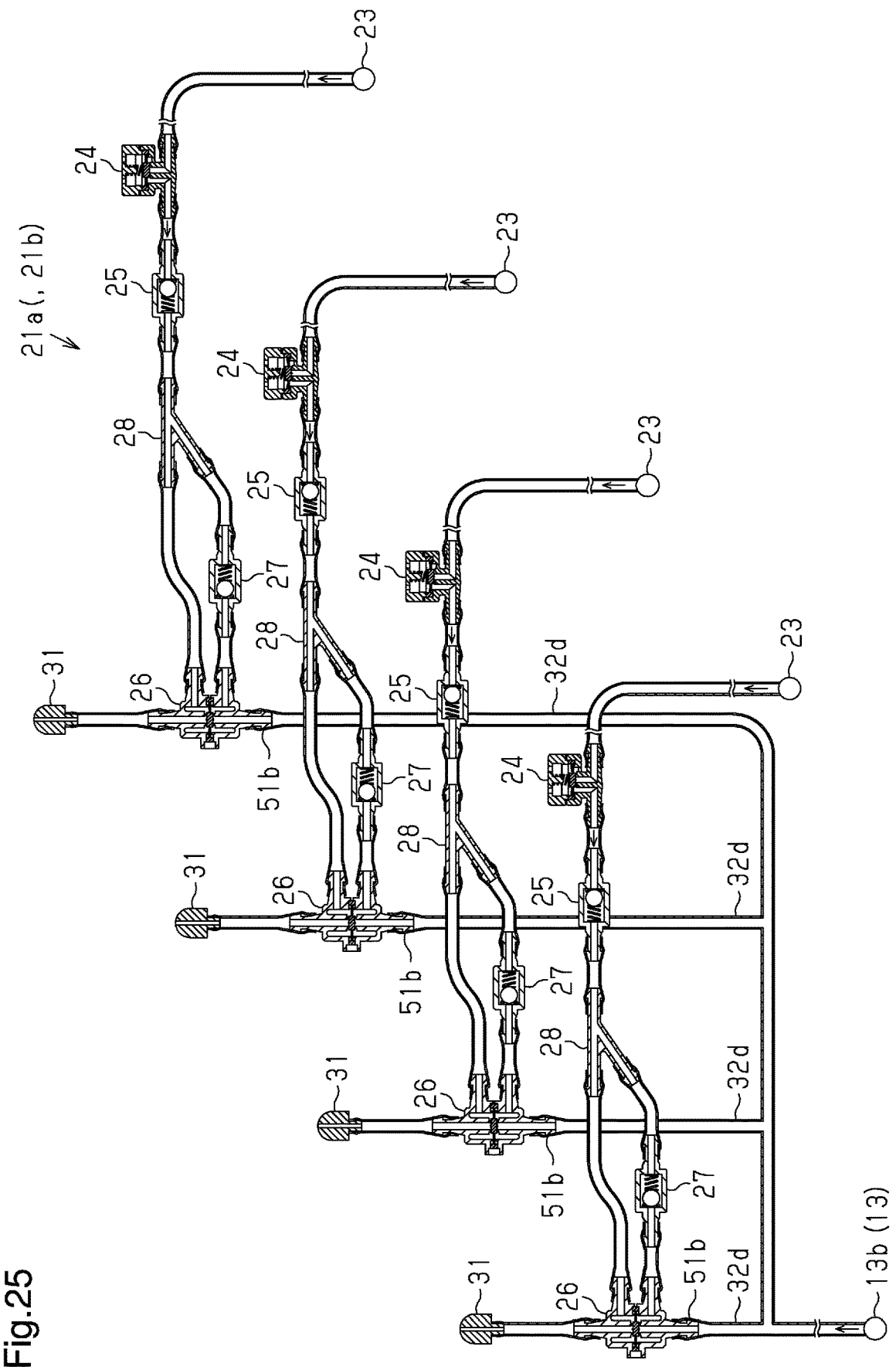
FIG. 25 is a schematic diagram of the cleaning device used in the vehicle cleaning system in accordance with the sixth embodiment.

When there is a plurality of the set of the first cleaning device 21a (or the second cleaning device 21b) having the connection shown in FIG. 24, for example, when there are four sets as shown in FIG. 25, the connection hoses 32d connected to the first intake connectors 51b of the passage switching valves 26 are all connected to the same washer pump 13b so that the washer pump 13b can be shared. The gas-liquid fluid mixture X is ejected from each ejection nozzle 31 when the air pump 23 is driven, and the storing action of the cleaning liquid Ws can be performed at the same time by driving the same washer pump 13b.

The advantages of the present embodiment will now be described.

(1) The present embodiment allows for the omission of the chamber 29, the mixture joint 30, and the connection hoses 32g and 32j used in the first embodiment thereby simplifying the structure while obtaining the advantages of the first embodiment.

(2) Plural sets of the cleaning devices 21a (21b) can all be supplied with the cleaning liquid Ws by connecting the same washer pump 13b as shown in FIG. 25 to simplify the structure.

The above-described embodiment may be modified as described below. The above-described embodiment and the modified examples described below may be combined as long as there is no technical contradiction.

The structures of the air jet generator 22a, the cleaning liquid reservoir 22b, and the mixture outlet 22c may be modified.

The valve device 24 may be formed integrally with the check valve 25 in the air jet generator 22a. Two valve devices 24 may be connected in series, with the valve device 24 at the downstream side functioning as a check valve. This allows the check valve 25 to be omitted. In addition to the valve body 43a of the diaphragm 43 in the valve device 24, a further valve body can be used to open and close the open portion 48a of the discharge passage 48. In this case, the newly added valve body will function as a check valve. This allows the check valve 25 to be omitted. Further, only one valve device 24 is necessary.

The valve device 24 may be eliminated from the air jet generator 22a, and the compressed air CA1 generated by driving the air pump 23 may be used as the air jet CA2 directly for the ejection of the gas-liquid fluid mixture X from the ejection nozzle 31. This structure also allows foreign matter to be removed from a cleaning subject with a small amount of the cleaning liquid Ws. Further, the cleaning liquid Ws mixed with the air jet CA2 is temporarily stored in the cleaning liquid reservoir 22b before being supplied. This stabilizes the supply of the small amount of the cleaning liquid Ws required for cleaning as compared with when directly supplied by the washer pump 13b.

Further, in the cleaning liquid reservoir 22b, the reservoir joint 28 may be formed integrally with the chamber 29, the check valve 27, or the passage switching valve 26. Further, the passage switching valve 26 may be formed integrally with the check valve 27. The passage switching valve 26 may be formed by two valves separated into a primary side functionality portion and a secondary side functionality portion.

In the mixture outlet 22c, the ejection nozzle 31 may be formed integrally with the mixture joint 30. Further, the mixture joint 30 may be formed integrally with the check valve 25 of the air jet generator 22a or the passage switching valve 26 of the cleaning liquid reservoir 22b.

Moreover, the structures of the air jet generator 22a, the cleaning liquid reservoir 22b, and the mixture outlet 22c may be modified.

In the cooperative control of the washer pump 13b and the air pump 23, the driving timing of the pumps may be changed. In the above embodiment, the air pump 23 is driven after the washer pump 13b is driven. Instead, for example, the washer pump 13b may be driven while the air pump 23 is being driven. Preferably, in this case, the driving of the air pump 23 ends after the driving of the washer pump 13b ends.

The distance measurement sensors 11 and 12 are arranged at the middle portion of the front end of the vehicle 10 and the middle portion at the rear end of the vehicle 10 but may be arranged at the left and right sides of the vehicle 10.

The distance measurement sensors 11 and 12 (sensing surfaces 11a and 12a) do not have to be the cleaning subject. For example, the cleaning subject may be a camera that captures images of the surrounding of the vehicle 10, sensors other than such optical sensors, and non-sensors, for example, headlights 15, taillights 16, mirrors 17, and the like that are shown in FIG. 1.

Seventh Embodiment

A system and method for cleaning a vehicle in accordance with a seventh embodiment will now be described. The present embodiment differs from the first embodiment in the structure for supplying cleaning liquid and the related actions at the upstream side of the mixture outlet 22c of the first and second cleaning devices 21a and 21b. The description hereafter will focus on the differences.

Figure 26:
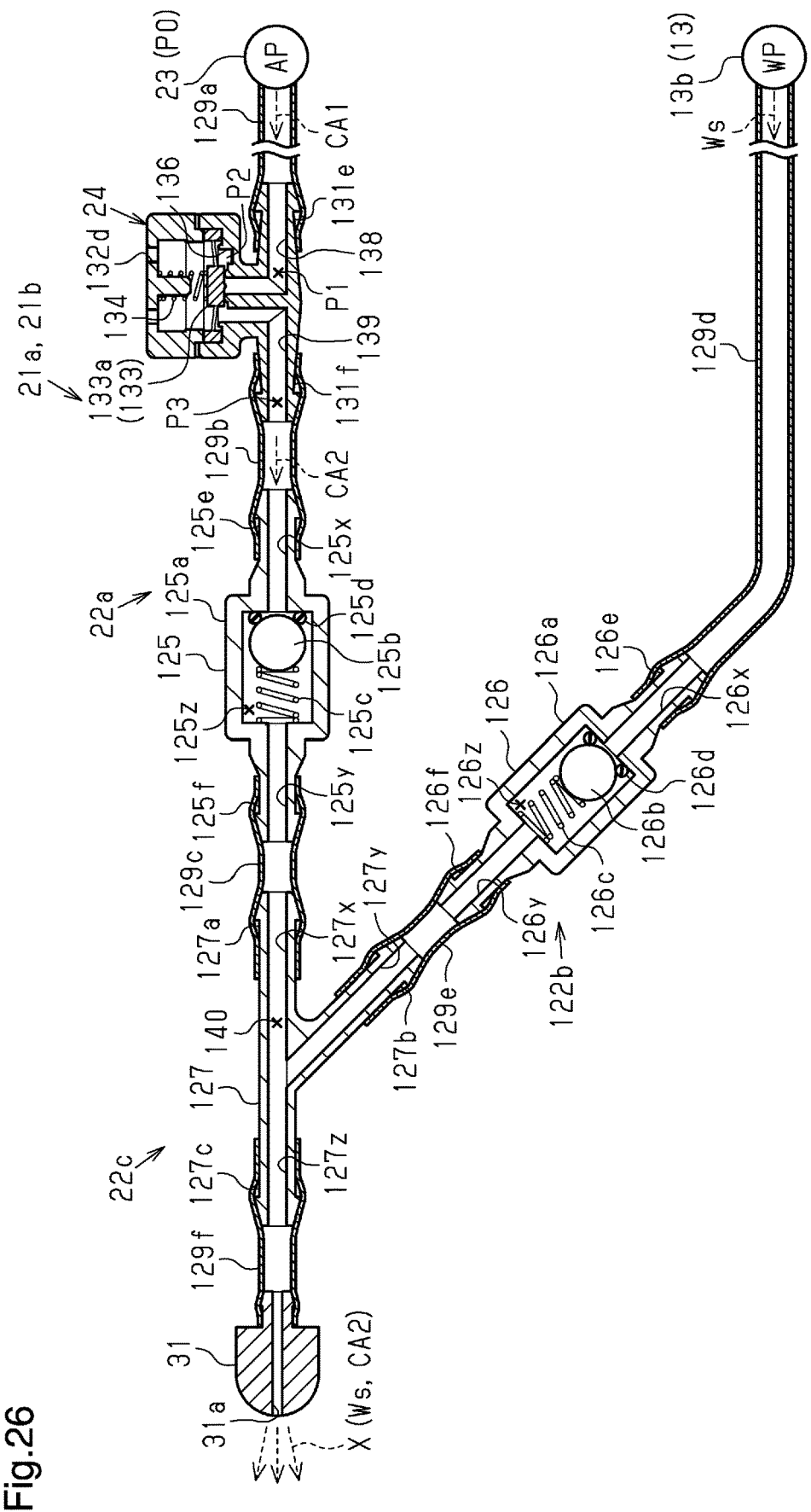
FIG. 26 is a schematic diagram of a cleaning device used in a vehicle cleaning system in accordance with a seventh embodiment.

As shown in FIG. 26, the first and second cleaning devices 21a and 21b each include the air jet generator 22a, a cleaning liquid inlet 122b, and the mixture outlet 22c. The air jet generator 22a includes the air pump 23, the valve device 24, and a check valve 125. The air jet generator 22a generates the high-pressure pulsed air jet CA2 from the compressed air CA1 supplied from the air pump 23 with the actions of the valve device 24, the check valve 125, and the like, which will be described later. The cleaning liquid inlet 122b includes a check valve 126 and is arranged next to the air jet generator 22a. The cleaning liquid inlet 122b receives the cleaning liquid Ws supplied under pressure from the washer pump 13b via the check valve 126. The mixture outlet 22c includes a mixture joint 127 and the ejection nozzle 31. The mixture outlet 22c mixes the air jet CA2, which is generated by the air jet generator 22a, and the cleaning liquid Ws, which is output from the cleaning liquid inlet 122b, at the mixture joint 127 and sprays the cleaning subject of the sensing surfaces 11a and 12a with the mixture from the ejection nozzle 31. The first and second cleaning devices 21a and 21b have the same structure. Thus, the first and second cleaning devices 21a and 21b will be described hereafter as having the same structure.

In the air jet generator 22a, the air pump 23 and the valve device 24 are connected to each other by a connection hose 129a, and the valve device 24 and the check valve 125 are connected to each other by a connection hose 129b. The connection hoses 129a and 129b are rubber hoses or the like and formed from a flexible material. Connection hoses 129c to 129f, which will be described later, are also formed from the same material. The air pump 23 is formed by an electric air pump that is configured to generate the compressed air CA1. The valve device 24 increases the pressure of the compressed air CA1 and produces pulses (in an intermittent manner) with the compressed air CA1 continuously supplied from the air pump 23 and outputs the high-pressure pulsed air jet CA2 toward the check valve 125, more specifically, via the check valve 125 toward the mixture outlet 22c.

As shown in FIG. 26, the check valve 125 includes a valve case 125a, a valve body 125b, an urging spring 125c, and a seal ring 125d. The valve case 125a includes an intake connector 125e and a discharge connector 125f. An intake passage 125x inside the intake connector 125e and a discharge passage 125y inside the discharge connector 125f are connected to a valve chamber 125z in the valve case 125a. The intake connector 125e is connected to the discharge connector 41f of the valve device 24 by the connection hose 129c. The discharge connector 125f is connected to a first intake connector 127a of the mixture joint 127 by the connection hose 129c.

In the valve chamber 125z of the valve case 125a, the seal ring 125d is fixed around the open portion of the intake passage 125x, and the valve body 125b, which is spherical, is urged by the urging spring 125c to contact the seal ring 125d. When the fluid pressure of the fluid from the intake passage 125x becomes greater than or equal to a predetermined pressure, the valve body 125b is moved against the urging force of the urging spring 125c and switched from a valve closing state to a valve opening state so that the check valve 125 outputs the air jet CA2 of the valve device 24 toward the mixture joint 127 of the mixture outlet 22c.

The check valve 126 used for the cleaning liquid inlet 122b is identical to the check valve 125 of the air jet generator 22a. The check valve 126 includes a valve case 126a, a valve body 126b, an urging spring 126c, and a seal ring 126d. An intake passage 126x inside an intake connector 126e and a discharge passage 126y inside a discharge connector 126f are connected to a valve chamber 126z in the valve case 126a. The intake connector 126e is connected to the connection hose 129d extending from the washer pump 13b. The discharge connector 126f is connected to a second intake connector 127b of the mixture joint 127 by the connection hose 129e. When the fluid pressure of the fluid from the intake passage 126x becomes greater than or equal to a predetermined pressure, the valve body 126b is moved against the urging force of the urging spring 126c and switched from a valve closing state to a valve opening state so that the check valve 126 outputs the cleaning liquid Ws supplied under pressure from the washer pump 13b toward the mixture joint 127 of the mixture outlet 22c.

The mixture joint 127 of the mixture outlet 22c, which is, for example, a Y-shaped joint, includes the first intake connector 127a and the second intake connector 127b at an intake side and a discharge connector 127c at a discharge side. In the mixture joint 127 of the present embodiment, the first intake connector 127a and the discharge connector 127c are arranged along a straight line, and the second intake connector 127b extends toward the first intake connector 127a at an acute angle of, for example, 45°. First and second intake passages 127x and 12'7y inside the first and second intake connectors 127a and 127b are connected to a discharge passage 127z inside the discharge connector 127c. In conformance with the outer shape, the first intake passage 127x and the discharge passage 127z are arranged along a straight line, and the second intake passage 127y connects to the first intake passage 127x at an acute angle of, for example, 45°. The first intake connector 127a is connected via the check valve 125 to the valve device 24 and the air pump 23, and the second intake connector 127b is connected via the check valve 126 to the washer pump 13b. The discharge connector 127c is connected to the ejection nozzle 31 by the connection hose 129f.

The ejection nozzles 31 of the first and second cleaning devices 21a and 21b respectively include the ejection ports 31a directed toward the sensing surfaces 11a and 12a of the first and second distance measurement sensors 11 and 12 shown in FIG. 1. The cleaning liquid Ws, which is first supplied from the washer pump 13b and accumulated in the mixture outlet 22c, is ejected from the ejection nozzle 31 together with the high-pressure pulsed air jet CA2, which is generated by the valve device 24 and the air pump 23, to sprayed a suitable range in each of the sensing surfaces 11a and 12a.

The operation of the seventh embodiment will now be described.

Operation of Vehicle Cleaning System 20

Referring to FIG. 26, when the first and second cleaning devices 21a and 21b of the vehicle cleaning system 20 are inactive, the valve 40a in the valve device 24 of the air jet generator 22a is closed (refer to FIG. 4). Further, the check valve 125 of the air jet generator 22a and the check valve 126 of the cleaning liquid inlet 122b are closed.

When foreign matter such as raindrops collect on the sensing surfaces 11a and 12a of the first and second distance measurement sensors 11 and 12 or whenever a predetermined time elapses regardless of whether there is foreign matter, the upper rank ECU 100 issues a cleaning instruction via the front and rear side ECUs 101 and 102 to the corresponding first and second cleaning devices 21a and 21b and drives the air pump 23 of each of the devices 21a and 21b and the washer pump 13b of the washer device 13.

As shown in FIG. 11, in the present embodiment, the washer pump 13b is first driven for a predetermined period T1. Then, after the washer pump 13b is stopped, the air pump 23 is driven for a predetermined period T2.

Figure 27:
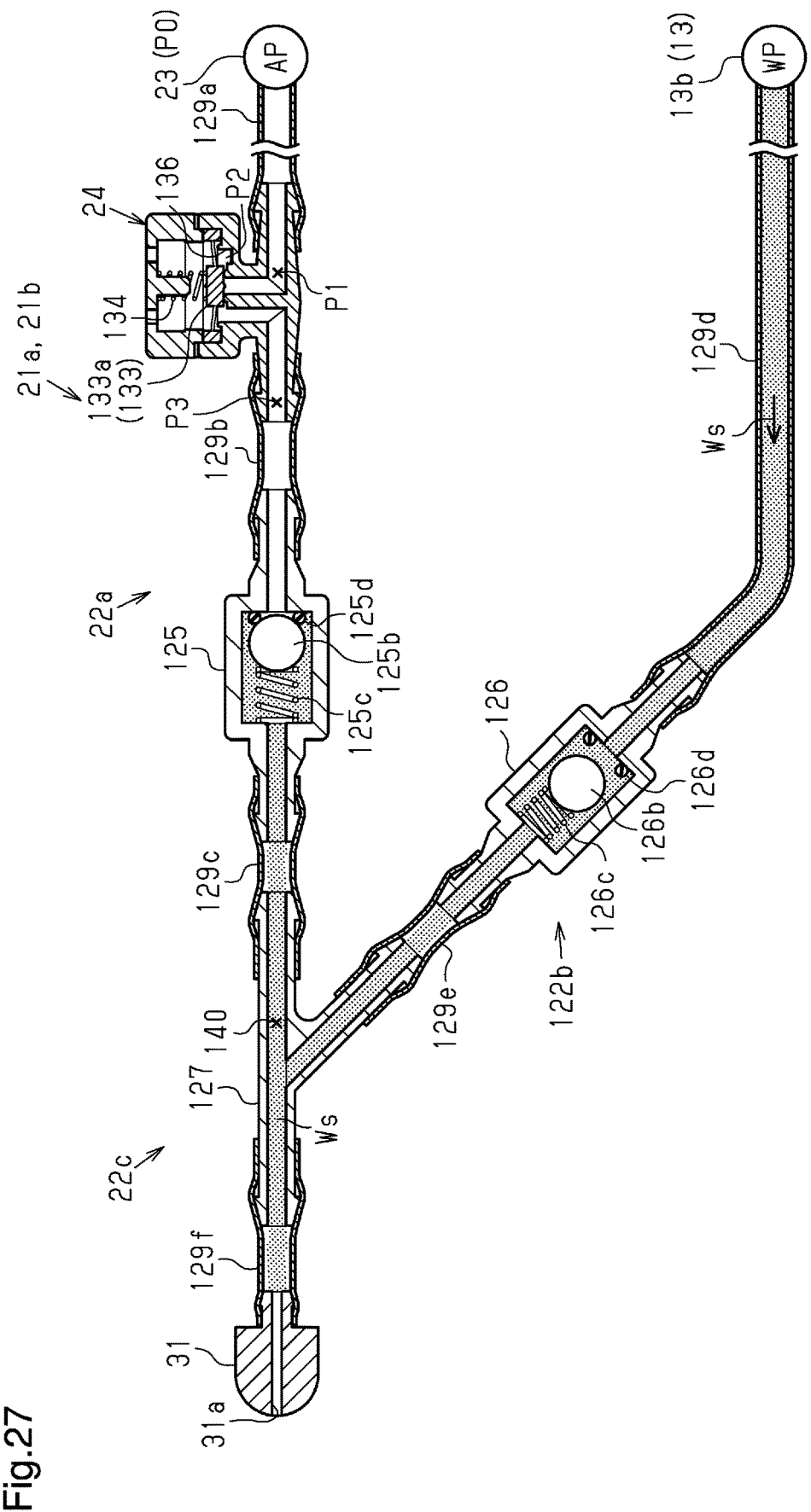
FIG. 27 is a schematic diagram illustrating the action of the cleaning device in accordance with the seventh embodiment.
Figure 28:
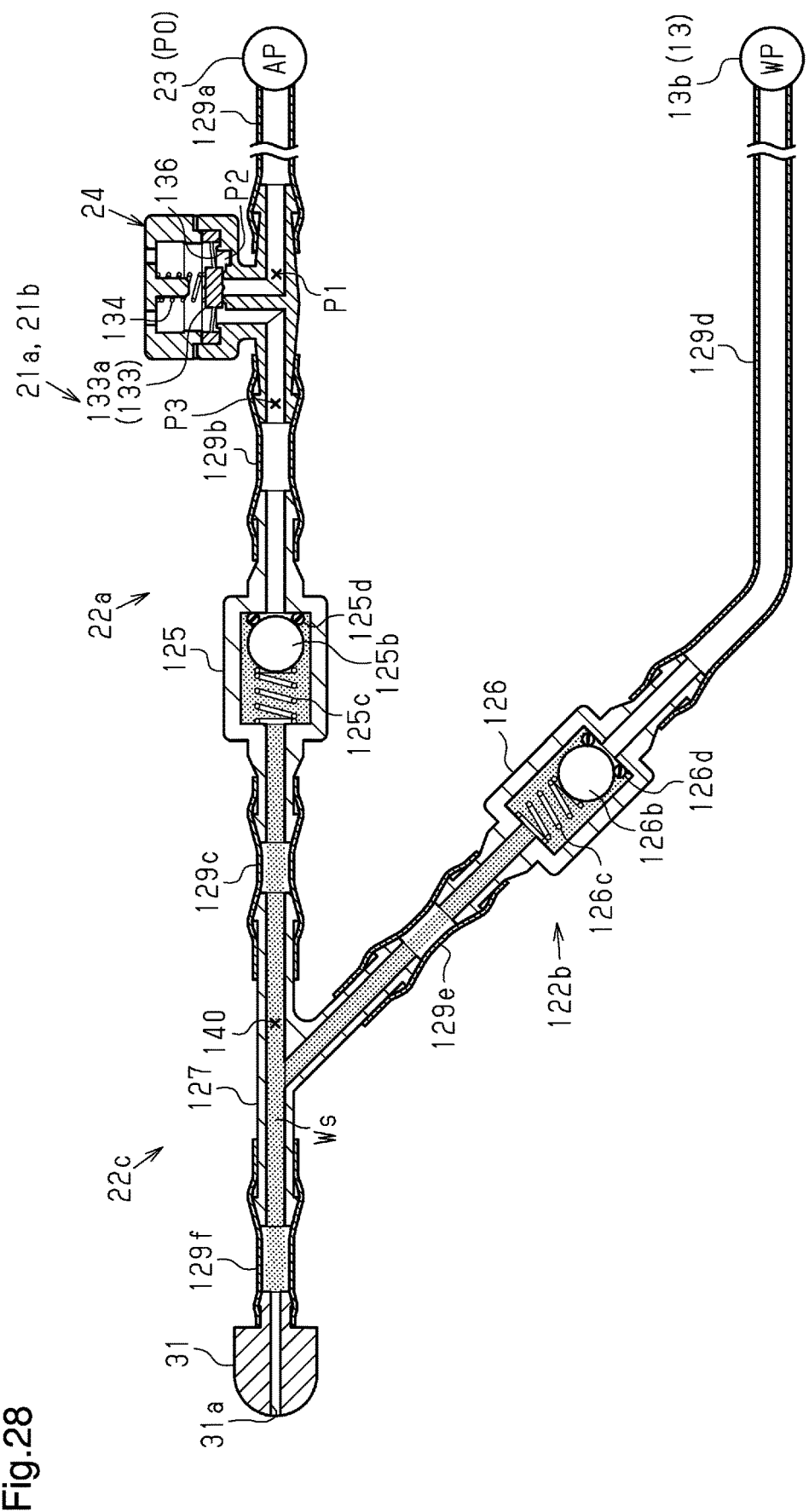
FIG. 28 is a schematic diagram illustrating the action of the cleaning device in accordance with the seventh embodiment.

More specifically, when a cleaning instruction is issued, the washer pump 13b is driven in the predetermined period T1 from time t1 to time t2. As shown in FIG. 27, when the washer pump 13b is driven, the check valve 126 of the cleaning liquid inlet 122b opens, and the cleaning liquid Ws enters the downstream mixture outlet 22c. As shown in FIG. 28, when the washer pump 13b stops, the check valve 126 closes.

The ejection port 31a of the ejection nozzle 31 functions as a restriction. Thus, the passage from the check valve 126 to the ejection nozzle 31, specifically, the connection hose 129e, the mixture joint 127, the connection hose 129f and the passage in the connection hose 129c and the check valve 125 of the air jet generator 22a are partially or entirely filled with the cleaning liquid Ws. When the above passages are referred to as the filling passage 140, the washer pump 13b is driven before the air pump 23 is driven to fill the filling passage 140 with the cleaning liquid Ws. The washer pump 13b is driven to fill the filling passage 140 with the cleaning liquid Ws, not to eject to the cleaning liquid Ws from the ejection nozzle 31. Thus, the washer pump 13b is driven for a short period of time or with a reduced drive force. This minimizes the used amount of the cleaning liquid Ws.

Then, as shown in FIG. 11, the air pump 23 is driven after the washer pump 13b is stopped for the predetermined period T2 from time t3 to time t4. When the air pump 23 is driven, the valve device 24 is actuated so that the pulsed air jet CA2 having a higher pressure than the discharge pressure P0 of the air pump 23 flows via the check valve 125 of the air jet generator 22a to the mixture outlet 22c, in this case, the filling passage 140 filled with the cleaning liquid Ws.

Figure 29:
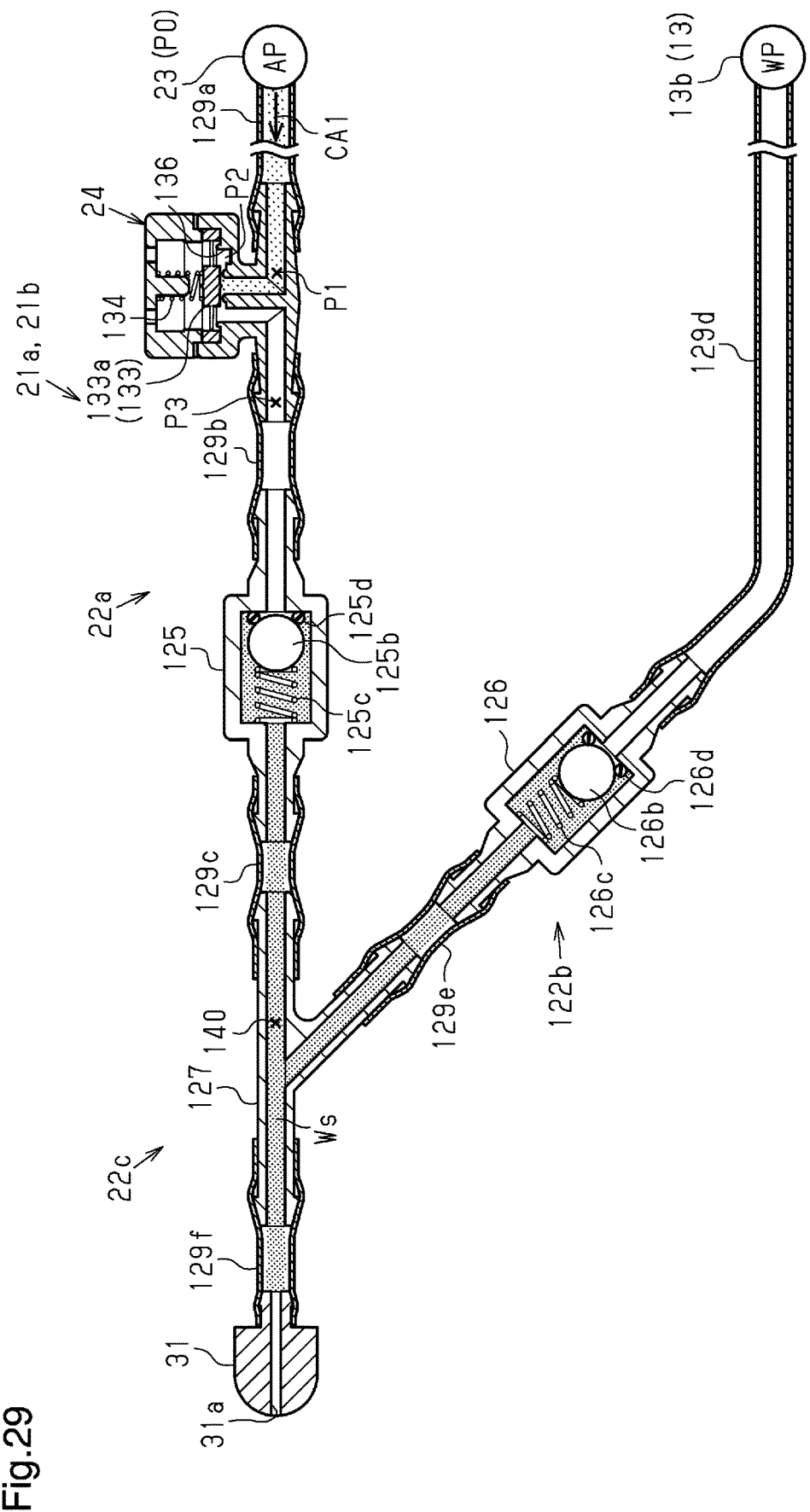
FIG. 29 is a schematic diagram illustrating the action of the cleaning device in accordance with the seventh embodiment.
Figure 30:
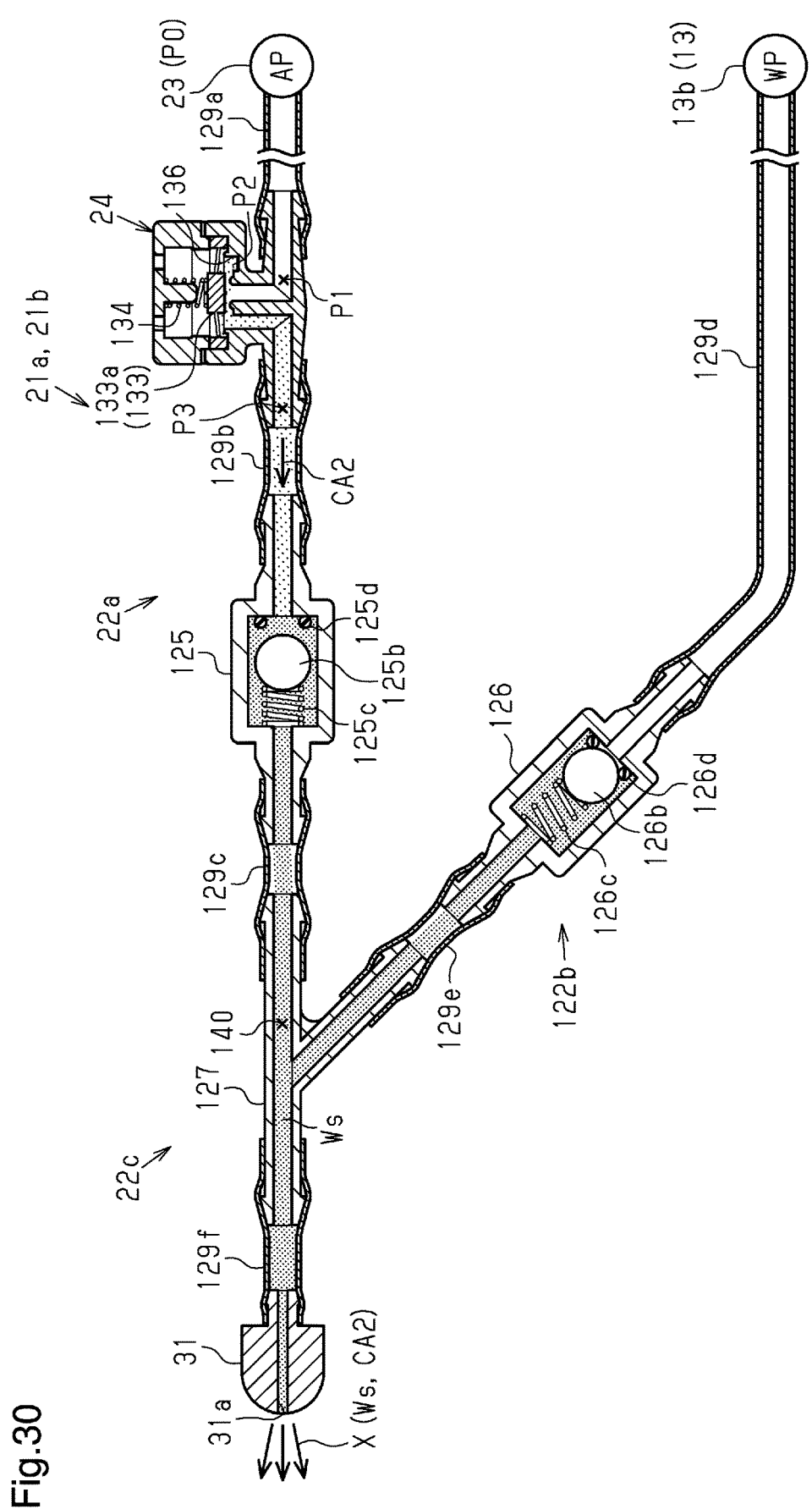
FIG. 30 is a schematic diagram illustrating the action of the cleaning device in accordance with the seventh embodiment.

FIG. 28 shows the cleaning devices 21a and 21b in a state before the air jet generator 22a is actuated, with the valve device 24 in the closed state of FIG. 4. FIG. 29 shows a state in which the air pump 23 is driven and the valve device 24 is increasing the pressure to a level significantly higher than the discharge pressure P0 of the air pump 23 as illustrated in FIG. 5. FIG. 30 shows a state in which the valve device 24 is outputting air having a pressure that is significantly higher than the discharge pressure P0 of the air pump 23 as illustrated in FIG. 6. When the high-pressure air is output from the valve device 24, the check valve 125 of the air jet generator 22a opens and the high-pressure air enters the mixture outlet 22c. The actions from FIGS. 4 to 6 and from FIGS. 28 to 30 are repeated so that the high-pressure pulsed air jet CA2 generated in the valve device 24 flows via the check valve 125 into the mixture outlet 22c.

In this state, the filling passage 140 of the mixture outlet 22c is filled with the cleaning liquid Ws. Thus, when the high-pressure pulsed air jet CA2 flows into the filling passage 140, the high-pressure, air jet CA2 is mixed with the cleaning liquid Ws, which is atomized by the air jet CA2, into the gas-liquid fluid mixture X that is ejected from the ejection port 31a of the ejection nozzle 31. The sensing surfaces 11a and 12a of the first and second distance measurement sensors 11 and 12 shown in FIG. 1 are sprayed with the gas-liquid fluid mixture X, which is a mixture of the cleaning liquid Ws and the air jet CA2. This effectively cleans off foreign matter such as raindrops from the sensing surfaces 11a and 12a and allows the distance measurement accuracy to be maintained at a satisfactory level.

Moreover, the air jet CA2 is generated at a pressure that is significantly higher than the discharge pressure P0 of the air pump 23. This allows for the use of a compact air pump 23. In comparison with when only the cleaning liquid Ws is sprayed or only the air jet CA2 is sprayed, the spraying of the gas-liquid fluid mixture X, in which the cleaning liquid Ws is mixed, allows the cleaning liquid Ws, which is atomized by the high-pressure air jet CA2, to be sprayed at a high speed. This cleans off foreign matter from the sensing surfaces 11a and 12a in an extremely effective manner.

The advantages of the present embodiment will now be described.

(1) The cleaning devices 21a and 21b of the vehicle cleaning system 20 in accordance with the present embodiment generates the high-pressure pulsed air jet CA2 in the air jet generator 22a with the valve device 24 by accumulating the pressure of the compressed air CA1 supplied from the air pump 23 to a pressure higher than the discharge pressure P0 of the air pump 23 and discharging the compressed air CA1 subsequent to the pressure accumulation toward the downstream side. Thus, the air jet CA2 that improves the foreign matter removal capability can be generated without increasing the size of the air pump 23. The cleaning liquid inlet 122b and the mixture outlet 22c mixes the high-pressure pulsed air jet CA2 generated by the air jet generator 22a, with the cleaning liquid Ws to spray the sensing surfaces 11a and 12a of the distance measurement sensors 11 and 12 with the gas-liquid fluid mixture X, which is a mixture of the high-pressure pulsed air jet CA2 and the atomized cleaning liquid Ws. This allows foreign matter to be removed from the sensing surfaces 11a and 12a with a small amount of the cleaning liquid Ws.

(2) In the air jet generator 22a, the valve 40a of the valve device 24 closes the intake passage 47 of the compressed air CA1 with the valve body 43a and accumulates the compressed air CA1 supplied from the air pump 23 until the pressure becomes higher than the discharge pressure P0 of the air pump 23. Further, the valve 40a and the check valve 125 function as an auxiliary mechanism that generates leakage CAx of the compressed air CA1 from the intake passage 47 during pressure accumulation at a leaked side (valve chamber 45 etc.) during pressure accumulation. Then, when the two pressures P1 and P2 accumulated in the intake passage 47 and the leaked side (valve chamber 45, etc.) open the valve body 43a, the pressure-accumulated compressed air CA1 is output from the intake passage 47 to the discharge passage 48. Subsequently, the valve body 43a is closed to accumulate pressure again in the intake passage 47. In this manner, the air pump 23, the valve device 24, and the check valve 125 generate the high-pressure pulsed air jet CA2.

(3) The check valves 125 and 126 are located at the downstream side of the valve device 24 of the air jet generator 22a and in the passage of the cleaning liquid inlet 122b. The check valve 125 functions to accumulate pressure (increase pressure P2) at the downstream side of the valve 40a and ensure that the downstream side of the check valves 125 and 126, or the filling passage 140, is filled with the cleaning liquid Ws.

(4) Control is executed so that the period T2 during which the air pump 23 is driven ends later than the period T1 during which the washer pump 13b is driven. If the cleaning liquid Ws were to remain on the sensing surfaces 11a and 12a, by ending the driving of the air pump 23 after ending the driving of the washer pump 13b, the sensing surfaces 11a and 12a can be sprayed later with only the air jet CA2. This reduces the cleaning liquid Ws that is left on the sensing surfaces 11a and 12a.

(5) Control is executed so that the period T2 during which the air pump 23 is driven is shifted behind the period T1 during which the washer pump 13b is driven. Thus, after the filling passage 140 is sufficiently filled with the cleaning liquid Ws, the gas-liquid fluid mixture X, which includes the cleaning liquid Ws, is ejected by the air jet CA2. Further, the air jet CA2, which does not include the cleaning liquid Ws, can be ejected during a latter period of the pulsed ejection. This reduces the cleaning liquid Ws remaining on the sensing surfaces 11a and 12a.

The seventh embodiment may be modified as described below. The present embodiment and the following modifications can be combined as long as the combined modifications remain technically consistent with each other.

In the cooperative control of the washer pump 13b and the air pump 23, the driving timing of the pumps may be changed. For example, the control illustrated in FIG. 31 may be executed so that the period T1 from time t13 to time t14, during which the washer pump 13b is driven, is included in and overlapped with the period T2 from time t11 to time t12, during which the air pump 23 is driven. This also ends the period T2, during which the air pump 23 is driven, after the period T1, during which the washer pump 13b is driven, ends. When the washer pump 13b is driven while the air pump 23 is being driven, the air jet CA2 can first be ejected alone and then be joined with the ejection of the gas-liquid fluid mixture X before returning again to the sole ejection of the air jet CA2.

Figure 32A:
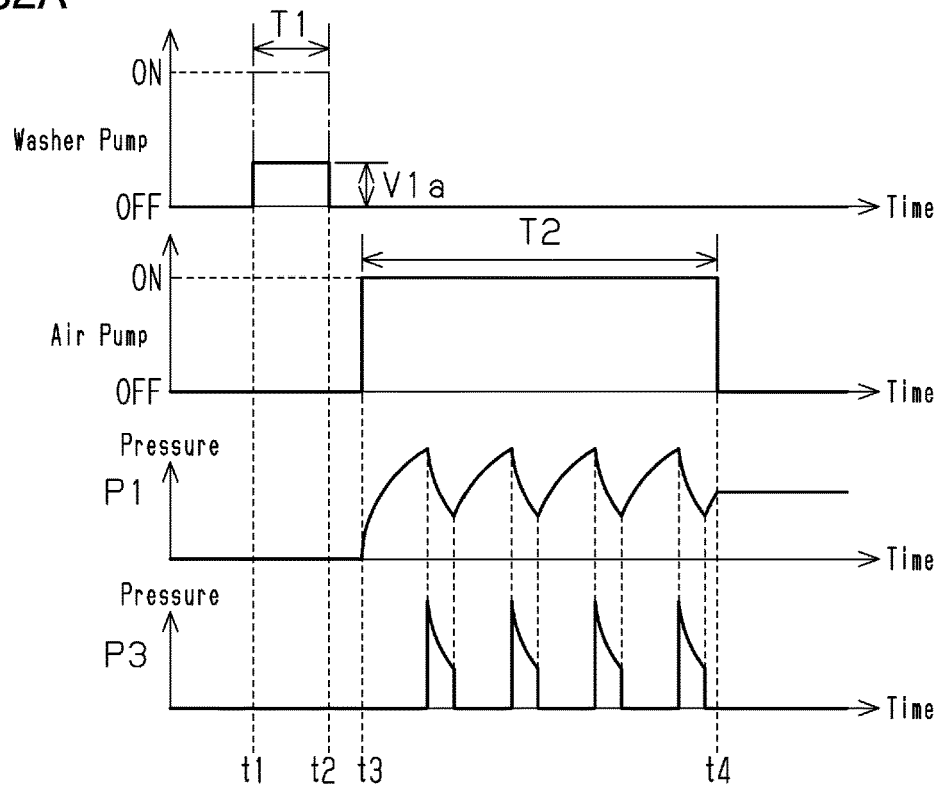
FIGS. 32A and 32B are waveform diagrams illustrating the action of the cleaning device in a modified example of the seventh embodiment.
Figure 32B:
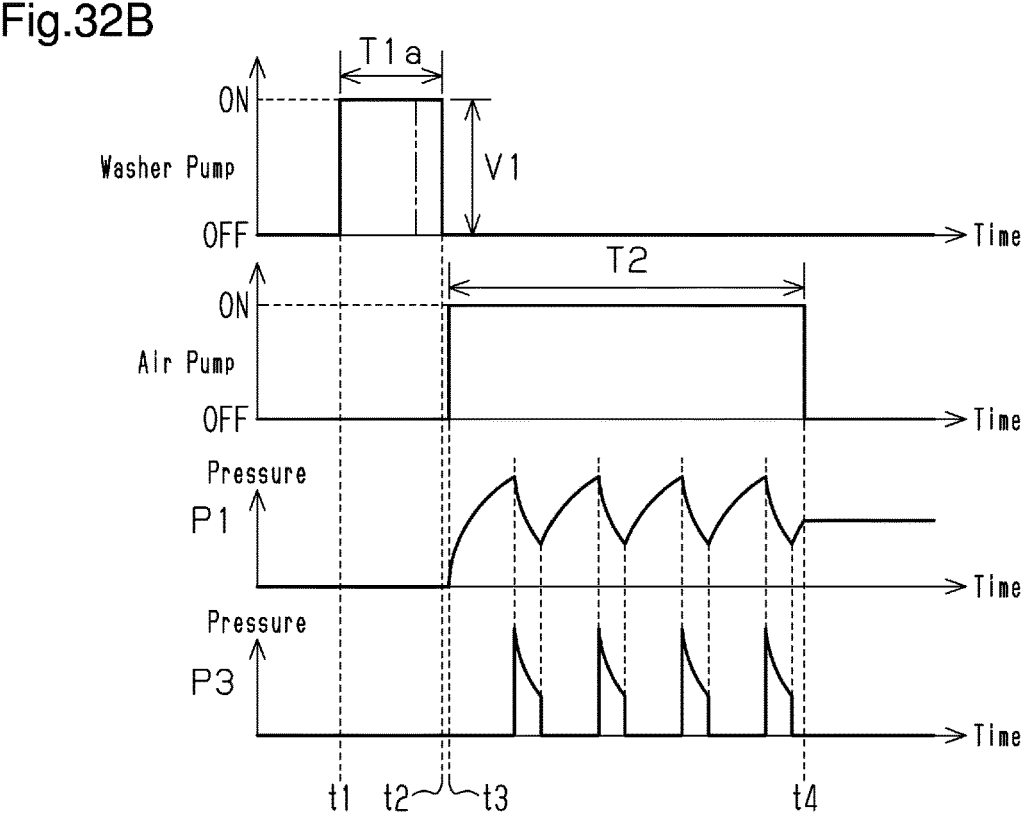

As shown in FIGS. 32A and 32B, the period and voltage for driving the washer pump 13b may be changed. Referring to FIG. 32A, the washer pump 13b is normally driven at a low voltage V1a during period T1. Referring to FIG. 32B, the washer pump 13b is driven at a normal voltage V1 for a period T1a that is longer than normal. The conditions shown in FIG. 32A relatively decreases the driving capability of the washer pump 13b, and the conditions shown in FIG. 32B relatively increases the driving capability of the washer pump 13b.

The viscosity of the cleaning liquid Ws increases when, for example, the ambient temperature decreases. Thus, when the temperature is low, the control is switched from the normal control shown in FIG. 32A to the control shown in FIG. 32B so that the highly viscous cleaning liquid Ws can be smoothly supplied.

Further, if the washer pump 13b is not driven for a long period, the formation of bubbles will easily occur in passage of the cleaning liquid Ws, for example, in the connection hose 129d shown in FIG. 26. Thus, if the washer pump 13b is not driven for a long period, for example, one month, the control is switched from the normal control shown in FIG. 32A to the control shown in FIG. 32B. This will eliminate bubbles from the cleaning liquid Ws with the air emitted from the ejection nozzle 31.

Figure 33:
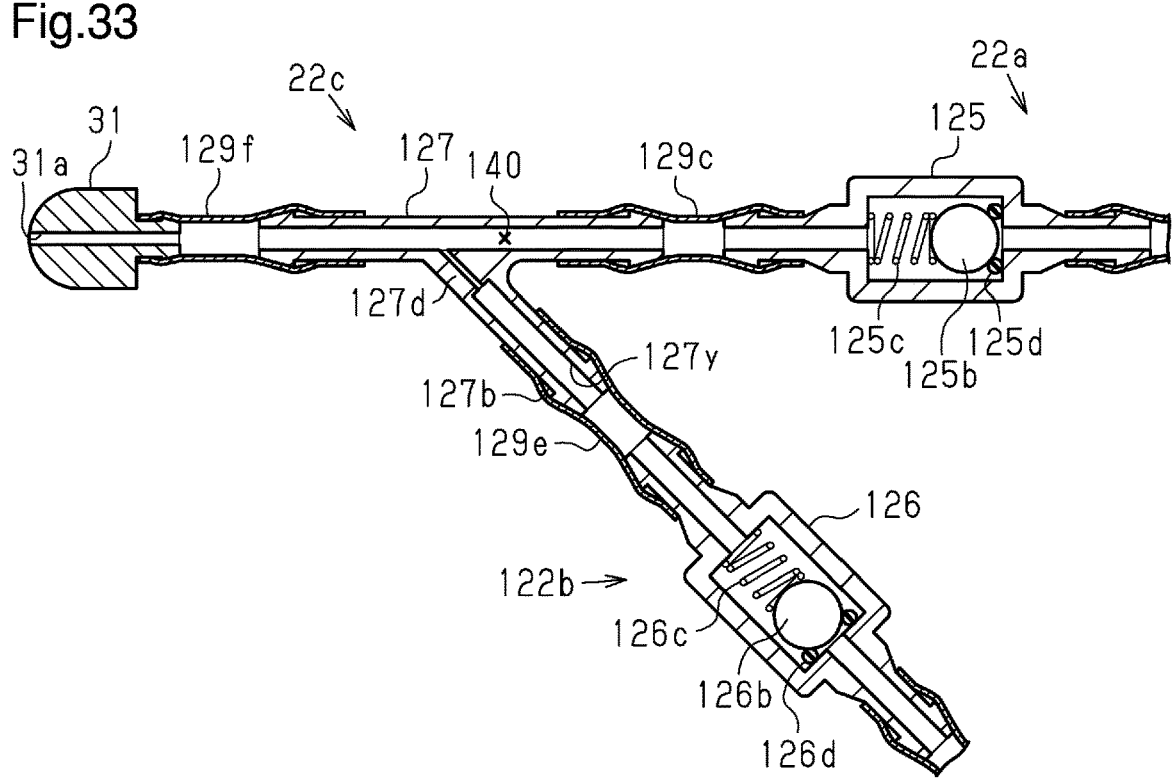
FIG. 33 is a schematic diagram of a cleaning device in a modified example of the seventh embodiment.

As shown in FIG. 33, in the mixture outlet 22c, a restriction 127d may be arranged in an intake passage 127y of the cleaning liquid Ws immediately before where the air jet CA2 and the cleaning liquid Ws are mixed. In the cleaning system 20, the main purpose of driving the washer pump 13b is to fill the filling passage 140 with the cleaning liquid Ws. The purpose is not ejecting the cleaning liquid Ws from the ejection nozzle 31. Thus, the restriction 127d can be used to slow the flow of the cleaning liquid Ws entering the filling passage 140 to limit the leakage of the cleaning liquid Ws from the ejection nozzle 31 when the washer pump 13b is driven.

Figure 34:
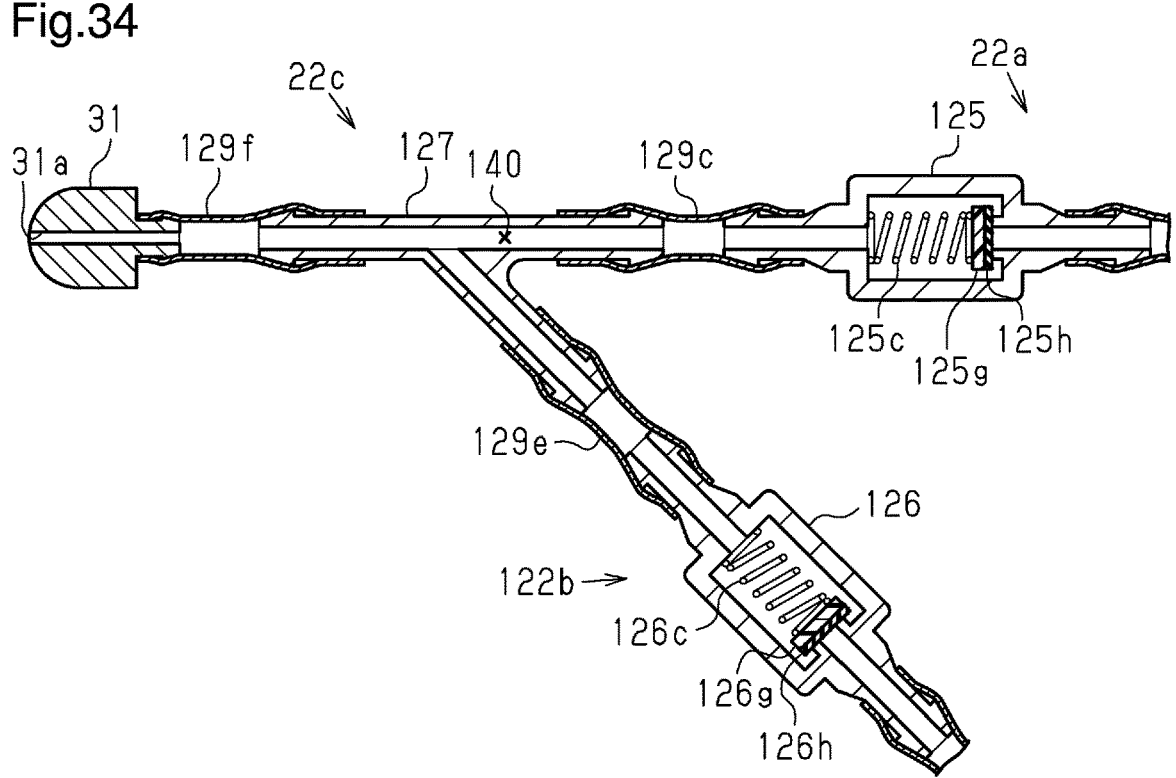
FIG. 34 is a schematic diagram of a cleaning device in a modified example of the seventh embodiment.

As shown in FIG. 34, flat valve bodies 125g and 126g may be used as the valve bodies of the check valves 125 and 126. The valve bodies 125g and 126g include seal surfaces 125h and 126h. This allow the check valves 125 and 126 to be reduced in size.

The structures of the air jet generator 22a, the cleaning liquid inlet 122b, and the mixture outlet 22c may be modified. For example, in the air jet generator 22a, two valve devices 24 may be connected in series, with the valve device 24 at the downstream side functioning as a check valve. This allows the check valve 125 to be omitted. In addition to the valve body 43a of the diaphragm 43 in the valve device 24, a further valve body can be used to open and close the open portion 48a of the discharge passage 48. In this case, the newly added valve body will function as a check valve. This allows the check valve 125 to be omitted. Further, only one valve device 24 is necessary.

The distance measurement sensors 11 and 12 are arranged at the middle portion of the front end of the vehicle 10 and the middle portion at the rear end of the vehicle 10 but may be arranged at the left and right sides of the vehicle 10.

The ejection nozzle 31 is separate from the mixture joint 127, and the mixture joint 127 is separate from the check valves 125 and 126. However, the components may be formed integrally. For example, the ejection nozzle 31 may be formed integrally with the mixture joint 127, and the mixture joint 127 may be formed integrally with the check valve 125.

The distance measurement sensors 11 and 12 (sensing surfaces 11a and 12a) do not have to be the cleaning subject. For example, the cleaning subject may be a camera that captures images of the surrounding of the vehicle 10, sensors other than such optical sensors, and non-sensors, for example, headlights 15, taillights 16, mirrors 17, and the like that are shown in FIG. 1.

The present disclosure is illustrated through the embodiment. However, the present disclosure is not limited to the structure of the embodiment. The present disclosure includes various modified examples and modifications within the scope of equivalence. Additionally, various combinations and modes and one, more, or less of these elements in other combinations and forms are included in the range and conceptual scope of the present disclosure.

The invention claimed is:

1. A vehicle cleaning system that removes foreign matter from a cleaning subject of a vehicle, the vehicle cleaning system comprising:
   an air pump driven to generate an air jet;
   a washer pump driven to supply cleaning liquid;
   an ejection nozzle that sprays the cleaning subject with a gas-liquid fluid mixture, which includes the air jet and the cleaning liquid;
   a cleaning liquid reservoir including a chamber, which stores the cleaning liquid supplied from the washer pump, and is configured to allow the cleaning liquid stored in the chamber to be discharged for mixing with the air jet; and a mixture outlet configured to spray the cleaning subject with the gas-liquid fluid mixture, which includes the air jet and the cleaning liquid received from the cleaning liquid reservoir, from the ejection nozzle, wherein the chamber includes a case member, a piston movably arranged in the case member, a storage compartment defined in the case member by the piston to store the cleaning liquid, and an urging member that urges the piston in a direction contracting the storage compartment, and the cleaning liquid reservoir is configured to store the cleaning liquid in the storage compartment by moving back the piston against an urging force of the urging member in the chamber with the cleaning liquid supplied from the washer pump, and to discharge the cleaning liquid stored in the storage compartment to the mixture outlet by pushing the piston with the urging force of the urging member in the chamber when the supply of the cleaning liquid from the washer pump is stopped.

2. A vehicle cleaning system that removes foreign matter from a cleaning subject of a vehicle, the vehicle cleaning system comprising:

an air pump driven to generate an air jet;

a washer pump driven to supply cleaning liquid;

an ejection nozzle that sprays the cleaning subject with a gas-liquid fluid mixture, which includes the air jet and the cleaning liquid;

an air jet generator including the air pump and a valve device, wherein the air jet generator is configured to generate the air jet that has a high pressure and is pulsed based on an action of the valve device that accumulates pressure until compressed air supplied from the air pump reaches a pressure that is higher than a discharge pressure of the air pump and, subsequent to the pressure accumulation, discharges the compressed air toward a downstream side;

a cleaning liquid reservoir including a chamber, which stores the cleaning liquid supplied from the washer pump, and is configured to allow the cleaning liquid stored in the chamber to be discharged for mixing with the air jet; and a mixture outlet configured to spray the cleaning subject with the gas-liquid fluid mixture, which includes the high-pressure pulsed air jet generated by the air jet generator and the cleaning liquid received from the cleaning liquid reservoir, from the ejection nozzle, wherein the air jet generator further includes:
a valve including a valve body that closes an intake passage of the compressed air and accumulates pressure until the compressed air supplied from the air pump reaches a pressure that is higher than the discharge pressure of the air pump; and an auxiliary mechanism configured to leak the compressed air from the intake passage when pressure is accumulated in the valve so as to accumulate pressure with leakage of the compressed air at a leaked side, open the valve body based on both of the pressures accumulated in the intake passage and the leaked side, output the pressure-accumulated compressed air from the intake passage to a discharge passage when the valve body opens, and close the valve body again upon the output of the compressed air to the discharge passage so as to allow for pressure accumulation in the intake passage.

3. The vehicle cleaning system according to claim 2, wherein the chamber includes a case member, a piston movably arranged in the case member, and a storage compartment defined in the case member by the piston to store the cleaning liquid, the chamber being configured to move the storage compartment with the compressed air supplied from the air pump in a direction contracting the storage compartment, and the cleaning liquid reservoir is configured to store the cleaning liquid in the storage compartment by moving back the piston in the chamber with the cleaning liquid supplied from the washer pump and discharge the cleaning liquid stored in the storage compartment to the mixture outlet by pushing the piston in the chamber with the compressed air supplied from the air pump.

4. The vehicle cleaning system according to claim 1, wherein the cleaning liquid reservoir includes a passage switching unit, and the cleaning liquid reservoir is configured to be switchable between:
a state in which a passage between the washer pump and the chamber is opened and a passage between the chamber and the mixture outlet is closed when the cleaning liquid is supplied from the washer pump; and a state in which the passage between the washer pump and the chamber is closed when the supply of the cleaning liquid from the washer pump is stopped and the passage between the chamber and the mixture outlet is opened when the cleaning liquid is discharged from the washer pump.

5. The vehicle cleaning system according to claim 4, wherein the passage switching unit includes:

a passage switching valve including: a primary side passage, which includes a first intake passage connected to the washer pump and a first discharge passage connected to the chamber; a secondary side passage, which includes a second intake passage connected to the chamber and a second discharge passage connected to the mixture outlet; and a diaphragm configured to open and close, in a complementary manner, both of the primary side passage and the secondary side passage; and a check valve disposed between the first discharge passage and the chamber.

6. The vehicle cleaning system according to claim 1, wherein the cleaning liquid reservoir is configured to allow for storage of a fixed amount of the cleaning liquid whenever the cleaning liquid is supplied from the washer pump.

7. The vehicle cleaning system according to claim 1, wherein the cleaning liquid reservoir is configured as a cleaning liquid reservoir device that includes a single unit configured to allow for storage of the cleaning liquid supplied from the washer pump and discharge of the stored cleaning liquid for mixing with the air jet.

8. A cleaning method for a vehicle cleaning system according to claim 2, the vehicle cleaning system removing foreign matter from a cleaning subject of a vehicle, the method comprising:

driving an air pump to generate air jet;

driving a washer pump to supply cleaning liquid;

spraying the cleaning subject with a gas-liquid fluid mixture, which is a mixture of the air jet and the cleaning liquid, from an ejection nozzle;

generating the air jet that has a high pressure and is pulsed based on an action of a valve device that accumulates pressure in an air jet generator, which includes the air pump and a valve device, until compressed air supplied from the air pump reaches a pressure that is higher than a discharge pressure of the air pump and, subsequent to the pressure accumulation, discharges the compressed air toward a downstream side;

in a cleaning liquid reservoir including a chamber that stores the cleaning liquid supplied from the washer pump, discharging the cleaning liquid, which is stored in the chamber, for mixing with the air jet; and spraying the cleaning subject with the gas-liquid fluid mixture, which is obtained by mixing the high-pressure pulsed air jet generated by the air jet generator and the cleaning liquid received from the cleaning liquid reservoir in a mixture outlet, from the ejection nozzle, wherein the air jet generator includes a valve and an auxiliary mechanism, the valve including a valve body, and the generating the air jet that has a high pressure and is pulsed includes:
 by the valve body, closing an intake passage of the compressed air;
 in the valve, accumulating pressure until the compressed air supplied from the air pump reaches a pressure that is higher than the discharge pressure of the air pump; and
 in the auxiliary mechanism, leaking the compressed air from the intake passage when pressure is accumulated in the valve so as to accumulate pressure with leakage of the compressed air at a leaked side, opening the valve body based on both of the pressures accumulated in the intake passage and the leaked side, outputting the pressure-accumulated compressed air from the intake passage to a discharge passage when the valve body opens, and closing the valve body again upon the output of the compressed air to the discharge passage so as to allow for pressure accumulation in the intake passage.

9. A vehicle cleaning system that removes foreign matter from a cleaning subject of a vehicle, the vehicle cleaning system comprising:
 an air pump driven to generate air jet;
 a washer pump driven to supply cleaning liquid;
 an ejection nozzle that sprays the cleaning subject with a gas-liquid fluid mixture, which is a mixture of the air jet and the cleaning liquid;
 an air jet generator including the air pump and a valve device, wherein the air jet generator is configured to generate the air jet that has a high pressure and is pulsed based on an action of the valve device that accumulates pressure until compressed air supplied from the air pump reaches a pressure that is higher than a discharge pressure of the air pump and, subsequent to the pressure accumulation, discharges the compressed air toward a downstream side;
 a cleaning liquid inlet configured to draw in the cleaning liquid that is supplied from the washer pump;
 a mixture outlet configured to spray the cleaning subject with the gas-liquid fluid mixture, which is a mixture of the high-pressure pulsed air jet generated by the air jet generator and the cleaning liquid received from the cleaning liquid inlet, from the ejection nozzle; and
 check valves respectively arranged at a downstream side of the valve device in the air jet generator and in a passage of the cleaning liquid inlet.

10. The vehicle cleaning system according to claim 9, wherein the air jet generator further comprises:
 a valve including a valve body that closes an intake passage of the compressed air and accumulates pressure until the compressed air supplied from the air pump reaches a pressure that is higher than the discharge pressure of the air pump; and
 an auxiliary mechanism configured to leak the compressed air from the intake passage when pressure is accumulated in the valve so as to accumulate pressure with leakage of the compressed air at a leaked side, open the valve body based on both of the pressures accumulated in the intake passage and the leaked side, output the pressure-accumulated compressed air from the intake passage to a discharge passage when the valve body opens, and close the valve body again upon the output of the compressed air to the discharge passage so as to allow for pressure accumulation in the intake passage.

11. The vehicle cleaning system according to claim 9, wherein the mixture outlet includes a restriction disposed in an intake passage for the cleaning liquid immediately before the air jet and the cleaning liquid are mixed.

12. The vehicle cleaning system according to claim 9, further comprising:
 a controller that controls the air pump and the washer pump,
 wherein the controller controls the air pump and the washer pump so that a drive period of the air pump ends at least after a drive period of the washer pump ends.

13. The vehicle cleaning system according to claim 12, wherein the controller controls the air pump and the washer pump so that the drive period of the air pump is shifted behind the drive period of the washer pump starts.

14. The vehicle cleaning system according to claim 12, wherein the controller controls the air pump and the washer pump so that the drive period of the washer pump is included in the drive period of the air pump.

15. The vehicle cleaning system according to claim 12, wherein the controller controls and changes the drive period and a drive voltage of the washer pump based on at least one of an ambient temperature or a non-driven period.

16. A cleaning method for a vehicle cleaning system according to claim 9, the vehicle cleaning system removing foreign matter from a cleaning subject of a vehicle, the method comprising:
 driving an air pump to generate air jet;
 driving a washer pump to supply cleaning liquid;
 spraying the cleaning subject with a gas-liquid fluid mixture, which is a mixture of the air jet and the cleaning liquid, from an ejection nozzle;
 generating the air jet that has a high pressure and is pulsed based on an action of a valve device that accumulates pressure in an air jet generator, which includes the air pump and the valve device, until compressed air supplied from the air pump reaches a pressure that is higher than a discharge pressure of the air pump and, subsequent to the pressure accumulation, discharges the compressed air toward a downstream side;
 receiving the cleaning liquid that is supplied from the washer pump at a cleaning liquid inlet;

spraying the cleaning subject with the gas-liquid fluid mixture, which is obtained by mixing the high-pressure pulsed air jet generated by the air jet generator and the cleaning liquid received from the cleaning liquid inlet in a mixture outlet, from the ejection nozzle; and
respectively arranging check valves at a downstream side of the valve device in the air jet generator and in a passage of the cleaning liquid inlet.

* * * * *